(12) United States Patent
Vanam et al.

(10) Patent No.: US 10,045,050 B2
(45) Date of Patent: Aug. 7, 2018

(54) PERCEPTUAL PREPROCESSING FILTER FOR VIEWING-CONDITIONS-AWARE VIDEO CODING

(71) Applicant: Vid Scale, Inc., Wilmington, DE (US)

(72) Inventors: Rahul Vanam, San Diego, CA (US); Louis Kerofsky, San Diego, CA (US); Yuriy Reznik, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 201 days.

(21) Appl. No.: 14/690,089

(22) Filed: Apr. 17, 2015

(65) Prior Publication Data

US 2015/0312595 A1     Oct. 29, 2015

Related U.S. Application Data

(60) Provisional application No. 61/984,724, filed on Apr. 25, 2014.

(51) Int. Cl.
*H04N 19/80* (2014.01)
*H04N 19/182* (2014.01)
(Continued)

(52) U.S. Cl.
CPC .......... *H04N 19/80* (2014.11); *H04N 19/117* (2014.11); *H04N 19/136* (2014.11);
(Continued)

(58) Field of Classification Search
CPC ...................................................... H04N 19/80
(Continued)

(56) References Cited

U.S. PATENT DOCUMENTS

| 5,623,577 A | 4/1997 | Fielder |
| 6,594,377 B1 | 7/2003 | Kim |

(Continued)

FOREIGN PATENT DOCUMENTS

| CN | 101127926 A | 2/2008 |
| CN | 101710995 A | 5/2010 |

(Continued)

OTHER PUBLICATIONS

Facial Expression Recognition in Perceptual Color space; Seyed Mehdi; 2012.*

(Continued)

*Primary Examiner* — Luis Perez Fuentes
(74) *Attorney, Agent, or Firm* — Invention Mine LLC

(57) ABSTRACT

A perceptual filter may be implemented to filter one or more spatial frequencies from a video signal that are below a contrast sensitivity limit of a viewer of the video signal. The perceptual filter may be configured to adapt one or more perceptual filter parameters on a pixel-basis based on, for example, content, viewing distance, display density, contrast ratio, display luminance, background luminance, and/or age of the viewer. A spatial cutoff frequency of the perceptual filter may be mapped to a contrast sensitivity. The perceptual filter may be used as a preprocessing step for a video encoder so as to lower an encoded bitrate. Temporal filtering of the video frames may be used to maintain continuity of a spatial cutoff frequency to ensure the perceptual filtering effects are not identified as motion by a video encoder, and the temporal filtering may be restricted to static areas of a frame.

14 Claims, 36 Drawing Sheets

(51) Int. Cl.
*H04N 19/117* (2014.01)
*H04N 19/136* (2014.01)
*H04N 19/85* (2014.01)
*H04N 19/154* (2014.01)
*H04N 19/162* (2014.01)
*H04N 19/164* (2014.01)

(52) U.S. Cl.
CPC ........... *H04N 19/182* (2014.11); *H04N 19/85* (2014.11); *H04N 19/154* (2014.11); *H04N 19/162* (2014.11); *H04N 19/164* (2014.11)

(58) Field of Classification Search
USPC ............................................. 375/240.29, 240
See application file for complete search history.

(56) References Cited

U.S. PATENT DOCUMENTS

| | | | |
|---|---|---|---|
| 6,611,613 B1 | 8/2003 | Kang | |
| 6,633,654 B2 | 10/2003 | Hannigan | |
| 6,652,099 B2 | 11/2003 | Chae | |
| 6,760,467 B1 | 7/2004 | Min | |
| 6,907,143 B2 | 6/2005 | Ferguson | |
| 6,975,776 B2* | 12/2005 | Ferguson | G06T 5/20 348/E17.001 |
| 7,095,901 B2 | 8/2006 | Lee | |
| 7,146,027 B2 | 12/2006 | Kim | |
| 7,146,059 B1* | 12/2006 | Durand | G06T 5/007 345/617 |
| 7,215,797 B2 | 5/2007 | Park | |
| 7,271,839 B2 | 9/2007 | Lee | |
| 7,471,843 B2 | 12/2008 | Messing | |
| 7,768,572 B2 | 8/2010 | Park | |
| 8,401,258 B2* | 3/2013 | Hargrove | G06T 5/007 382/128 |
| 8,698,961 B2* | 4/2014 | Astrachan | H04N 5/57 348/672 |
| 8,847,972 B2* | 9/2014 | Kane | G01J 1/42 345/589 |
| 8,913,668 B2 | 12/2014 | Ali | |
| 9,076,218 B2* | 7/2015 | Tsai | G06T 5/008 |
| 9,113,113 B2 | 8/2015 | Thiebaud | |
| 9,237,343 B2 | 1/2016 | Cohen | |
| 9,412,155 B2* | 8/2016 | Steiner | G06T 5/007 |
| 9,520,101 B2 | 12/2016 | Matskewich | |
| 2002/0186894 A1* | 12/2002 | Ferguson | G06T 5/001 382/261 |
| 2003/0031281 A1* | 2/2003 | Ferguson | H03H 17/0416 375/350 |
| 2003/0052911 A1 | 3/2003 | Cohen-Solal | |
| 2003/0156741 A1 | 8/2003 | Lee | |
| 2003/0231802 A1 | 12/2003 | Sekino | |
| 2003/0234892 A1* | 12/2003 | Hu | H04N 5/04 348/607 |
| 2007/0091920 A1 | 4/2007 | Harris | |
| 2010/0079508 A1 | 4/2010 | Hodge | |
| 2010/0080302 A1 | 4/2010 | Ali | |
| 2011/0093605 A1 | 4/2011 | Choudhury | |
| 2011/0148926 A1 | 6/2011 | Koo | |
| 2011/0151934 A1 | 6/2011 | Geng | |
| 2011/0194454 A1 | 8/2011 | Ohmae | |
| 2012/0120271 A1 | 5/2012 | Park | |
| 2012/0230553 A1 | 9/2012 | ChandraBijalwan | |
| 2013/0044101 A1 | 2/2013 | Kim | |
| 2013/0135198 A1 | 5/2013 | Hodge | |
| 2013/0195204 A1 | 8/2013 | Reznik | |
| 2014/0032777 A1 | 1/2014 | Yuan | |
| 2014/0254928 A1* | 9/2014 | Tsai | G06T 5/008 382/166 |
| 2015/0241962 A1 | 8/2015 | Reznik | |
| 2015/0304685 A1* | 10/2015 | Vanam | H04N 19/117 375/240.29 |
| 2015/0312575 A1* | 10/2015 | Bryant | H04N 19/115 375/240.08 |
| 2015/0312595 A1* | 10/2015 | Vanam | H04N 19/80 375/240.29 |

FOREIGN PATENT DOCUMENTS

| | | |
|---|---|---|
| EP | 1071045 | 1/2001 |
| EP | 2450872 | 5/2012 |
| JP | 2011172250 A | 9/2011 |
| KR | 1020040041168 A | 5/2004 |
| WO | 2008121281 A2 | 10/2008 |
| WO | 2011047335 A1 | 4/2011 |
| WO | 2011087449 A1 | 7/2011 |
| WO | 2011100901 | 8/2011 |
| WO | 2011102791 A1 | 8/2011 |
| WO | 2014078748 | 5/2014 |

OTHER PUBLICATIONS

QoE-Based Multi-Exposure Fusion in Hierarchical multivariate Gaussian CRF; Rui Shen; 2012.*
Google NPL search log.*
Rahul Vanam and Yuriy Reznik, "Perceptual preprocessing filter for viewing conditions-aware video coding," U.S. Appl. No. 61/727,203, Provisional 11633, Nov. 16, 2012.
Erli Zhang et al: "A JND Guided Foveation Video Coding", Dec. 9, 2008 (Dec. 9, 2008), Advances in Multimedia Information Processing—PCM 2008, Springer Berlin Heidelberg, Berlin, Heidelberg, pp. 31-39, XP019112853, ISBN: 978-3-540-89795-8 p. 1-p. 4.
Sheikh H R et al: "Real-time foveation techniques for H.263 video encoding in software", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY : IEEE, US, vol. 3, May 7, 2001 (May 7, 2001).
International Search Report and Written Opinion dated Feb. 6, 2014 for PCT/US2013/070444.
L.Luk. (Aug. 2011), "Apple Developing New iPad", The Wall Street Journal. [Online]. http://online.wsj.com/article/SB10001424053111903596904576517674178129628.html.
Maureen Stone. Contrast Metrics Explained. [Online]. http://www.stonesc.com/pubs/Contrast%20Metrics.htm.
E. Peli, "Contrast in complex images," Journal of optical society of America A, vol. 7, No. 10, pp. 2032-2040, 1990.
G.M. Johnson and M.D. Fairchild, "On contrast sensitivity in an image difference model," in IS&T PICS 2002, Portland, 2002, pp. 18-23.
Campbell, F. W. and Robson, J. G., "Application of Fourier analysis to the visibility of gratings," Journal of Physiology, vol. 197, pp. 551-566, 1968.
Movshon JA and Kiorpes L., "Analysis of the development of spatial contrast sensitivity in monkey and human infants," Journal of the Optical Society of America A, vol. 5, No. 12, pp. 2166-2172, Dec. 1988.
P.G.J. Barten, Contrast sensitivity of the human eye and its effect on image quality". Bellingham, WA: SPIE, 1999."
S. Daly, The visible differences predictor: An algorithm for assessment of image fidelity, A.B. Watson, Ed. Cambridge, MA: MIT press, 1993, ch. 13.
C. E. Duchon, "Lanczos Filtering in One and Two Dimensions," Journal of Applied Meteorology, vol. 18, No. 8, pp. 1016-1022, Aug. 1979.
G. J. Conklin, G. S. Greenbaum, K. O. Lillevold, A. F. Lippman, and Y. A. Reznik, "Video Coding for Streaming Media Delivery on the Internet," IEEE Trans. Circuits Syst. Video Technology, vol. 11, No. 3, pp. 269-281, 2001.
Xiph.org: Test video sequences. [Online]. http://media.xiph.org/video/derf/.
x264 video encoder. [Online]. http://www.videolan.org/developers/x264.html.

(56) References Cited

OTHER PUBLICATIONS

DisplayMate\s measurements of characteristics of mobile displays. [Online]. http://www.displaymate.com/mobile.html.
F. W. Campbell, J. J. Kulikowski, and J. Levinson, "The effect of orientation on the visual resolution of gratings," J Physiol, vol. 187, No. 2, pp. 427-436 , Nov. 1966.
Barten, Peter GJ. "Formula for the contrast sensitivity of the human eye." Electronic Imaging 2004. International Society for Optics and Photonics, 2003.
Corless, Robert M., et al. "On the Lambert W function." Advances in Computational mathematics 5.1 (1996): 329-359.
Yuriy Reznik et al., "Viewing conditions-adaptive coding and delivery of visual information," U.S. Appl. No. 61/588,588, IDCC provisional application, 2012.
Zhifeng Chen, Rahul Vanam,and Ed Asbun Yuriy Reznik, "Measuring ambient light in mobile devices," U.S. Appl. No. 61/717,055, IDCC provisional application, 2012.
Saamer Akhshabi et al: "An Experimental Evaluation of Rate-Adaptation Algorithms in Adaptive Streaming over HTTP" , MMSys\11 Proceedings of the second annual ACM conference on Multimedia systems, Feb. 23, 2011 (Feb. 23, 2011), pp. 157-168, XP055043932, New York, NY, USA DOI: 10.1145/1943552. 1943574 ISBN: 978-1-45-030518-1 Retrieved from the Internet: URL: http://www.cc.gatech.edu/fac/Constantinos.Dovrolis/Papers/.
"Information technology—Dynamic Adaptive Streaming Over HTTP (DASH)—Part 1: Media Presentation Description and Segment Formats" ISO/IEC JTC 1/SC 29; ISO/IEC DIS 23009-1; ISO/IEC JTC 1/SC 29/WG11, Aug. 30, 2011 (Aug. 30, 2011), 134 pages.
Apple, Inc., "HTTP Live Streaming Overview", Developer, Feb. 11, 2014, 39 pages.
Bababekova et al., "Font Size and Viewing Distance of Handheld Smart Phones", Optometry and Vision Science, vol. 88, No. 7, Jul. 2011, pp. 795-797.
Curcio et al., "Human Photoreceptor Topography", Journal of Comparative Neurology, vol. 292, Feb. 1990, pp. 497-523.
Dodgson, Neil A., "Variation and Extrema of Human Interpupillary Distance", Stereoscopic Displays and Virtual Reality Systems XI, Proceedings SPIE, vol. 5291, May 21, 2004, 11 pages.
Jain, Anil K., "Fundamentals of Digital Image Processing", Prentice Hall Information and System Sciences Series, 1989, pp. 44-85.
Kalloniatis, Michael et al. "Visual Acuity", Webvision: The Organization of the Retina and Visual System. Available at:httQ://webvision.med.utah.edu/book/part-viii-gabac-receptors/visual-acuity/, 13 pages.
Levent-Levi, T., "The Past, Present and Future of Mobile Video Telephony", VisionMobile, Available at http://www.visionmobile.com/bloq/2010/06/the-past-present-and-future-of-mobile-video-teleohonv/, Jun. 8, 2010, 16 pages.
Myers, David J., "Mobile Video Telephony for 3G Wireless Networks", Chapter 1, The McGraw-Hill Companies, Inc., 2004, 12 pages.
Viola et al., "Rapid Object Detection Using a Boosted Cascade of Simple Features", Proceedings of the 2001 IEEE computer Society Conference on Computer Vision and Pattern Recognition, CCPR 2001, vol. 1, 2001, 9 pages.
Graham, Clarence Henry, "Vision and Visual Perception", John Wiley & Sons, Inc., Dec. 1965, 14 pages.
Curcio, Igor D., "Mobile Video Telephony", Wireless Internet Handbook, CRC Press, Inc., 2003.
Bergquist, Johan, "Resolution and Contrast Requirements on Mobile Displays for Different Applications in Varying Luminous Environments", Proceedings of the 2nd International Symposium on Nanovision Science, Hamamatsu, 2005, 3 pages.
Russell, and K. De Valois, "Spatial Vision".: Oxford University Press, 1988.
ISO/IEC, "Technologies under Consideration for ISO/IEC 23009-1 Dynamic Adaptive Streaming over HTTP", ISO/IEC JTC1 SC29 WG11, N12682, Apr. 2012.
Real Networks, "Helix Universal Media Server", 2011.
Ban et al., "Design and Implementation of a Dynamic Adaptive Streaming System Over HTTP", Fall Conference of the Journal of the Korea Institute of Maritime Information & Communications Sciences, Oct. 26, 2011, pp. 666-668.
Takahashi, "Future of Television", Nikkei Electronics, No. 1072, Dec. 26, 2011, pp. 37-45.
Cermak et al., "The Relationship Among Video Quality, Screen Resolution, and Bit Rate", IEEE Transactions on Broadcasting, vol. 57, No. 2, Jun. 2011, pp. 258-262.
Shibata et al., "The Zone of Comfort; Predicting Visual Discomfort with Stereo Displays", Journal of Vision, vol. 11, No. 8, Jul. 2011, 59 pages.
Daly, Scott, "Motion Perception in Displays", Dolby Laboratories, Simon Fraser University, Oct. 2011, part 1 of 4, 40 pages.
Daly, Scott, "Motion Perception in Displays", Dolby Laboratories, Simon Fraser University, Oct. 2011, part 2 of 4, 40 pages.
Daly, Scott, "Motion Perception in Displays", Dolby Laboratories, Simon Fraser University, Oct. 2011, part 3 of 4, 40 pages.
Daly, Scott, "Motion Perception in Displays", Dolby Laboratories, Simon Fraser University, Oct. 2011, part 4 of 4, 33 pages.
J.P. Tuck, and Gerald Long, "Comparison of contrast sensitivity functions across three orientations: implications for theory and testing," Perception, vol. 20, No. 3, pp. 373-380, 1991.
Schieber, F. W. "Aging and the senses. In, JE Birren, RB Sloane, & GD Cohen." Handbook of mental health and aging (1992): pp. 206-251.
Zhang, E., et al "A JND Guiden Foveation Video Coding", 2008.
Barten "Contrast Sensitivity of the Human Eye and Its Effect on Image Quality", 15 pages.
A JND Guided Foveation Video Coding; 2008; Zhang.
Novel approach to non-linear non-Gaussian Bayesian state estimation; Gordon; 1993.
Block-based noise estimation using adaptive Gaussian filtering; Shin et al; 2005.
Contrast sensitivity of the human eye and its effect on image quality; Barten et al; 1999; Chapter 1, pp. 1-6.
Anmin Liu, et. al., "Just Noticeable Difference for Images with Decomposition Model for Separating Edge and Textured Regions", Manuscript for TCSVT-2010, 5 pages.
X.K. Yang, et. al., "Just noticeable distortion model and its applications in video coding", Signal Processing: Image Communication 20 (2005), pp. 662-680. Available online at www.sciencedirect.com.
Kazunori Higuchi et al., "Image Compensation System for the Elderly Based on Human Visual Properties with Age," The Journal of the Institute of Video Media, vol. 53, No. 9, pp. 1285-1291, Aug. 3, 1999.
Jia Yet al: "Estimating Just-Noticeable Distortion for Video", IEEE Transactions on Circuits and Systems For Video Technology, IEEE Service Center, Piscataway, NJ, US, vol. 16, No. 7, Jul. 1 2006 (Jul. 1, 2006), pp. 820-829, XP001548834, ISSN: 1051-8215, DOI: 10.1109/TCSVT.2006.877397.
Yang X K et al: "Just noticeable distortion model and its applications in video coding", Signal Processing. Image Communication, Elsevier Science Publishers, Amsterdam, NL, vol. 20, No. 7, Aug. 1, 2005 (Aug. 1, 2005), pp. 662-680, XP027805675, ISSN: 0923-5965, [retrieved on Aug. 1, 2005].
Fia Yet al: "Estimating Just-Noticeable Distortion for Video", IEEE Transactions on Circuits and Systems For Video Technology, IEEE Service Center, Piscataway, NJ, US, vol. 16, No. 7, Jul. 1, 2006 (Jul. 1, 2006), pp. 820-829, XP001548834, ISSN: 1051-8215, DOI: 10.1109/TCSVT.2006.877397.

\* cited by examiner

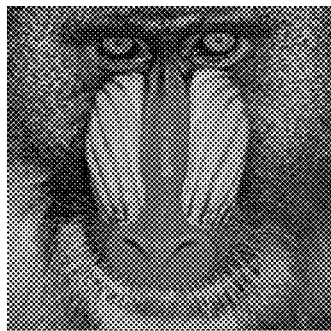
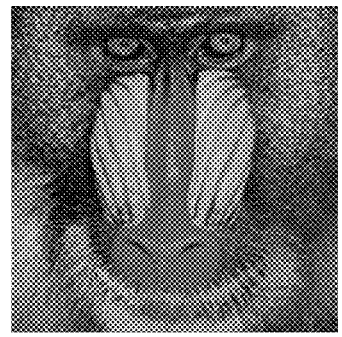
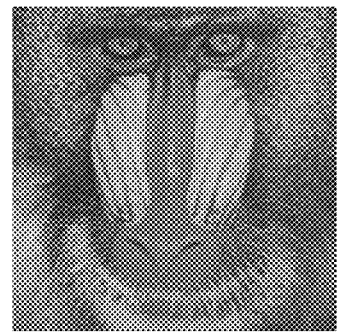
FIG. 12A FIG. 12B FIG. 12C
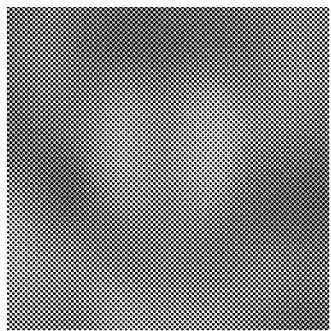
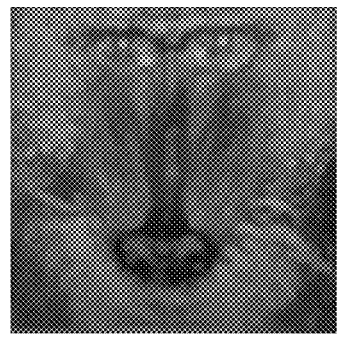
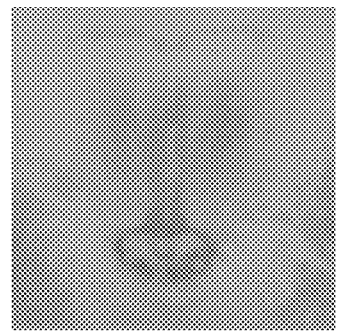
FIG. 12D FIG. 12E FIG. 12F
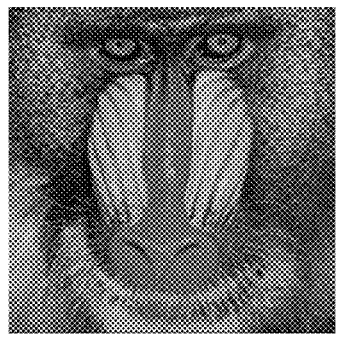
FIG. 12G

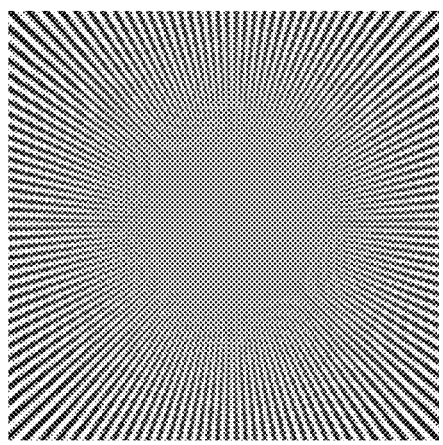
FIG. 29A
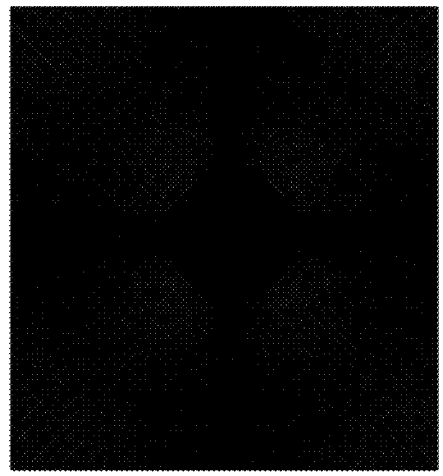
FIG. 29B
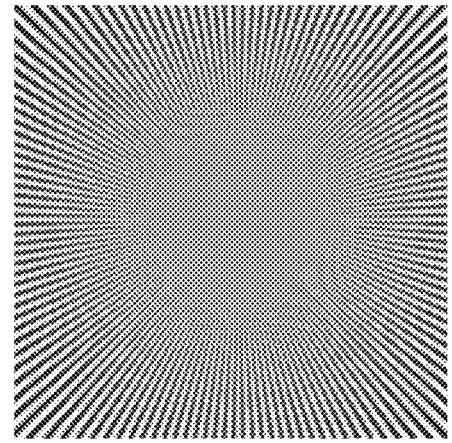
FIG. 29C
FIG. 29D

US 10,045,050 B2

PERCEPTUAL PREPROCESSING FILTER FOR VIEWING-CONDITIONS-AWARE VIDEO CODING

CROSS REFERENCE TO RELATED APPLICATION

This application claims priority to U.S. Provisional Application No. 61/984,724, filed Apr. 25, 2014, entitled "PERCEPTUAL PREPROCESSING FILTER FOR VIEWING-CONDITIONS-AWARE VIDEO CODING", reference of which is hereby incorporated in its entirety.

BACKGROUND

Video and mobile video are rapidly growing traffic segments in global Internet and mobile networks. A video streaming client, such as a Wireless Transmit Receive Unit (WTRU), may employ streaming rate adaptation techniques in order to provide the highest streaming multimedia playback quality possible, for example by selecting a bitrate, resolution, etc. in accordance with communications network conditions (e.g., available bandwidth).

Video streaming rate adaptation techniques may fail to account for viewing conditions that may affect the video quality that is perceivable by an end user of a video streaming client.

SUMMARY

A perceptual filter may be implemented to filter one or more spatial frequencies from a video signal that are below a contrast threshold limit of a viewer of the video signal. The perceptual filter may filter spatial frequencies adaptively, for example based on a local contrast and/or an orientation of an oscillation or oscillations. Temporal filtering of the video frames may be used to maintain continuity of a spatial cutoff frequency to ensure filtering effects are not identified as motion effects by a video encoder, and the temporal filtering may be restricted to static areas of a frame. The perceptual filter may be configured to adapt one or more perceptual filter parameters on a pixel-basis based on, for example, content, viewing distance, display density, contrast ratio, display luminance, background luminance, and/or age of the viewer. Estimates of DC levels, amplitude deviations, and contrast sensitivity of a video frame may be performed. A spatial cutoff frequency of the perceptual filter may be mapped to a contrast sensitivity. The perceptual filter may be used as a preprocessing step for a video encoder so as to lower an encoded bitrate. The oblique effect phenomena of the human visual system may be incorporated into the perceptual filter.

Preprocessing of an input video signal may include receiving at least one parameter pertaining to a viewer's perception of the input video signal. The at least one parameter may comprise at least one of a display luminance or a background luminance. The preprocessing may include configuring an adaptive low pass filter in accordance with the at least one parameter. The preprocessing may include filtering the input video signal using the adaptive low pass filter to produce an output video signal. Configuring the adaptive low pass filter may include incorporating the oblique effect phenomena of the human visual system into the adaptive low pass filter.

Specifically, in the filtering described herein for some embodiments, each pixel may have an associated cutoff frequency. In the presence of temporal noise, the cutoff frequency may be varied over time such that collocated pixels (but differing in time) might be filtered by different filters causing an encoder to identify the presence of motion. The encoder might then assign more bits for encoding this variation causing an increase in the encoding bit rate.

An input video frame that has had its black level adjusted is provided as an input to a temporal filtering device. A median filter is applied, which may have dimension 7×7 pixels. The median filter outputs the median pixel value of all the pixels in a 7×7 region around the given pixel. Alternative embodiments may utilize 3×3 or 5×5 filter (a tradeoff exists between the complexity of the filter operation versus the bitrate savings). One branch of the filtering performs a difference calculation between the current frame and a previous frame. The difference values may be squared and the squared values may be filtered such as by a Gaussian filter of length 4 cpd. The Gaussian-filter output may be a gradient metric $G_{i,j}$ that can be compared to a threshold. In some embodiments, the threshold may be determined empirically based on accurate determination of static regions. If the temporal gradient is below the threshold the temporal filter is applied to remove the pseudo motion effect. The temporal frame differencing, squaring, and filtering may be used to select one or more pixels for temporal filtering and/or to select one or more parameters of the temporal filter, thus potentially removing local temporal noise, or subduing the temporal noise, but passing any actual object motion. That is, the filter output will not be significantly altered due to actual motion.

BRIEF DESCRIPTION OF THE DRAWINGS

FIG. 12A depicts an example input video and/or image.

FIG. 12B depicts a luma component of the example input video and/or image depicted in FIG. 12A.

FIG. 12C depicts the luma component of the example input video and/or image depicted in FIG. 12B after a black level adjustment.

FIG. 12D depicts a DC estimate corresponding to the example input video and/or image depicted in FIG. 12A.

FIG. 12E depicts an amplitude envelope estimate corresponding to the example input video and/or image depicted in FIG. 12A.

FIG. 12F depicts a cutoff frequency map corresponding to the example input video and/or image depicted in FIG. 12A.

FIG. 12G depicts a filtered output image of the example input video and/or image depicted in FIG. 12A.

FIG. 29A depicts a test image.

FIG. 29B depicts an example of the test image of FIG. 29A, filtered with an example perceptual filter.

FIG. 29C depicts an example of the test image of FIG. 29A, filtered with an example perceptual oblique filter.

FIG. 29D depicts a difference image corresponding to the filtered images of FIGS. 29B and 29C.

DETAILED DESCRIPTION

Figure 1:
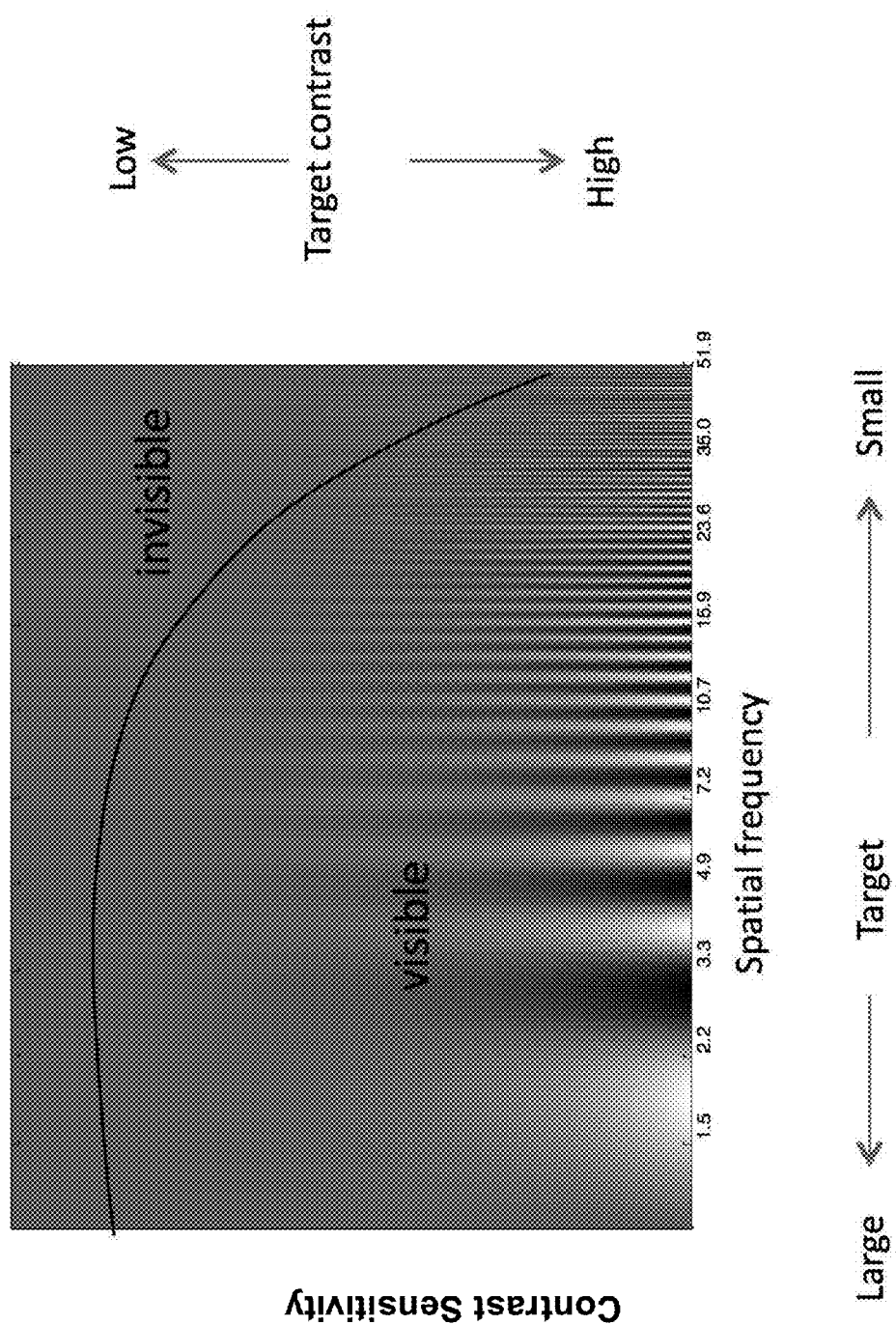
FIG. 1 depicts an example contrast sensitivity function using a Campbell-Robson chart.

Mobile video streaming and mobile video conferencing may provide users with flexibility to access and/or view video content in a variety of places and at a variety of times. In comparison to traditional television displays, which may be stationary, WTRUs such as mobile devices may give the user the flexibility to set up the WTRU at a desired distance and orientation to suit the preferences of the user. The user may not be constrained to view the content at a particular location, such as at a home, at a theatre, etc., but may instead view the content at any of a variety of locations.

One or more factors other than communications network conditions may determine the visibility of video information rendered on the display of a streaming client (e.g., a mobile device), which may include one or more of a viewing distance from the mobile device, the size of the display of the mobile device, a contrast sensitivity of the display, a pixel density of the display, and the like. For example, a mobile device held at arm's length from a user may present video information at a much higher spatial density than if the mobile device is held closer by the user. Similarly, the visibility of video information may be lower when viewing a mobile device under direct sunlight than when viewing the mobile device in a dark environment.

Such factors that affect the perception of visual information may be accounted for by a perceptual preprocessing filter that may be used, for example, to lower a bitrate of encoded video transmitted to a viewing device. The perceptual filter may be used in conjunction with transmission of video to mobile or stationary devices, and may be adapted according to the current conditions relating to the viewing device. Viewers utilizing mobile devices may experience a wider variety of viewing conditions and may have a greater need for bandwidth reduction. Thus, the perceptual filter may lower the resulting bitrate from compression of video while maintaining a perceptual quality of the video.

1. Introduction

Contrast or luminance contrast may be a perceptual measure that may define a difference between the perceived lightness of two colors, for example. The contrast of a periodic pattern (e.g., a sinusoidal grating) may be measured using Michelson's contrast, which may be expressed as $$C = \frac{L_{max} - L_{min}}{L_{max} + L_{min}} \quad \text{(eq 1)}$$

where $L_{max}$ and $L_{min}$ may be maximum and minimum luminance values, respectively. Alternatively, contrast may be expressed as $$C = \frac{(L_{max} - L_{min})/2}{(L_{max} + L_{min})/2} = \frac{\text{Amplitude}}{\text{Average}} \quad \text{(eq 2)}$$

A contrast threshold may correspond to a level of contrast that may elicit a perceived response by the human visual system. An inverse of the contrast threshold may be referred to as contrast sensitivity. A contrast sensitivity CS may be expressed as $$CS = \frac{1}{\text{Contrast threshold}} = \frac{\text{Average}}{\text{Amplitude}} \quad (eq\ 3)$$

Contrast sensitivity may vary as a function of spatial frequency, for example as illustrated by the Campbell-Robson chart depicted in FIG. 1. In a Campbell-Robson chart, spatial frequency may increase logarithmically from left to right and contrast may decrease logarithmically from bottom to top. The relationship between contrast sensitivity and spatial frequency may be referred to as a Contrast Sensitivity Function (CSF). An example CSF curve is illustrated in FIG. 1.

The CSF may have a maximum at 4 Cycles per Degree (CPD), and the sensitivity may decrease at both lower and higher frequencies, thereby yielding a band pass characteristic. The CSF curve may define a threshold of visibility, where a region below the curve may be visible to a viewer and a region above the curve may not be visible (e.g., may be invisible) to a viewer. CSF models may include one or more of the Movshon and Kiorpes model, the Barten model, and/or the Daly model.

An adaptive low pass filter (e.g., a perceptual filter) may be based on a CSF model of the human visual system, for example, as depicted in FIG. 2. Inputs to a perceptual filter 202 may comprise one or more of an input video and/or image, a viewing distance between the display of a mobile device and a user of the mobile device, a contrast ratio associated with the display, and/or a display pixel density of the display. Signal processing may be performed on the inputs, for example, to generate a cut-off frequency for the adaptive low pass filter 202.

Some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a computer memory, that in combination form a specifically configured apparatus that performs the functions as described herein. These combinations that form specially-programmed devices may be generally referred to herein "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

Figure 2A:
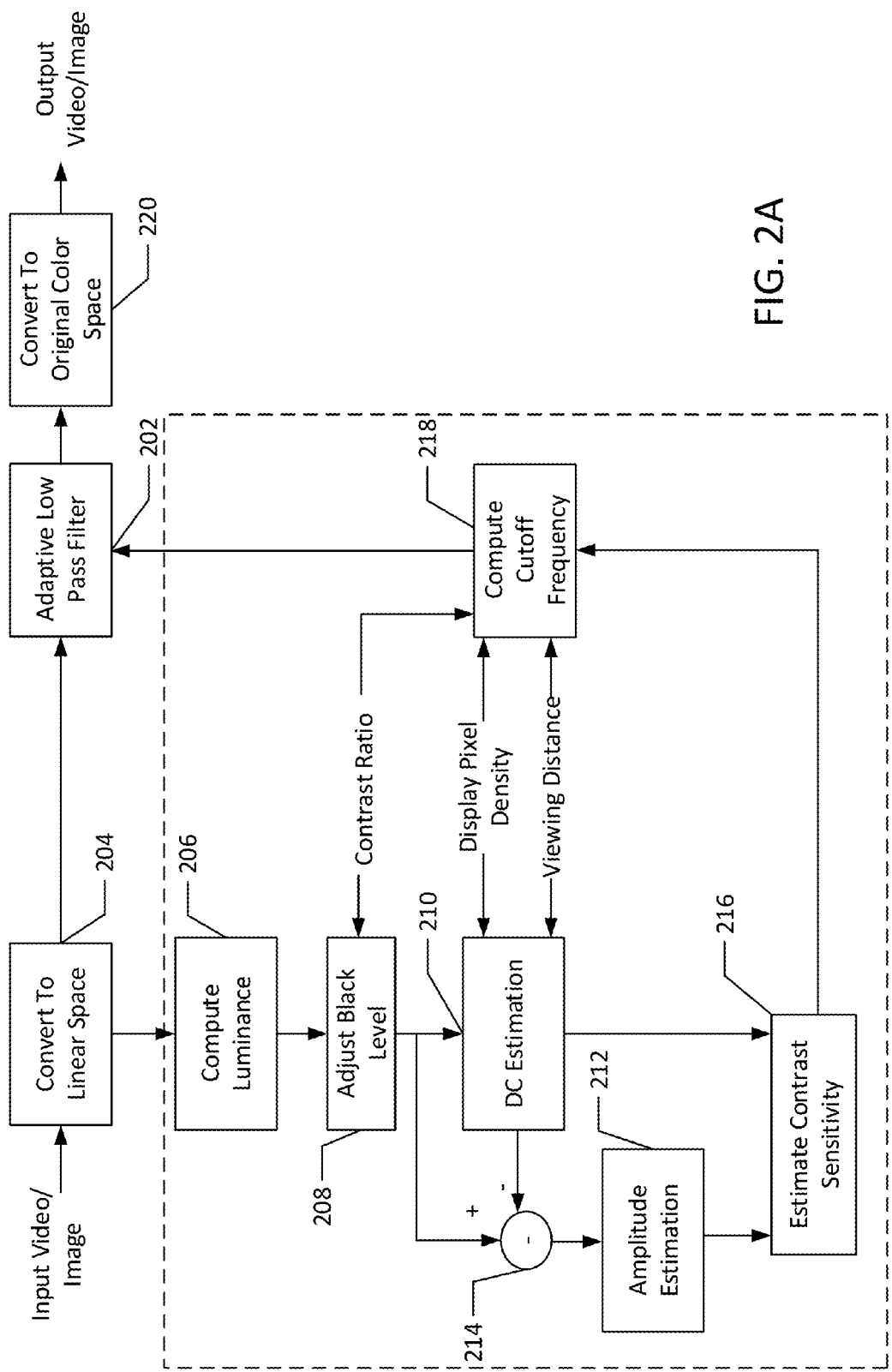
FIG. 2A depicts a block diagram of an example perceptual filter that may be a perceptual oblique filter.

As shown in FIG. 2A, an embodiment of the adaptive filtering apparatus is depicted with respect to various functional modules. A color-space conversion module 204 receives an image (e.g., a video frame) and converts the color space of the received image to a linear color space. Module 204 then provides the color-space-converted image to a luminance computation module 206 and an adaptive low-pass filter 202. Luminance computation module 206 generates a luminance image based on the received color-space-converted image and provides the luminance image to a black-level-adjustment module 208.

A perception-characteristic module provides to black-level-adjustment module 208 a contrast-ratio indication of a contrast ratio of an intended display device. The perception-characteristic module further provides a viewing-distance indication and a pixel-density indication to both a DC estimation module 210 and a cutoff-frequency-computation module 218, the viewing-distance indication including a distance from a display-device user to the intended display device and the pixel-density indication including a pixel density of the intended display device.

Black-level-adjustment module 208 generates a black-level-adjusted image based on the received luminance image and the received contrast-ratio indication. Module 208 then provides the black-level-adjusted image to a DC estimation module 210 and a difference module 214. DC estimation module 210 generates a DC-estimation image by estimating, based on the received viewing-distance and pixel-density indications, a respective localized DC for each pixel of the black-level-adjusted image. Module 210 then provides the DC-estimation image to both the difference module 214 and a contrast-sensitivity-estimation module 216.

Difference module 214 generates a difference image based on the received black-level-adjusted and DC-estimation images and provides the difference image to an amplitude estimation module 212. Module 212 generates an amplitude-estimation image by estimating a respective localized amplitude for each pixel of the received difference image. Module 212 then provides the amplitude-estimation image to contrast-sensitivity-estimation module 216.

Module 216 generates a respective contrast sensitivity value for each pixel of the received DC-estimation and amplitude-estimation images and provides the contrast sensitivity values to cutoff-frequency-computation module 218. Module 218 computes a respective cutoff frequency value for each received contrast sensitivity value based on a contrast sensitivity function and on the received viewing-distance and pixel-density indications. Module 218 then provides the cutoff frequency values to an adaptive low-pass filter module 202.

Module 202 generates a filtered image based on the color-space-converted image received from color-space conversion module 204 and the cutoff frequency values received from cutoff-frequency-computation module 218. Module 202 then provides the filtered image to a second color-space conversion module 220. Module 220 converts the color space of the received filtered image to the original color space (as received by color-space conversion module 204) and outputs a perceptual-pre-filtered image.

In an embodiment, a perceptual filter employs a CSF model to determine one or more spatial frequencies that are invisible. These may be used, for example, to determine a local cutoff frequency of an adaptive low pass filter (e.g., a perceptual filter). A perceptual filter, for example as described herein, may incorporate (e.g., account for) the oblique effect phenomena of the human visual system. For example, a perceptual filter may filter (e.g., strongly filter) one or more spatial frequencies in an oblique direction relative to the horizontal and/or vertical directions. By incorporating oblique effect, a perceptual filter may reduce spatial oscillations, for example over using equation (1) alone. This may enable the lowering of a bitrate used to encode a video, with little or no loss in visual quality.

Figure 3:
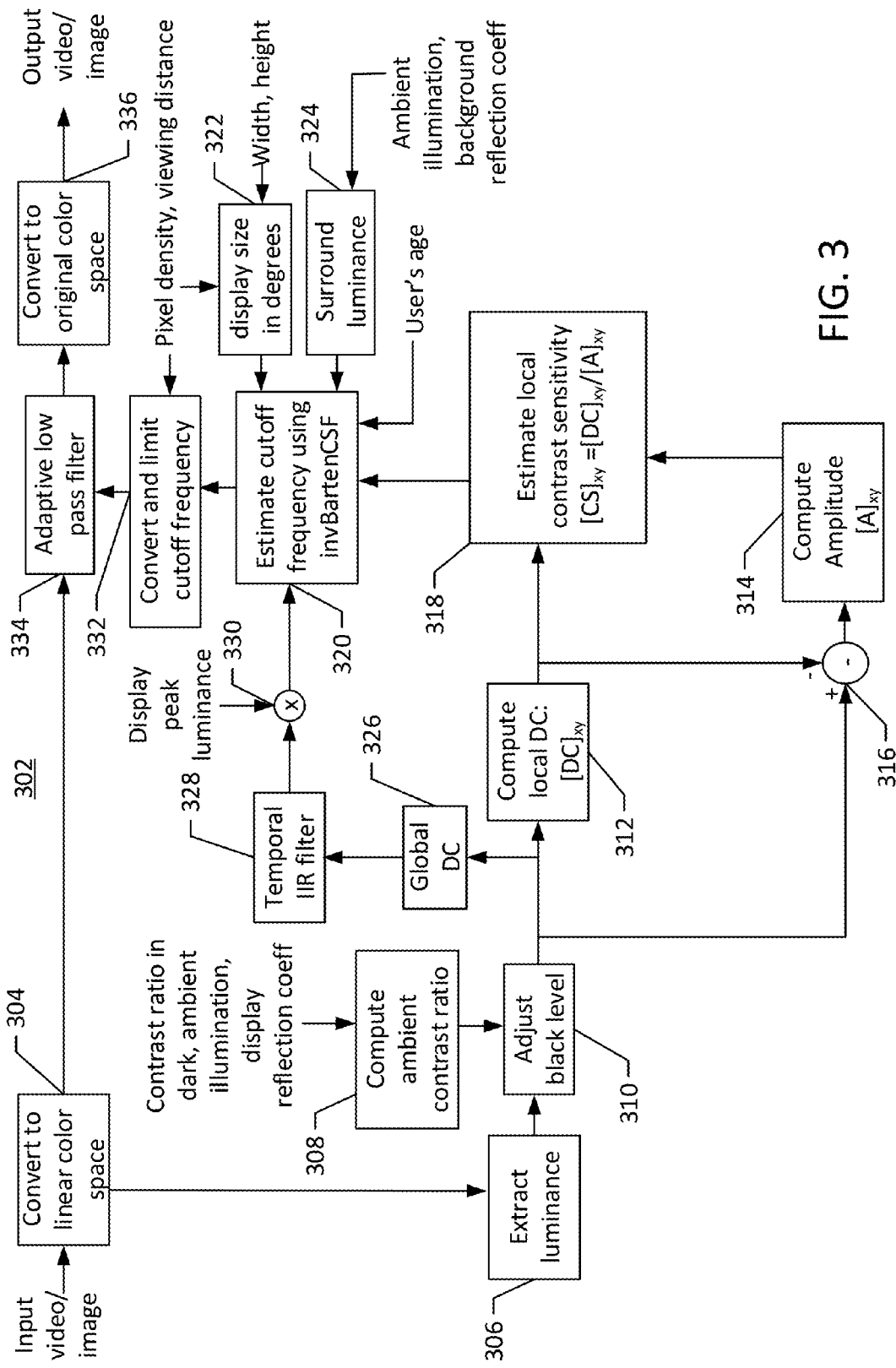
FIG. 3 is a block diagram illustrating an example ambient adaptive perceptual filter.

FIG. 3 is a block diagram illustrating an example ambient adaptive perceptual filter 302. Inputs to the ambient adaptive perceptual filter 302 may comprise one or more of an input video and/or image, a viewing distance between the display of a mobile device and a user of the mobile device, a contrast ratio associated with the display, a display pixel density of the display, an ambient illumination level, a background reflection coefficient, and/or an age of the user. Signal processing may be performed on the inputs, for example, to generate a cut-off frequency for the adaptive low pass filter 302.

An embodiment of the adaptive filtering apparatus is depicted with respect to various functional modules illustrated in FIG. 3. A color-space conversion module 304 receives an image (e.g., a video frame) and converts the color space of the received image to a linear color space. Module 304 then provides the color-space-converted image to a luminance computation module 306 and an adaptive low-pass filter module 334. Luminance computation module 306 generates a luminance image based on the received color-space-converted image and provides the luminance image to a black-level-adjustment module 310.

Ambient-contrast-ratio module 308 receives an ambient-illumination indication, a display-reflectivity indication, a peak-luminance indication, and a native-contrast-ratio indication from a perception-characteristic module. The ambient-illumination indication includes an ambient illumination at an intended display device, the display-reflectivity indication includes a reflectivity of the intended display device, the peak-luminance indication includes a peak luminance of the intended display device, and the native-contrast-ratio indication includes a native contrast ratio of the intended display device. Module 308 computes an ambient contrast ratio of the intended display device based on the received indications and provides an ambient-contrast-ratio indication of the computed contrast ratio to black-level-adjustment module 310.

Module 310 generates a black-level-adjusted image based on the received luminance image and the received ambient-contrast-ratio indication. Module 310 then provides the black-level-adjusted image to a DC estimation module 312, a difference module 316, and a global-DC estimation module 326.

DC estimation module 312 generates a DC-estimation image by estimating a respective localized DC for each pixel of the received black-level-adjusted image. Module 312 then provides the DC-estimation image to both the difference module 316 and a contrast-sensitivity-estimation module 318. Difference module 316 generates a difference image based on the received black-level-adjusted and DC-estimation images and provides the difference image to an amplitude estimation module 314.

Module 314 generates an amplitude-estimation image by estimating a respective localized amplitude for each pixel of the received difference image. Module 314 then provides the amplitude-estimation image to contrast-sensitivity-estimation module 318. Module 318 generates a respective contrast sensitivity value for each pixel of the received DC-estimation and amplitude-estimation images and provides the contrast sensitivity values to cutoff-frequency-computation module 320.

A display-size module 322 receives a display-width indication, a display-height indication, a pixel-density indication, and a viewing-distance indication from the perception-characteristic module. The display-width and display-height indications include the width and height of the intended display device, respectively. The pixel-density indication includes a pixel density of the intended receiving device and the viewing-distance indication includes a distance from a display-device user to the intended display device. Module 322 determines an angular size (in degrees) of the intended display device based on the received indications, and provides an angular-size indication of the determined angular size to cutoff-frequency-computation module 320.

A surround-luminance module 324 receives both an ambient-illumination indication and a display-reflectivity indication from the perception-characteristic module, the indications including the ambient illumination at the intended display device and the reflectivity of the intended display device, respectively. Module 324 determines a surround luminance at the intended display device based on the received indications, and provides a surround-luminance indication of the determined surround luminance to cutoff-frequency-computation module 320.

Global-DC module 326 determines an average DC value of the black-level-adjusted image received from module 310. Module 326 then provides a global-DC indication of the determined average DC value to temporal-filter module 328. Module 328 determines a temporally-filtered DC value for the current image based on the received global-DC indication and on a temporally-filtered DC value of a previously-filtered image. Module 328 then provides a temporally-filtered DC indication of the temporally-filtered DC value to peak-luminance module 330.

Module 330 determines a scaled DC value based on the received temporally-filtered DC indication and on a peak-luminance indication received from the perception-characteristic module, the received peak-luminance indication including the peak luminance of the intended display device. Module 330 then provides a scaled-DC indication of the scaled DC value to cutoff-frequency-computation module 320.

Cutoff-frequency-computation module 320 computes a respective cutoff frequency value for each received contrast sensitivity value. The computation is based on (i) an inverse contrast sensitivity function (ii) the received angular-size, surround-luminance, and scaled-DC indications, and (iii) a user-age indication received from the perception-characteristic module, the received user-age indication including an age of a user of the intended display device. Module 320 then provides the computed cutoff frequency values to a frequency-conversion module 332.

Frequency-conversion module 332 takes a value in cycles per degree (CPD), and provides a value in cycles per pixel (CPP) to the adaptive filter. The determination of pixels per degree could be further based on, for example, a number of pixels per degree of the display and/or a viewing distance between a user and display. In an embodiment, the number of cycles per pixel is determined as:

$$CPP = \frac{1}{2 \times D \times \tan\left(\frac{1}{2 \times CPD}\right)}$$

where D is the viewing distance in pixels and CPD is the selected number of cycles per degree.

Adaptive low-pass filter module 334 generates a filtered image based on the color-space-converted image received from color-space conversion module 304 and on the converted cutoff frequency values received from frequency-conversion module 332. Module 334 then provides the filtered image to a second color-space conversion module 336. Module 336 converts the color space of the received filtered image to the original color space (as received by color-space conversion module 304) and outputs a perceptual-pre-filtered image.

2. Example System

Figure 4:
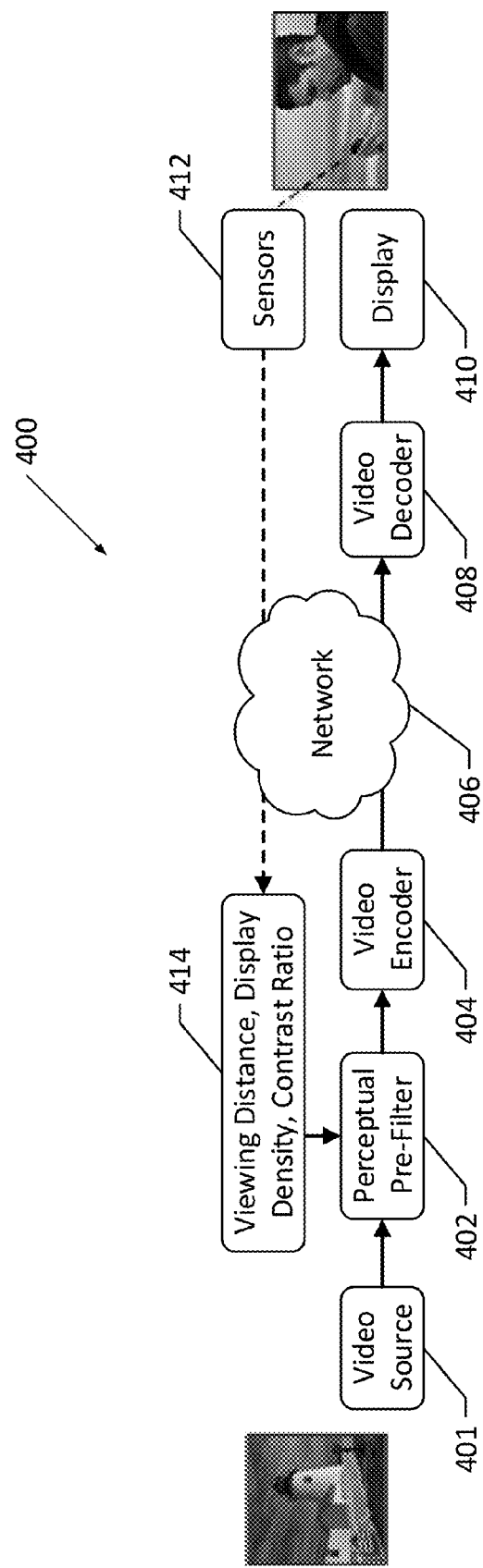
FIG. 4 depicts an example video system architecture employing a perceptual preprocessing filter.

FIG. 4 depicts an example video system architecture 400 employing a perceptual pre-processing filter 402. The perceptual preprocessing filter 402 may be applied to incoming video content—e.g., prior to encoding—and may take the form of any suitable combination of hardware and/or software. In an embodiment, perceptual preprocessing filter 402 takes the form of a graphics processing unit (GPU) that is configured to perform the perceptual-pre-processing functions described herein. In another embodiment, perceptual preprocessing filter 402 takes the form of a hardware appliance that receives a video signal from video source 401. The hardware appliance may receive the signal via a digital video interface (such as a serial digital interface (SDI), a digital visual interface (DVI), and/or a high-definition multimedia interface (HDMI), as examples), a network-communication interface (such as an Ethernet interface or Wi-Fi interface), and/or any other suitable interface (as will be known to those of skill in the art). Perceptual preprocessing filter 402 could take other forms as well.

The pre-processing filter 402 may operate according to one or more inputs pertaining to parameters of a viewing setup, for example a viewing distance for a display of a mobile device (e.g., computed using a front facing camera of the mobile device), a display density of the display, and/or an effective contrast ratio of the display. The parameters may be predetermined (e.g., selected based on one or more typical considerations) or may be dynamically selected (e.g., estimated and communicated back to the encoding system).

A perceptual filter may be used to selectively remove spatial oscillations that may not be visible to an end user, for example, if the perceptual filter is provided with one or more characteristics of a reproduction setup. By removing such oscillations, the perceptual filter may simplify a video signal that may be provided as an input to a conventional video encoder (e.g., a High Efficiency Video Coding (HEVC) encoder, a H.264 encoder, or the like). Simplifying the input video signal may result in lowering a bitrate used to communicate a resulting output video signal (e.g., over one or more channels). Filtering a video signal with a perceptual preprocessing filter and subsequently encoding the video signal may be referred to as viewing-conditions-aware video coding.

Figure 5:
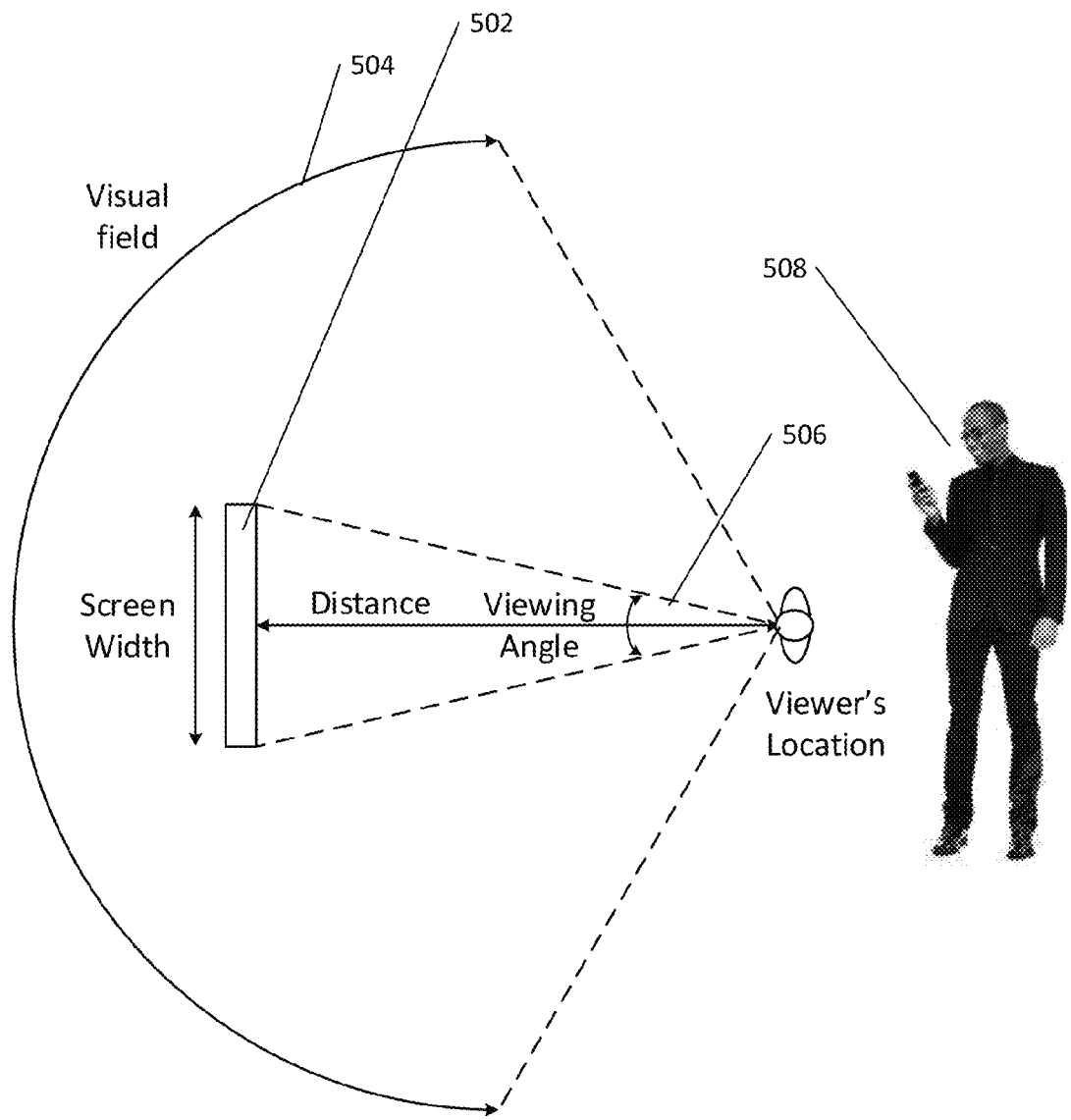
FIG. 5 depicts parameters of an example video viewing setup.

FIG. 5 depicts parameters of an example video viewing setup, e.g., viewing a streaming video on a display 502 of a Wireless Transmit Receive Unit (WTRU). A visual field 504 may be formed by binocular vision, such that the visual field 504 may be approximately one hundred twenty degrees (120°) horizontally. Parameters associated with the illustrated video setup may include one or more of: a display size of the WTRU, a viewing distance to the display 502, a display resolution of the display 502, a display density of the display 502 (e.g., in pixels per inch), and a viewing angle 506 associated with a viewer 508 (e.g., a user of the WTRU). One or more of the parameters may be interrelated. For example, viewing angle may be expressed as $$\text{viewing angle} = 2\tan^{-1}\left(\frac{\text{screen width}}{2 \times D}\right) \quad \text{(eq 4)}$$

Figure 6:
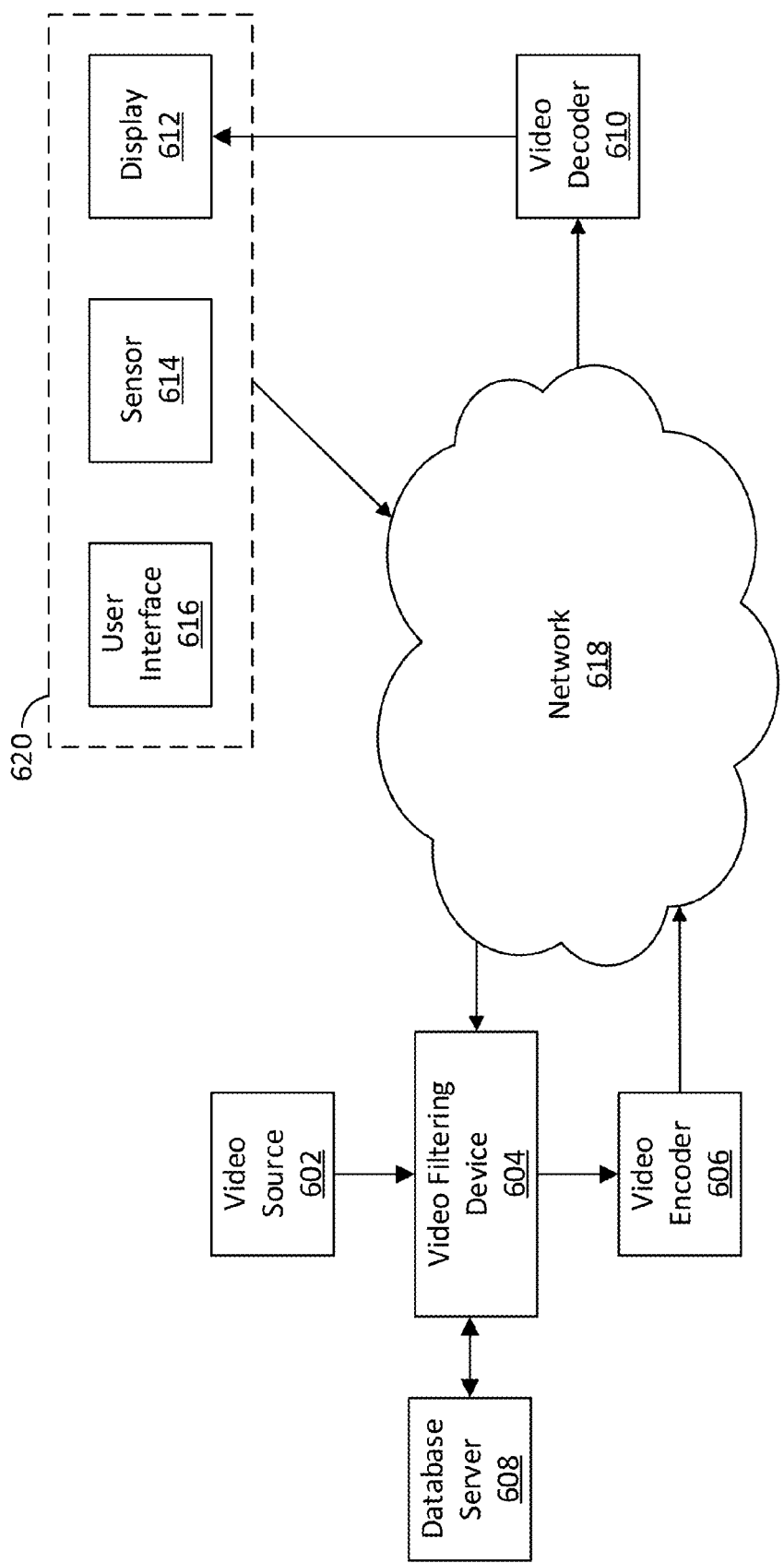
FIG. 6 is a block diagram of a video system.

FIG. 6 is a block diagram of a video system, in accordance with some embodiments. As shown in FIG. 6, video system 600 includes a video source 602, a video filtering device 604, a video encoder 606, a database server 608, a video decoder 610, a display 612, a sensor 614, a user interface 616, a network 618, and a provisioning device 620.

Figure 7:
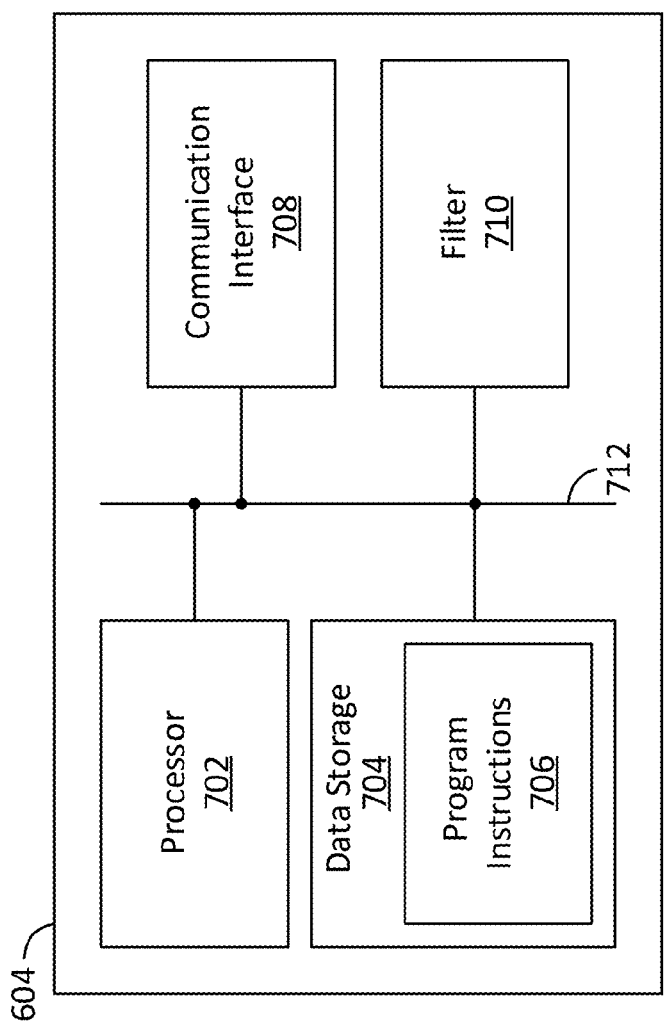
FIG. 7 is a block diagram of a video filtering device.

Video filtering device 604 may be any component capable of performing the video-filtering-device functions described herein. FIG. 7 is a block diagram of an example video filtering device, in accordance with some embodiments. As shown in FIG. 7, video filtering device 604 includes a processor 702, a data storage 704 storing program instructions 706, a communication interface 708, and a filter 710, each of which are interconnected via a system bus 712.

Processor 702 may take the form of (or include) one or more general-purpose processors and/or one or more special-purpose processors, and may be integrated in whole or in part with data storage 704 and/or communication interface 706. Processor 702 could take other forms as well.

In addition to storing program instruction 706, data storage 704 may store characteristic data, database data, and/or user-interface data, among numerous other possibilities. The data storage may take the form of (or include) a non-transitory computer-readable medium such as a hard drive, a solid-state drive, an EPROM, a USB storage device, a CD-ROM disk, a DVD disk, any other non-volatile storage, or any combination of these, to name just a few examples. Program instructions 706 may include machine-language instructions executable by processor 702 to carry out various functions described herein. The data storage and/or program instructions could take other forms as well.

Communication interface 708 may be any component capable of performing the communication-interface functions described herein. The communication interface might facilitate, for example, receiving video frames from video source 602, providing filtered frames to video encoder 606, receiving of a perception message from provisioning device 620, sending a query to and receiving a query response from database server 608, and/or communication with any other entity. The communication interface could take the form of (or include) an Ethernet, Wi-Fi, Bluetooth, and/or universal serial bus (USB) interface, and/or a system bus, among other examples. Those having skill in the art will recognize that communication interface 708 and/or system bus 712 could take other forms as well.

Filter 710 may be any component capable of carrying out the filter functions described herein. As such, filter 710 could take the form of a finite impulse response (FIR) filter, a Lanczos filter, a Gaussian filter, any other analog or digital filter, or any combination of these, among numerous other possibilities.

Referring again to FIG. 6, video source 602 could be any component capable of carrying out the video-source functions described herein. The video source could take the form of (and/or include) a DVD and/or Blu-ray player, a video camera (perhaps incorporated into another device such as a smartphone or tablet computer), and/or a computer of a video-subscription service (such as Netflix® or Hulu®), among numerous other possibilities. The video source may be configured to provide one or more video frames to video filtering device.

Video encoder 606 could be any component capable of carrying out the video-encoder functions described herein. The encoder may be configured to receive a filtered video frame from video filtering device 604. The encoder could encode a received filtered video frame, perhaps by using one or more known video-compression algorithms in accordance with MPEG-2 Part 2, MPEG-4 Part 2, H.264 (MPEG-4 Part 10), Theora, Dirac, RealVideo RV40, VP8, and/or HEVC, among numerous other possibilities. The encoder may be configured to provide an encoded video frame to video decoder 610, perhaps via network 618.

Database server 608 may be any component capable of carrying out the database-server functions described herein. The database server may be configured to receive a search query from video filtering device 604 and to provide a query response to the video filtering device.

Video decoder 610 could be any component capable of carrying out the video-decoder functions described herein. The decoder may be configured to receive an encoded video frame from video encoder 606, perhaps via network 618. The decoder may decode a received encoded video frame perhaps by using one or more of the video-compression algorithms described above. The encoder may be configured to provide a decoded video frame to display device 612.

Display 612 may be any component capable of carrying out the display functions described herein. The display may include a display such as a cathode ray tube (CRT) display, a light-emitting diode (LED) display, a plasma display, a liquid crystal display (LCD), a thin-film transistor (TFT) display, and/or an organic light-emitting diode (OLED) display, among numerous other possibilities. The display device could take the form of a television, a computer monitor, a smartphone, and/or a tablet computer, among numerous other possibilities. The display device may be configured to receive a decoded video frame from video decoder 610 and to present the received decoded video frame via the display. The display device could provide provisioning device 620 with a display characteristic such as a display reflectivity, a display maximum luminance, and/or a display native contrast ratio.

Figure 8:
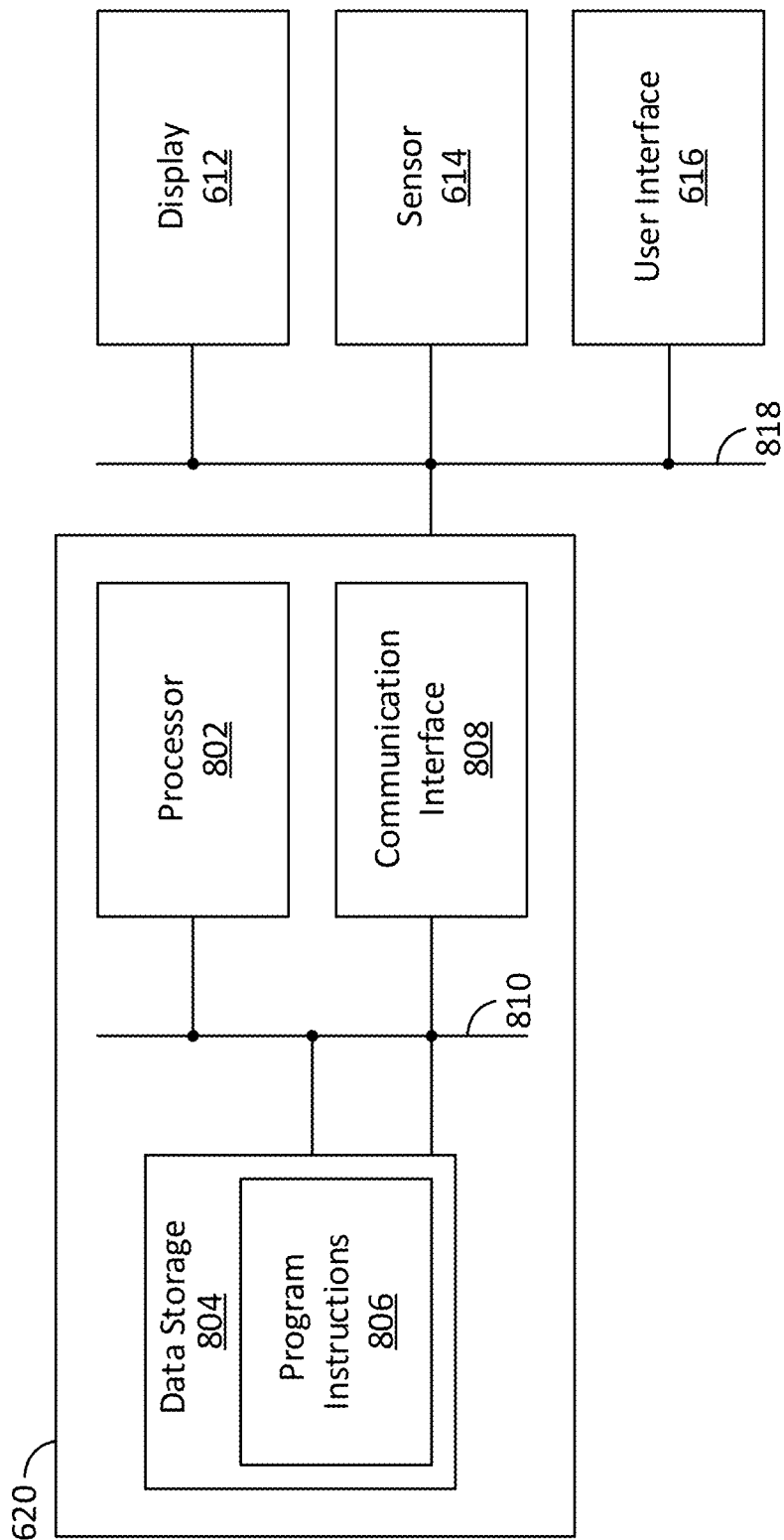
FIG. 8 is a block diagram of a provisioning device.

Provisioning device 620 may be any component capable of carrying out the provisioning-device functions described herein. FIG. 8 is a block diagram of provisioning device 620, in accordance with some embodiments. As shown, provisioning device 620 includes a processor 802, a data storage 804 storing program instructions 806, and a communication interface 808, each of which are interconnected via a system bus 810. Each of these may function as described above with reference to FIG. 7.

As shown in FIG. 8, provisioning device 320 may be communicatively linked, via communication link 818, with one or more of a display 612, a sensor 614, and/or a user interface 616. As another possibility, any one or more of the display, sensor, and user interface could be incorporated into the provisioning device.

Sensor 614 may be any component capable of carrying out the sensor functions described herein. The sensing device could be configured to detect one or more viewing conditions at display device 612. The detected viewing condition could be a viewing distance from a display user to display 612 and/or a luminance of ambient light at the display device, among numerous other possibilities.

User interface 616 may be any component capable of carrying out the user-interface-device functions described herein. The user interface could include or incorporate a keyboard, a mouse, and/or a display (such as display 612). The user interface device could obtain a user characteristic (such as an age of a display-device user of display device 612).

The provisioning device may be configured to obtain a perception characteristic from, e.g., display 612, sensing 614, user-interface 616, and/or data storage 804, among other possibilities. The provisioning device may provide the obtained perception characteristic to video filtering device 604.

It should be understood that any one or more of the entities of video system 600 could be combined with and/or incorporated into any other entity or entities of the video system. For example, video filtering device 604 could be combined with video encoder 606, and/or video decoder 610 may be combined with display 612. Any one or more of display 612, sensor 614, and user-interface device 616 could be combined into one component.

Figure 9:
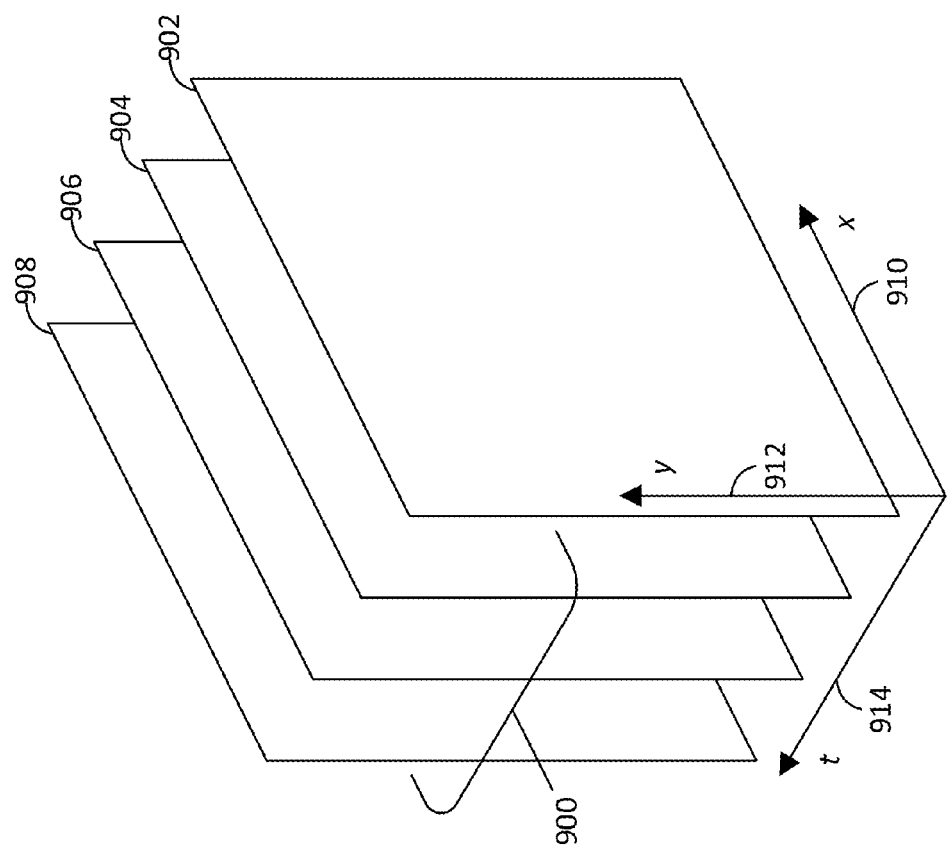
FIG. 9 illustrates a video stream.

FIG. 9 illustrates a video stream, in accordance with exemplary embodiments. As shown in FIG. 9, video stream 900 includes a plurality of video frames 902 through 908. The video stream is three dimensional along a spatial x-axis 910 and y-axis 912, and along a temporal t-axis 914.

Figure 10:
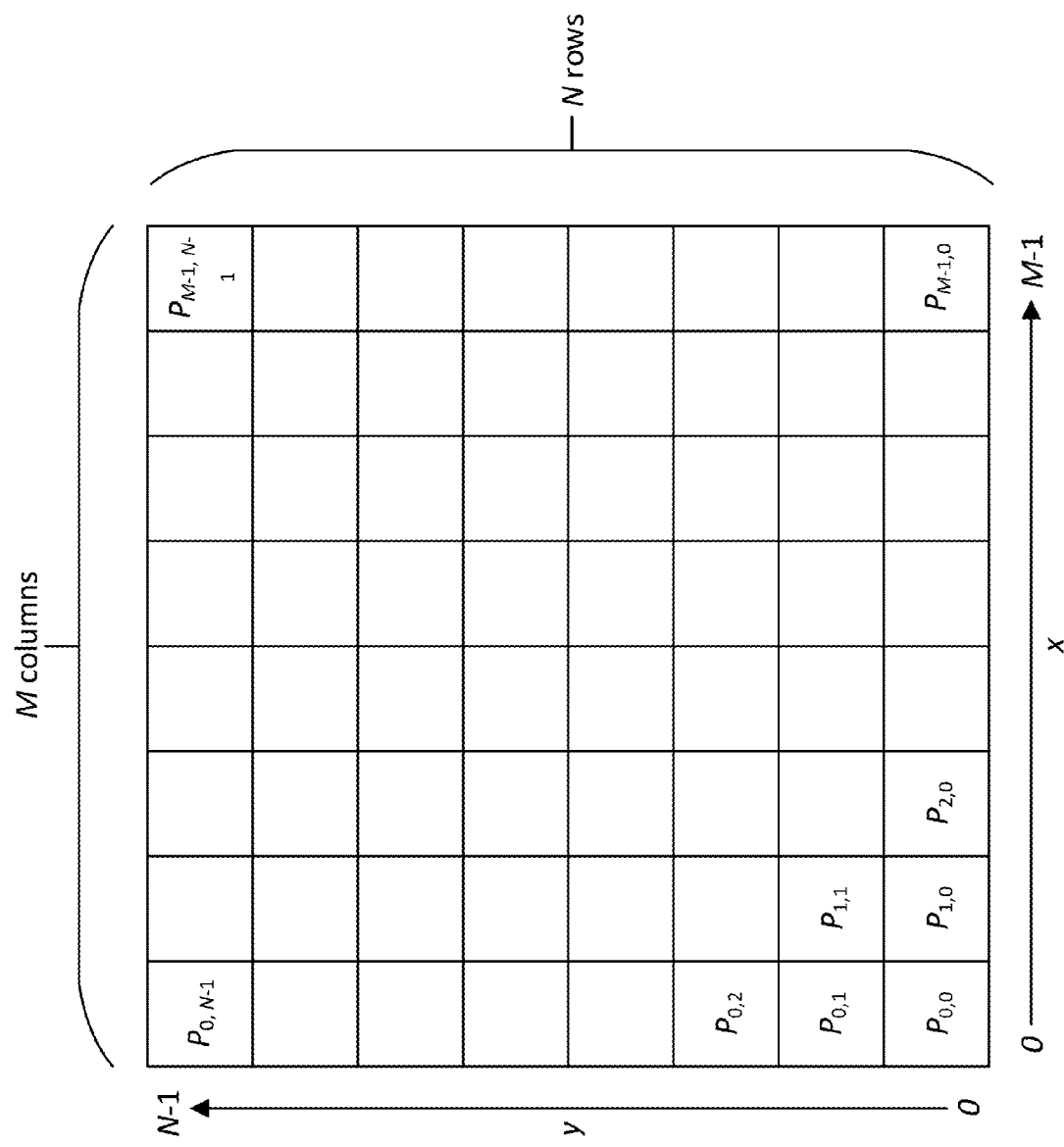
FIG. 10 illustrates a video frame.

FIG. 10 illustrates a video frame, in accordance with exemplary embodiments. As shown in FIG. 10, video frame 902 includes N rows of pixels and M columns of pixels. An x-axis and y-axis extend horizontally and vertically respectively along the video frame. Each pixel $P_{0,0}$ to $P_{M-1,N-1}$ in the video frame may be referenced as $P_{x,y}$ where x and y are replaced with the respective x and y values. Each pixel may have one or more corresponding values, perhaps indicating a luminance, a chrominance, a color, or other value of the pixel.

3. Example Operation 3.1. Receive Video Frames

Figure 11:
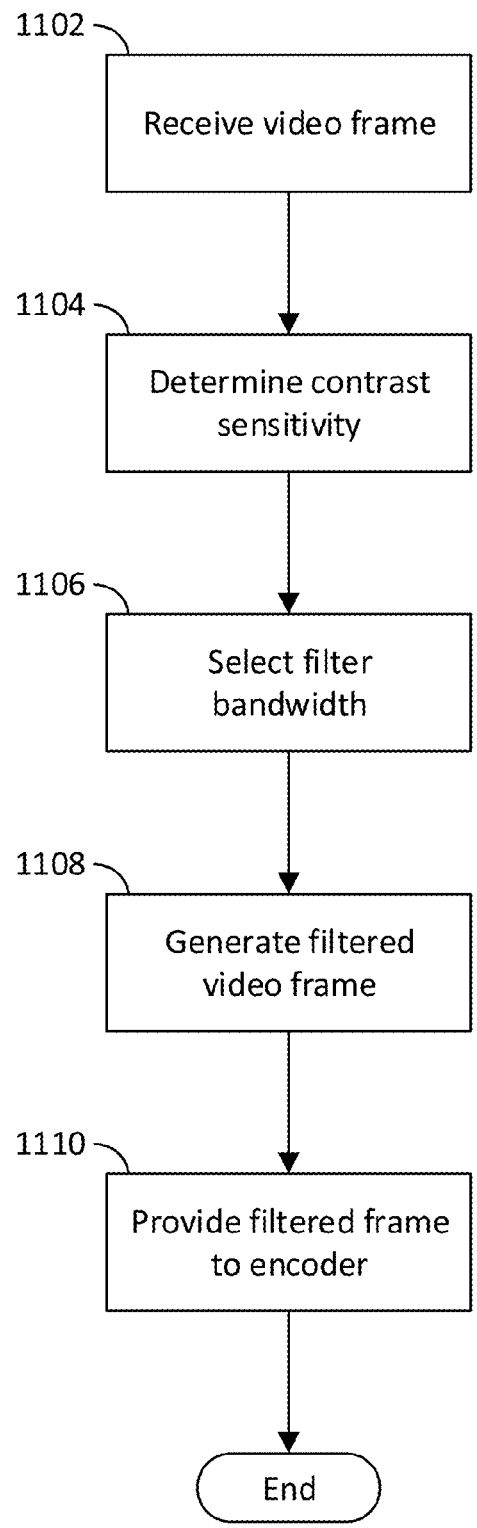
FIG. 11 is a flowchart of a method.

FIG. 11 is a flowchart of a method, in accordance with exemplary embodiments. As shown in FIG. 11, method 1100 begins at step 1102 with video filtering device 604 receiving a plurality of video frames 902 through 908. In an embodiment, each frame has a plurality of pixels $P_{0,0}$ to $P_{M-1,N-1}$. FIGS. 12A-12G illustrate an example input video and/or image in various states during an example preprocessing process employing a perceptual filter. FIG. 12A illustrates the input video and/or image as it may be received (e.g., in full color).

3.2. Determining Localized Contrast Sensitivity 3.2.1. Changing Color Space

At step 1104, video filtering device 604 determines a respective localized contrast sensitivity $CS_{x,y}$ for each pixel $P_{0,0}$ to $P_{M-1,N-1}$. Determining a respective localized contrast sensitivity $CS_{x,y}$ may involve changing a color space of the video frame. The input video and/or image may be converted to a linear space. For example, if the input video and/or image is in YUV 4:2:0 format, the input video and/or image may be converted to the gamma-domain RGB color space using color conversion matrices, for example, based on whether the YUV input was generated using the ITU-Rec, BT.601, BT.709, and/or SMPTE 240 standards. The gamma-domain RGB may be converted to a linear RGB frame, for example, by applying an inverse-gamma operation. For an input video and/or image in AVI, BMP, or PNG format, an sRGB image may be extracted from the input video and/or image, and a degamma operation may be applied to the input video and/or image to generate a linear RGB frame. Other color-space changes are possible as well.

3.2.2. Obtaining a Perception Characteristic

The determination of the respective contrast sensitivity $CS_{x,y}$ may be based at least in part on at least one perception characteristic. In an embodiment, the perception factor is selected from a group consisting of a display characteristic of display 612, a viewing condition at display 612, and a user characteristic of a user of display 612. A display characteristic of the receiving device could be, for example, a pixel density of the display 612, a height and/or width of display 612, a native contrast ratio of display 612, and/or a reflectivity of display 612. The viewing condition could be an ambient illumination at display 612 and/or a distance between a user and display 612 (referred to as a "viewing distance"), among other possibilities. The user characteristic could be an age and/or any other characteristic of a user. A summary list of example perception characteristics are listed in Table 1.

TABLE 1

| Viewing condition | Display characteristic | User characteristic |
|---|---|---|
| Ambient illumination | Pixel density | User age |
| Viewing distance | Display height | Visual Acuity |
| | Display width | |
| | Native contrast ratio | |
| | Display reflectivity | |

The display characteristic, viewing condition, and/or user characteristic could take other forms as well, and the perception characteristic could include other types of characteristics not expressly listed above.

The perception characteristic might be obtained via communication interface 708 of video filtering device 604. The obtained characteristic could be an analog signal such as a current or voltage of a photodiode. As another possibility, the obtained perception characteristic might be represented in a digital format. For example, a display height of 32 inches may be received in binary format as 00100000. The obtained digital-format perception characteristic might be encapsulated in a datagram such as an IP packet, among other possibilities.

In an embodiment, the perception characteristic is obtained from provisioning device 620. In another embodiment, obtaining the perception characteristic involves receiving perception information (other than a perception characteristic) from provisioning device 620. The perception information could be, for example, a username, a device serial number, device model number, etc. Upon receiving the perception information, video filtering device 604 may send a query, based at least in part on the received perception information, to database server 608.

In response to receiving the query, the database server selects a perception characteristic associated with the received query. For example, the database may store one or more model or serial numbers and one or more perception characteristics in association with each model or serial number. In some embodiments the database may determine a model number based upon the serial number. Upon receiving a query based on a given model or serial number, the database server selects, for example, a pixel density, a height and width, and/or a reflectivity of a device associated with the given number. If the server receives a query based on a username, the database server might select an age of a user associated with the username. After selecting a perception characteristic based on the received query, the database server may send the selected perception characteristic to video filtering device 604. Video filtering device 604 may receive the perception characteristic from database server 608 and determine the respective localized contrast sensitivity based on the received perception characteristic.

Those having skill in the art will recognize that the perception characteristic may take other forms as well, and that other methods of obtaining the perception characteristic are possible.

3.2.3. Adjusting Black Levels

Determining a respective localized contrast sensitivity $CS_{x,y}$ in some embodiments may involve adjusting a black level of each pixel $P_{0,0}$ to $P_{M-1,N-1}$. A black level adjustment may be performed on the example input video and/or image. A normalized luminance component may be extracted from the linear RGB frame, for example, having a range of [0, 1]. Black color on a display may not correspond to an illuminance measurement of zero, and may instead have a positive value, for example, due to one or more characteristics of the display. To account for a disparity between illuminance of black on a display and an actual black pixel value, a black level adjustment may be applied to the luminance frame. A contrast ratio $C_d$ of the display may be expressed as $$C_d = \frac{\text{luminance of white}}{\text{luminance of black}} \quad \text{(eq 5)}$$

A reciprocal α may be defined as $\alpha = 1/C_d$. A black level adjustment may be performed, for example, by applying the following operation on luma components x:

$$y = \alpha + (1-\alpha)x \quad \text{(eq 6)}$$

FIGS. 12B and 12C depict a normalized luma component and a black level adjusted luma component of the example input video and/or image, respectively.

Figure 13:
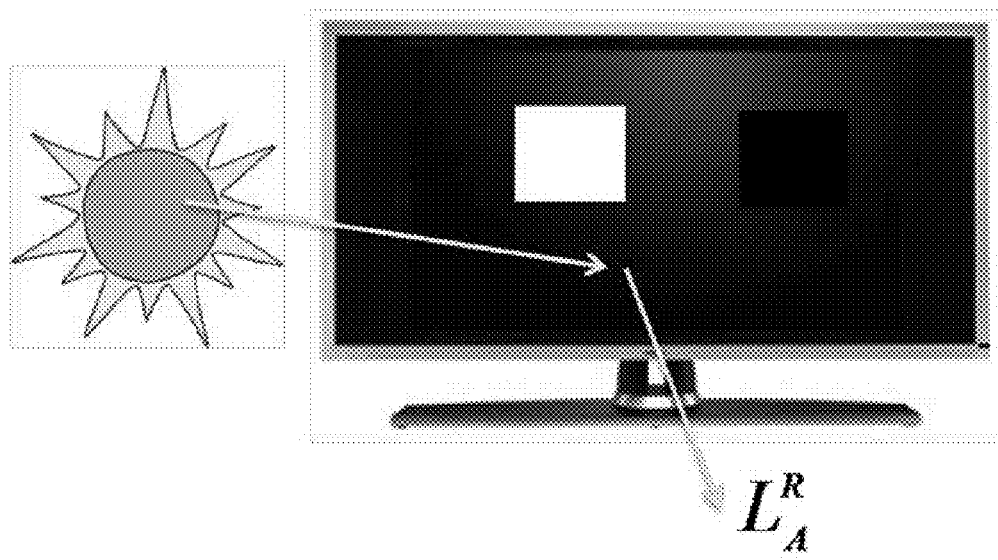
FIG. 13 is a diagram illustrating reflection of ambient light.

The contrast ratio that may characterize a display may be measured in the dark and may be referred to as the native contrast ratio of the display. In the presence of ambient light, the display surface may reflect a portion of light that may add to both the white and black luminance levels, as shown in FIG. 13. The contrast ratio may be reduced as a result. The contrast ratio that may be used for the black level adjustment may be a function of an estimate of the ambient illumination I(a) (e.g., in lux), an estimate of the display reflectance (e.g., expressed as a percentage, e.g., 4% Rd), the luminance W of display white in the absence of ambient light, and/or the native contrast ratio CR0. The ambient contrast ratio may be computed as $$CR(a) = \frac{\text{luminance of white}}{\text{luminance of black}} = \frac{W + \frac{Rd}{\pi}I(a)}{\frac{1}{CR0}W + \frac{Rd}{\pi}I(a)} = \frac{1 + \frac{Rd}{\pi L}I(a)}{\frac{1}{CR0} + \frac{Rd}{\pi L}I(a)} \quad \text{(eq 7)}$$

where the value of $L_A^R$ shown in FIG. 13 may be given by $$L_A^R = \frac{Rd}{\pi}I(a).$$

The factor of π may convert lux to cd/m² units.

Figure 14A:
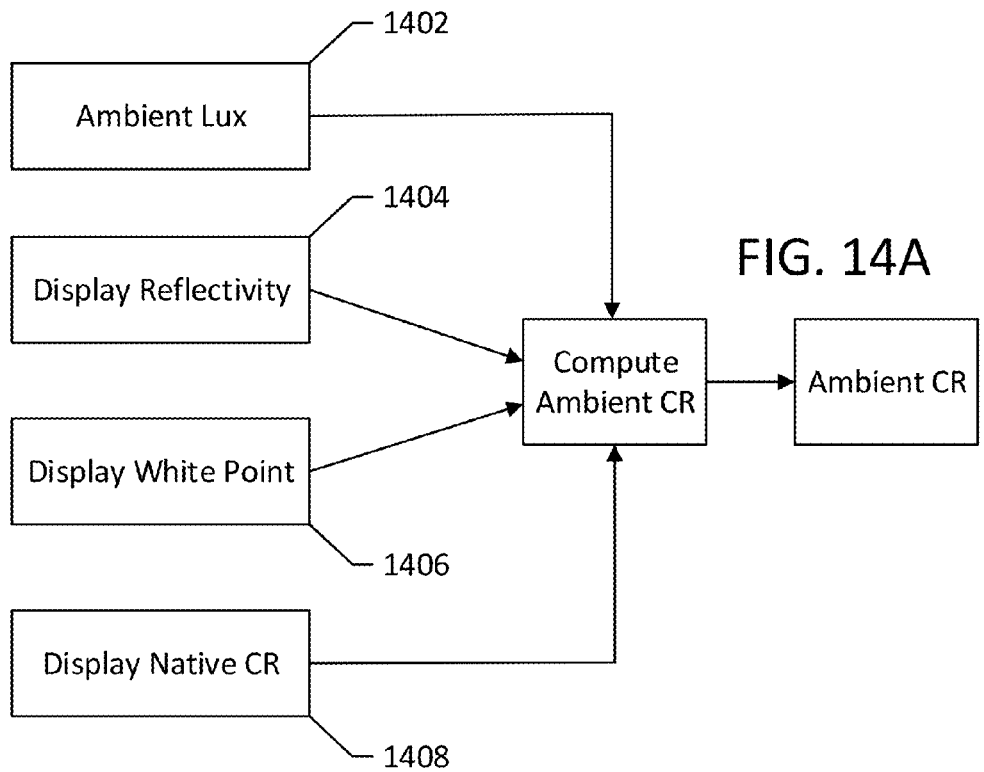
FIG. 14A is a diagram illustrating example inputs to an ambient contrast ratio calculation.

The ambient illumination may be supplied by a sensor on the display device or may be estimated, for example, from the time of day. The luminance of white may be determined by the relative display brightness and peak brightness. The native contrast ratio and display reflectance values may be determined by display specifications or by assuming typical values, e.g., CR0=1000 and Rd=4%. FIG. 14A is a block diagram illustrating example inputs ambient lux 1402, display reflectivity 1404, display white point 1406, and display native CR 1408 to an ambient contrast ratio calculation.

Returning to method 1100 of FIG. 11, the determination at step 1104 may involve adjusting a black level for each pixel $P_{0,0}$ to $P_{M-1,N-1}$ and determining the respective localized contrast sensitivity for each black-level-adjusted pixel. In an embodiment, the adjustment of the black level for each pixel is based on an ambient contrast ratio $C_1$ of display 612. Adjusting the black level for each pixel based on the ambient contrast ratio may include video filtering device 604 obtaining at least one perception characteristic selected from the group consisting of an ambient illuminance at display 612, a reflectivity of display 612, a peak luminance of display 612, and a native contrast ratio of display 612. The video filtering device may determine an ambient contrast ratio $C_1$ based on (at least) the at least one obtained perception characteristic as described above. The video filter may then adjust the black level for each pixel based on the determined ambient contrast ratio $C_1$ as previously described. In an embodiment, adjusting the black level of each pixel based on the determined ambient contrast ratio $C_1$ includes determining an adjusted value $P_{x,y}^A$ of a respective pixel value as:

$$P_{x,y}^A = \frac{1}{C_1} + \left(1 - \frac{1}{C_1}\right) P_{x,y} \qquad (\text{eq 8})$$

where $P_{x,y}$ is the value of the respective pixel.

3.2.4. Estimate Sensitivity

Respective localized contrast sensitivity $CS_{x,y}$ for respective pixel $P_{x,y}$ may be based, at least in part, on the respective values of pixels within a respective localized region $R_{x,y}$ around pixel $P_{x,y}$. In some embodiments $CS_{x,y}$ may also (or instead) be based at least in part on at least one perception factor. Selection of pixels for inclusion in $R_{x,y}$ may be based on the at least one perception factor. The at least one perception factor could be, for example, a viewing condition at display 612, a display characteristic of the display, and/or a user characteristic of a display user, among other possibilities explained below.

3.2.4.1. Estimating Sensitivity on a Ratio of a Local Average to a Local Peak Amplitude Contrast sensitivity may be estimated (e.g., on a per-pixel basis). For example, for each input pixel in a location (i,j) (which may also be referred to herein using the coordinates (x,y)), contrast sensitivity may be computed by taking a ratio of the respective DC and amplitude (e.g., computed as described herein) that may be expressed as $$CS_{ij} = \frac{DC_{ij}}{amplitude_{ij}} \qquad (\text{eq 9})$$

In an embodiment, the determination at step 1104 involves determining both a respective DC (or "local average") $DC_{x,y}$ and a respective amplitude (or "local peak amplitude") $A_{x,y}$ for each pixel $P_{0,0}$ to $P_{M-1,N-1}$. Either or both of the respective local average $DC_{x,y}$ and the respective local peak amplitude $A_{x,y}$ for a respective pixel $P_{x,y}$ may be based on the values of the pixels within the respective localized region $R_{x,y}$.

Figure 15:
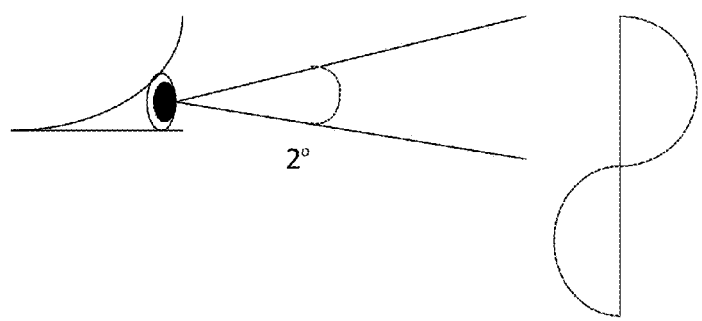
FIG. 15 depicts an example of a number of cycles in a field of vision of a fovea for perception of DC.

A DC of the black level adjusted luma component of the example input video and/or image may be estimated, for example, by applying a Gaussian low pass filter expressed as $$h_1[m] = \frac{1}{\sqrt{2\pi}\sigma} \exp\left(-\frac{m^2}{2\sigma_1^2}\right); \; -N \leq m \leq N \qquad (\text{eq 10a})$$

$$N = \lfloor 3\sigma_1 + 0.5 \rfloor \qquad (\text{eq 10b})$$

where the bracketed operation in the latter formula ($\lfloor . \rfloor$) may represent a floor operation and $\sigma_1$ may be the standard deviation. The choice of $\sigma_1$ may be based on human visual acuity, for example. A fovea in a human eye may see about two degrees of visual field as depicted in FIG. 15. If the input were a sinusoid grating, the DC may correspond to a maximum of half a cycle in the field of view of a fovea. A maximum cutoff frequency for a low pass filter may be expressed as $$f_c = \frac{\frac{1}{2} \text{ cycle}}{2 \text{ degrees}} = \frac{1}{4} CPD \qquad (\text{eq 11})$$

For example, a 3 dB cutoff frequency=½ CPD may be chosen. $DC_{i,j}$ may represent a DC value at location (i,j). FIG. 12D depicts a DC estimate corresponding to the example input video and/or image after low pass filtering using a cutoff frequency=½CPD.

Figure 16A:
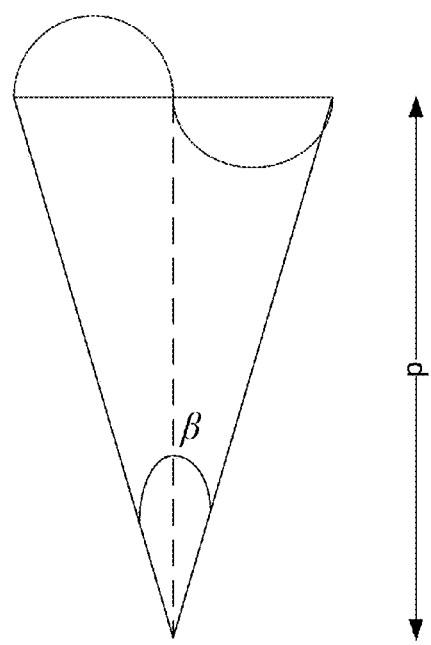
FIG. 16A depicts an example cycles-per-degree to cycles-per-pixel conversion.

The cutoff frequency in CPD may be converted to cycles-per-pixels and an associated $\sigma_1$ may be computed. In converting the cutoff frequency in CPD to cycles-per-pixels, n may be a number of pixels in one cycle, d may be a viewing distance in a number of pixels, and β may be a viewing angle in degrees per cycle, as depicted in FIG. 16. The viewing distance in pixels may be represented as viewing distance (pixels)=viewing distance (inches)× display pixel density (pixels per inch) (eq 12)

Figure 2B:
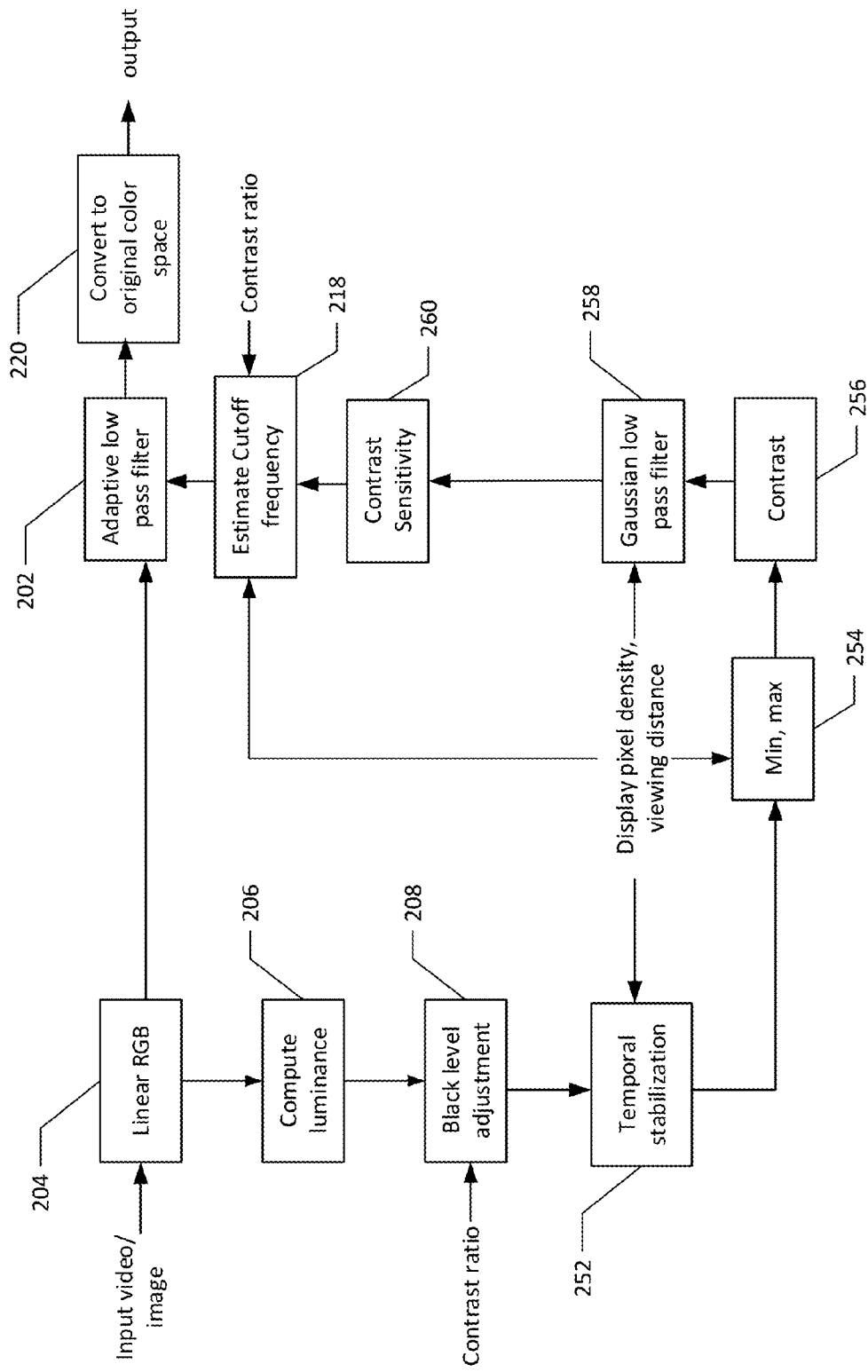
FIG. 2B is a block diagram of perceptual filter that computes contrast using the Michelson's contrast formula, and performs temporal stabilization that reduces temporal fluctuations of contrast and associated cutoff frequency maps in static regions of a video.

Both viewing distance and display pixel density may be input parameters to the perceptual filter 202 or 302, for example as depicted in FIG. 2A, FIG. 2B, or FIG. 3.

FIG. 16 may yield the following relationship $$\tan\left(\frac{\beta}{2}\right) = \frac{\left(\frac{n}{2}\right)}{d} \qquad (\text{eq 13})$$

Since β may be the number of degrees per cycle, the frequency in cycles-per-degree may be cpd=1/β. The above equation (19) may be expressed as $$\tan\left(\frac{\frac{1}{cpd}}{2}\right) = \frac{\left(\frac{n}{2}\right)}{d} \qquad (\text{eq 14})$$

This equation (20) may be expressed as $$\tan\left(\frac{\frac{1}{cpd}}{2}\right) = \frac{\left(\frac{\text{pixels-per-cycle}}{2}\right)}{\text{viewing distance}} \qquad (\text{eq 15})$$

$$\therefore \text{cycles-per-pixel} = \frac{1}{2 \times \text{viewing distance} \times \tan\left(\frac{1}{2cpd}\right)} \qquad (\text{eq 16})$$

The cutoff frequency may be computed from a. For example, equation (21) may be used to derive the cut-off frequency in cycles-per-pixel. A formula to compute $\sigma_1$ from the cut-off frequency $f_c$ in cycles-per-pixel may be derived. A discrete Fourier transform may be applied to equation (16) to obtain a frequency response, given by $$H(f) = e^{-2\pi^2 \sigma_1^2 f^2} \quad \text{(eq 17)}$$

At 3 dB cutoff frequency $f_c$, $$H(f_c) = e^{-2\pi^2 \sigma_1^2 f_c^2} = \frac{1}{\sqrt{2}} \quad \text{(eq 18)}$$

$$\therefore \sigma_1 = \frac{0.1325}{f_c} \quad \text{(eq 19)}$$

Figure 18:
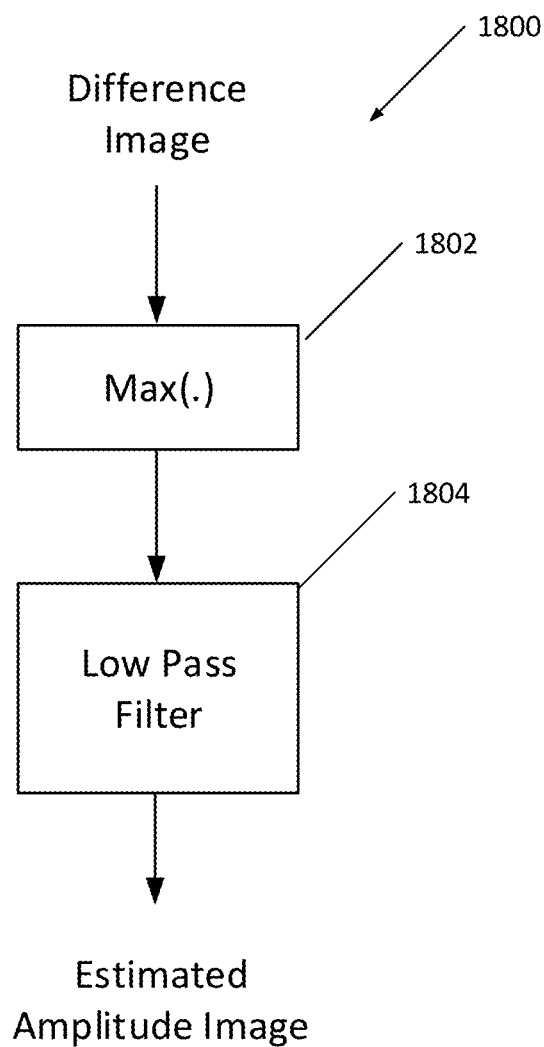
FIG. 18 depicts an example process flow for amplitude envelope estimation.

FIG. 18 depicts an example process flow 1600 for amplitude envelope estimation. At 1602, an absolute difference between the estimated DC and the luma image may be computed to obtain a difference image. A max filter may be applied to the difference image by finding the maximum value within a sliding window of size 11×11 pixels, for example. The max filter may estimate an envelope of the difference image. The difference image may be smoothed at 1604 using a Gaussian low pass filter, for example, that is similar to equation (16), to yield an estimated amplitude envelope image.

For example, Gaussian low pass filter parameters $\sigma$ and N may be computed as follows, $$\sigma = 0.1325 \times 2 \times (2.5 N_2 + 1) \quad \text{(eq 20a)}$$

$$N = [3\sigma + 0.5] \quad \text{(eq 20b)}$$

where $N_2 = 4$. The amplitude envelope estimate at location (i,j) may be represented by amplitude$_{i,j}$. FIG. 12E depicts an amplitude envelope estimate corresponding to the example test image depicted in FIG. 12A.

Figure 17:
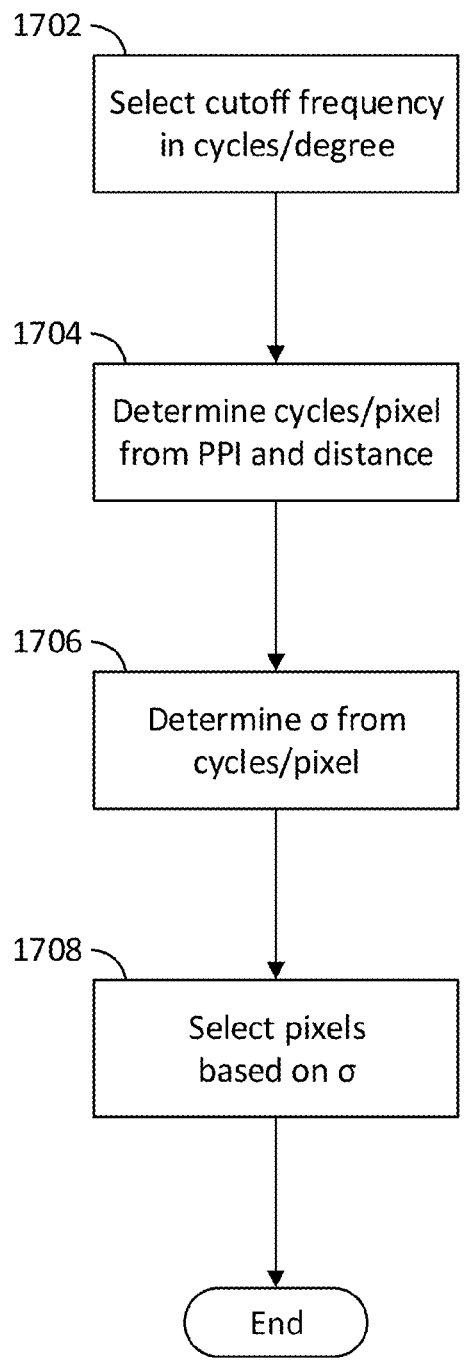
FIG. 17 is a flowchart of a method for selecting pixels for inclusion in a respective localized region.

FIG. 17 is a flowchart of a method of selects pixels for inclusion in $R_{x,y}$, in accordance with some embodiments. As shown in FIG. 17, method 1700 begins at step 1702 with video filtering device 604 selecting a number of cycles per degree as a cutoff frequency. In an embodiment, the selected cycles per degree is ¼ or ½. Those having skill in the art will recognize that other cutoff frequencies may also be selected without departing from the scope of the claims.

At step 1704, video filtering device 604 determines a number of cycles per pixel based on the number of cycles per degree. The determination of pixels per degree could be further based on, for example, a number of pixels per degree of display 612 and/or a viewing distance between a user and display 612. In an embodiment, the number of cycles per pixel is determined as:

$$CPP = \frac{1}{2 \times D \times \tan\left(\frac{1}{2 \times CPD}\right)} \quad \text{(eq 20c)}$$

where D is the viewing distance in pixels and CPD is the selected number of cycles per degree.

At step 1706, video filtering device 604 determines a standard deviation $\sigma_1$ of a Gaussian filter based on the determined number of cycles per pixel. In an embodiment, the standard deviation $\sigma_1$ is determined as:

$$H(f) = e^{-2\pi^2 \sigma_1^2 f^2} \quad \text{(eq 21)}$$

where f is the determined number of cycles per pixel.

At step 1708, video filtering device 604 selects pixels for inclusion in $R_{x,y}$ based at least in part on the value of standard deviation $\sigma_1$. In an embodiment, video filtering device 604 selects pixels bounded by $P_{x-N,y-N}$, $P_{x-N,y+N}$, $P_{x+N,y-N}$, $P_{x+N,y+N}$ for inclusion in $R_{x,y}$ around $P_{x,y}$, where the value of N is based at least in part on the value of standard deviation $\sigma_1$. In an embodiment, $N = [3\sigma_1 + 0.5]$. Those having skill in the art will recognize that other values of N may be used instead without departing from the scope of the claims.

In some embodiments, video filtering device 604 may select pixels bounded by $P_{x-N,y-N}$, $P_{x-N,y+N}$, $P_{x+N,y-N}$, $P_{x+N,y+N}$ for inclusion in $R_{x,y}$ where N is a predetermined value. In an embodiment, N=9. Other values of N are possible as well.

In an embodiment, respective localized region $R_{x,y}$ includes a respective localized DC region $R^{DC}_{x,y}$ and a respective localized amplitude region $R^{A}_{x,y}$. Video filtering device 604 determines the respective local average $DC_{x,y}$ based at least in part on the values of the pixels within respective localized DC region $R^{DC}_{x,y}$ and determines the respective local peak amplitude $A_{x,y}$ based at least in part on the values of the pixels within respective localized amplitude region $R^{A}_{x,y}$. The set of pixels in $R^{DC}_{x,y}$ may or may not be same as the set of pixels in $R^{DC}_{x,y}$.

In an embodiment, the respective local average $DC_{x,y}$ for a respective pixel $P_{x,y}$ is determined as the average of the values of the pixels in $R^{DC}_{x,y}$. In an embodiment, video filtering device 604 selects pixels bounded by $P_{x-N,y-N}$, $P_{x-N,y+N}$, $P_{x+N,y-N}$, $P_{x+N,y+N}$ for inclusion in $R_{x,y}$ around $P_{x,y}$, where $N=[3\sigma_1+0.5]$. Other measures of central tendency (e.g., median, mode) or any other means may be used to determine the respective local average $DC_{x,y}$.

In an embodiment, determining the respective local peak amplitude $A_{x,y}$ for a respective pixel $P_{x,y}$ involves video filtering device 604 determining a respective absolute difference value $D_{x,y} = |P_{x,y} - DC_{x,y}|$ for each for each pixel $P_{0,0}$ to $P_{M-1,N-1}$. The video filtering device then selects the maximum of the determined respective absolute difference values for the pixels in a respective window $R^{W}_{x,y}$ around the respective pixel by using a "max" filter that selects a respective localized maximum value $D^{max}_{x,y}$ for respective pixel $P_{x,y}$ from among the pixels within a sliding window respective window $R^{W}_{x,y}$. In one embodiment, respective window $R^{W}_{x,y}$ is an 11×11 region of pixels.

In an embodiment, video filtering device 604 applies a Gaussian filter to each respective localized maximum value $D^{max}_{x,y}$ for respective pixel $P_{x,y}$ based at least in part on the values of pixels within respective localized amplitude region $R^{A}_{x,y}$ around $P_{x,y}$. Video filtering device 604 selects pixels bounded by $P_{x-N,y-N}$, $P_{x-N,y+N}$, $P_{x+N,y-N}$, $P_{x+N,y+N}$ for inclusion in $R^{A}_{x,y}$ around $P_{x,y}$, where N=9 for example. The video filtering device selects the respective filtered value $D^{max}_{x,y}$ as the respective local peak amplitude $A_{x,y}$ for respective pixel $P_{x,y}$.

3.2.4.2. Estimating Sensitivity Using Temporal Stabilization

In some embodiments temporal stabilization is applied to the black level adjusted luma image in order to mitigate the effect of noise on the cutoff frequency map generated at a later stage in the pre-filter. One such approach is illustrated in FIG. 2B, which depicts various functional modules of an adaptive filtering apparatus. Video may contain noise in flat static regions of a frame, which can manifest as temporal variation of pixel values. Although these pixel fluctuations may not be visible, they may cause temporal fluctuations in contrast and cutoff frequency maps that result in temporal variation of filtering strength across static regions of a video. This can mislead a video encoder used to compress a pre-filtered video to identify these static regions as regions containing motion, thereby resulting in either higher bitrates or lower peak signal-to-noise ratio (PSNR) at fixed bitrates.

As shown in FIG. 2B, a temporal stabilization module 252 performs temporal stabilization on a black level adjusted luma image generated by black-level-adjustment module 208.

Figure 14B:
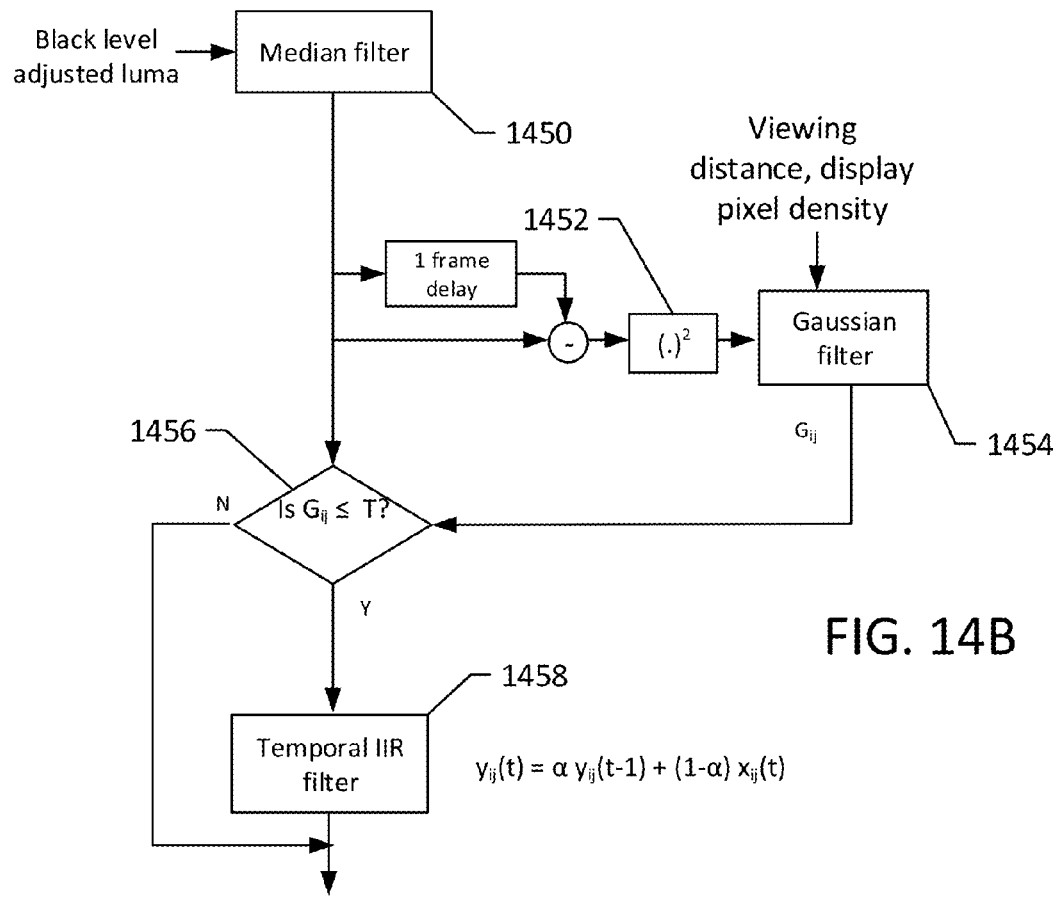
FIG. 14B is a block diagram of temporal filtering.

FIG. 14B depicts a flowchart of a method of applying temporal stabilization to a black level adjusted luma image to mitigate the effect of temporally varying noise in static regions of a video. As shown, at step 1450, video filtering device 604 applies a median filter to the black level adjusted luma image to spatially de-noise (i.e., remove spatial noise in) the video. The median filter could be of size 3×3, 5×5, and/or 7×7, among other possibilities. The choice of size of the median filter provides a tradeoff between computational complexity of the pre-filter and coding gain provided by video filtering device 604.

At step 1452, video filtering device 604 generates a difference image by computing an absolute difference square (i.e., the square of the difference) between current and past median filtered frames as follows $$d_{ij}(t)=(x_{ij}(t)-x_{ij}(t-1))^2 \qquad \text{(eq 22a)}$$

$$x_{ij}(t)=0; t<0 \qquad \text{(eq 22b)}$$

where $x_{ij}(t)$ is the median filtered pixel at location (i,j) at time instant t.

Figure 16B:
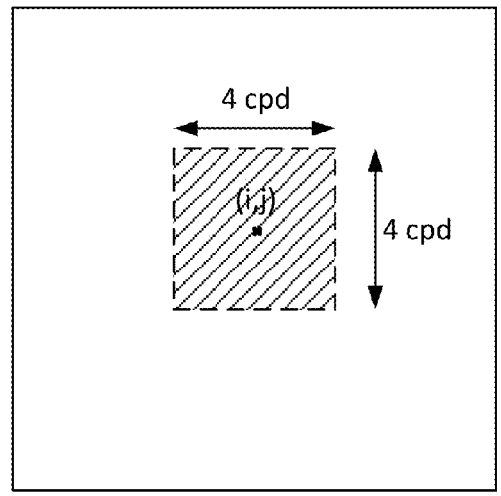
FIG. 16B depicts a search window centered around the pixel location (i,j), and may be used for finding local min and max values at location (i,j).

At step 1454, video filtering device 604 applies a Gaussian low pass filter to the difference image, which may dampen isolated pixels with large values (most of which may occur due to temporal noise). In one embodiment, a Gaussian filter of length 4 cpd is applied in both horizontal and vertical directions of the difference image to obtain respective Gaussian-filtered values $G_{i,j}$ for the pixels. A length in cpd may be obtained based on a pixel density and a viewing distance (among other factors), as described with reference to equations 12-20 above, for example. An example of a 4 cpd Gaussian filter is depicted in FIG. 16B, which is discussed in additional detail below.

At step 1456, video filtering device 604 determines that the Gaussian-filtered value $G_{i,j}$ of a given pixel exceeds a threshold T. In an embodiment, $T=(10^{-3})^2=10^{-6}$. A large threshold may significantly suppress temporal fluctuations, but may also introduce undesirable trailing artifacts in regions of actual motion in the cutoff frequency map. To minimize the introduction of such artifacts, video filtering device 604 in some embodiments may heuristically determine, using a set of test videos, a threshold T that reduces temporal fluctuations in static regions while also mitigating trailing artifacts.

At step 1458, and in response to making the determination at step 1456, video filtering device 604 applies a temporal IIR filter to the given pixel. In an embodiment, the IIR filter is applied to the pixel as follows $$y_{i,j}(t)=\alpha y_{i,j}(t-1)+(1-\alpha)x_{i,j}(t) \qquad \text{(eq 22c)}$$

In some embodiments, the above IIR filter uses $\alpha=0.9$, while in other embodiments, the IIR filter uses a filter value that is based on a monotonically-decreasing function of Gaussian-filtered pixels, among numerous other possible filter values.

In another embodiment, no determination is performed at step 1456, and video filtering device 604 applies the temporal IIR filter of equation 22c using a value $\alpha$ that is computed as a function of $G_{i,j}$—e.g., $\alpha = ke^{-\beta G_{i,j}}$, where k and $\beta$ are constants.

In an additional embodiment, a scene cut detector may be used to determine frames where the scene changes. This scene cut information can be used to disable the temporal filtering across the scene cut boundaries. This may be achieved by additional logic or by setting the value alpha to zero at the scene cut boundary, which effectively disables the temporal filtering across scene cuts. One method of disabling the filter is by setting the alpha parameter a to zero.

Returning to FIG. 2B, temporal stabilization module 252 provides the temporally-stabilized black level adjusted luma image to a min/max module 254, which applies a search window of size 4 cpd to the temporally stabilized black level adjusted luma image to find local min and max values at respective pixel locations. An example search window is illustrated in FIG. 16B. The cross-hatched box represents the search window centered around a given pixel at location (i,j), and is used for finding a local min value $L_{min}$ and a local max value $L_{max}$ at location (i,j).

Min/max module 254 provides the image to a contrast image module 256, which generates a contrast image by computing a local contrast $C_{i,j}$ for each pixel:

$$C_{i,j} = \frac{L_{max} - L_{min}}{L_{max} + L_{min}} \qquad \text{(eq 22d)}$$

where $L_{min}$ and $L_{max}$ are the respective min and max values for a pixel at location (i,j). Contrast image module 256 provides the contrast image to filter module 258, which applies a Gaussian low-pass filter of 4 cpd length in both horizontal and vertical directions to smooth the blockiness in the contrast image. The filtered image is provided to a contrast sensitivity module 260, which computes a respective local contrast sensitivity $CS_{i,j}$ for each pixel of the filtered image.

3.3. Selecting Filter Bandwidth

Returning to FIG. 11, video filtering device at step 1106 selects a respective filter bandwidth $f^c_{x,y}$ for each pixel $P_{0,0}$ to $P_{M-1,N-1}$ based at least in part on the respective localized contrast sensitivity $CS_{x,y}$ of the respective pixel. Selection of the respective filter bandwidth may involve applying a contrast sensitivity model to the respective contrast sensitivity, as explained below.

The Movshon and Kiorpes CSF model may employ a three parameter exponential function to model the CSF, which may be expressed as $$\text{csf}(f)=af^c e^{-bf} \qquad \text{(eq 23)}$$

where, e.g., a=75, b=0.2, and c=0.8, and f may be a spatial frequency in CPD. FIG. 17 depicts an example Movshon and Kiorpes CSF model that may exhibit a band pass filter characteristic peaking at 4 CPD, for example.

The Barten CSF model may comprise several viewing parameters. The model may be expressed as $$S(u) = \frac{Ae^{-Du^2}}{\sqrt{(B+u^2)\left(C + \frac{1}{1-e^{-0.02u^2}}\right)}} \qquad \text{(eq 24)}$$

where A, B, C, and D may be constants whose values may be given by, for example, $$A = \frac{5200}{\sqrt{0.64}}, B = \frac{1}{0.64}\left(1 + \frac{144}{X_0}\right), C = \frac{63}{L^{0.83}}, \text{ and/or} \qquad \text{(eq 25)}$$

-continued
$$D = 0.0016\left(1 + \frac{100}{L}\right)^{0.08}$$

The value $X_O$ may be the object size in visual degrees. The value L may be the object luminance in cd/m². The expression for S(u) may be approximated as $$S(u) \approx \hat{S} = \frac{Ae^{-Du^2}}{\sqrt{(B+u^2)(C+1)}} \quad \text{(eq 26)}$$

This approximate formula may be inverted analytically using a Lambert W function to give $$u = \hat{S}^{-1}(s) = \sqrt{\frac{\text{LambertW}\left(\frac{2DA^2e^{2DB}}{(C+1)s^2}\right)}{2D} - B} \quad \text{(eq 27)}$$

This inverse function may be approximated in turn by $$u = \hat{S}^{-1}(s) \approx I(s) = \sqrt{\frac{0.777 \log\left(1 + \frac{2DA^2e^{2DB}}{(C+1)s^2}\right)}{2D} - B} \quad \text{(eq 28)}$$

The accuracy of this approximation to the inverse of the Barten CSF may be evaluated by plotting a Barten CSF, e.g., the original Barten CSF, along with the inverse of this approximation $I^{-1}(u)$, as illustrated in FIG. 18. Past the peak of the CSF, the approximate inverse may be close to the Barten CSF.

A cutoff frequency may be calculated. For example, the contrast sensitivity may be mapped to the adaptive low pass filter's cutoff frequency. Based on a CSF model (e.g., the Movshon and Kiorpes' CSF model) an inverse relationship for computing cutoff frequency may be constructed from the contrast sensitivity. An example model may be expressed as $$f_c(i,j) = \begin{cases} f, F_{min} \leq f_{ij} \leq F_{max} \\ F_{min}, f_{ij} < F_{min} \\ F_{max}, f_{ij} > F_{max} \end{cases} \quad \text{(eq 29)}$$

where $$f_{ij} = -42.26 + 78.463\, cs_{ij}^{-0.079} - 0.04894\, cs_{ij}^{1.0809} \quad \text{(eq 30)}$$

$$F_{min} = 4\ CPD \quad \text{(eq 31)}$$

$$F_{max} = 35.9\ CPD \quad \text{(eq 32)}$$

If the Barten CSF is used, the cutoff frequency may be selected using the inverse function I(s) in relation (8) disclosed herein, for example, rather than the model expressed in relation (26).

Figure 19:
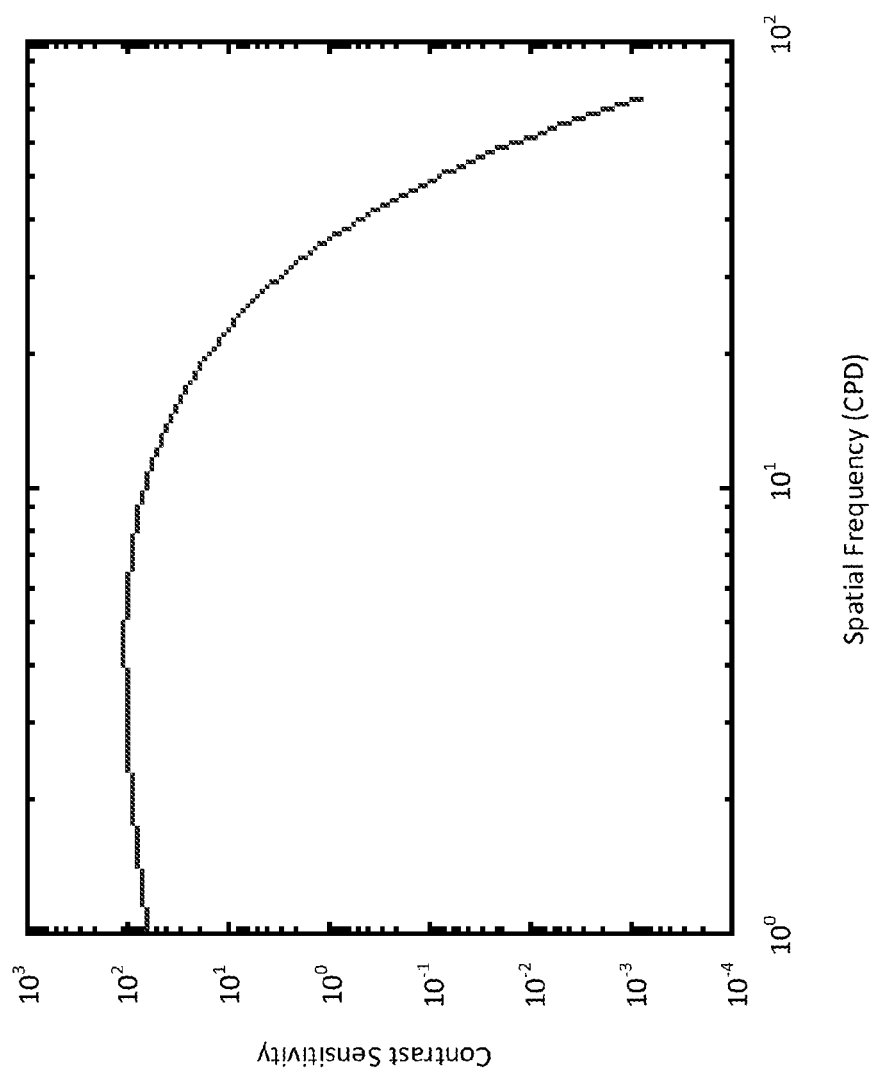
FIG. 19 depicts an example Movshon and Kiorpes contrast sensitivity function (CSF) model.

The model may approximate the CSF as a low pass filter that has a pass band for frequencies below 4 CPD. The adaptive low pass filter may have minimum and maximum cutoff frequencies of 4 CPD and 35.9 CPD, respectively. FIG. 19 depicts how the example model may closely fit the Movshon and Kiorpes' model, for example in a range including 4 CPD and 35.9 CPD. The above-described process may be employed to compute respective cutoff frequencies for one or more input pixels (e.g., each input pixel). An example cutoff frequency per-pixel for the example input video and/or image is depicted in FIG. 12F.

Returning to method 1100, selection of the respective filter bandwidth may be based at least in part on an inverse contrast sensitivity function. The inverse contrast sensitivity function in turn may be based at least in part on an inverse function of a Movshon and Kiorpes contrast sensitivity model. Additionally or alternatively, the inverse contrast sensitivity function may be based at least in part on an inverse function of Barten contrast sensitivity model.

In an embodiment, an inverse contrast sensitivity function provides a cutoff frequency $f^c_{x,y}$ for a respective pixel $P_{x,y}$ using:

$$f^c_{x,y} = -42.26 + 78.463 CS_{x,y}^{-0.079} - 0.04894 CS_{x,y}^{1.0809} \quad \text{(eq 33)}$$

where $CS_{x,y}$ is the respective contrast sensitivity for $P_{x,y}$. Those having skill in the art will recognize that the inverse contrast sensitivity function may be based on other contrast sensitivity models and contrast sensitivity functions as well.

Figure 20:
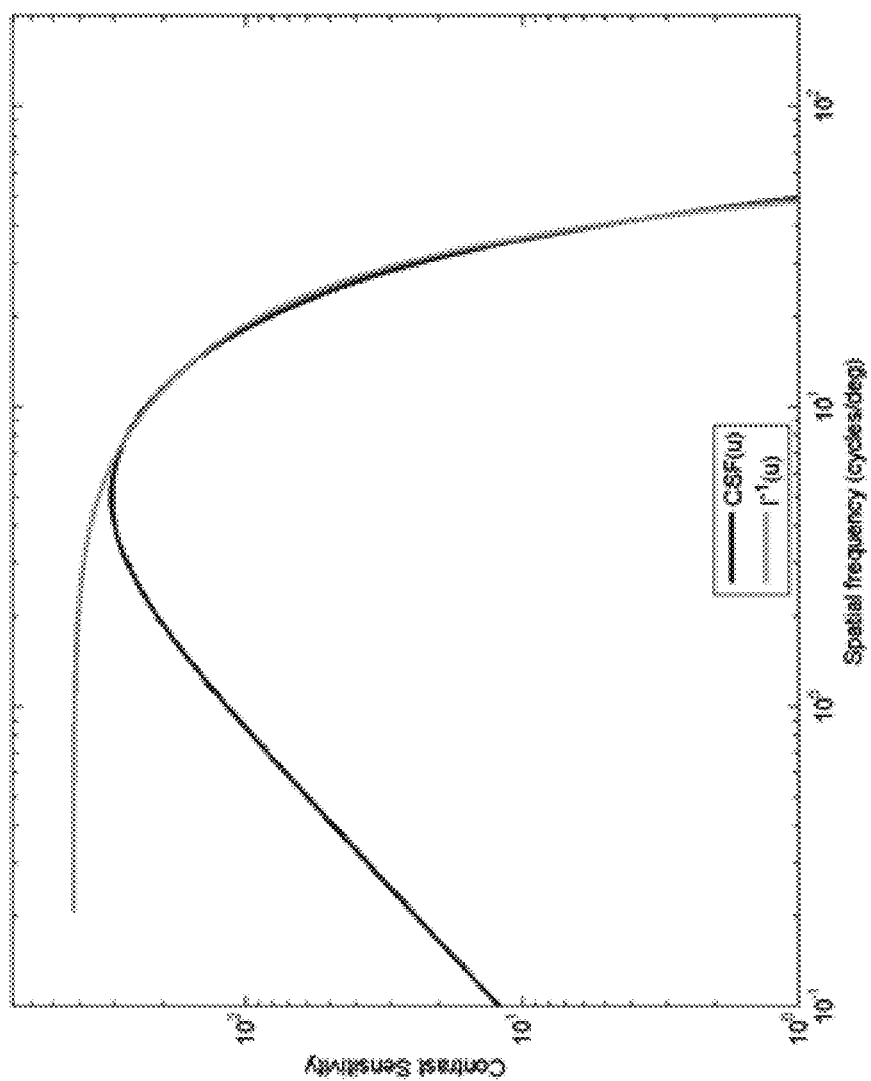
FIG. 20 is a graph illustrating an example CSF and approximate inverse.

Contrast sensitivity measurements may be performed with the visual field surrounding the test equal to the average DC of the pattern under test. HVS sensitivity may change when the environment of the visual field differs. For example, the appearance of a lit headlight may change greatly between night and day even though the light emitted by the headlight may be nearly the same. The Barten model models this behavior by introducing a scaling function for the CSF that depends on the ratio of the surrounding luminance to the luminance of the object under test, e.g., a CSF test pattern. For example, the constant A of the Barten model disclosed in equation (5) herein may be scaled by a factor f. This scaling factor f may be applied to the Movshon and Kiorpes CSF model. The scaling factor f may be expressed as $$f\left(\frac{L_S}{L_O}, X_O\right) = e^{\left(\frac{\ln^2\left(\frac{L_S}{L_O}\left(1+\frac{144}{X_O}\right)^{0.25}\right) - \ln^2\left(\left(1+\frac{144}{X_O}\right)^{0.25}\right)}{2\ln^2(32)}\right)} \quad \text{(eq 34)}$$

where $L_S$ is the surrounding luminance, $L_O$ is the luminance of the object, and $X_O$ is the size of the object in visual degrees. FIG. 20 illustrates, by way of example, the scaling factor f as a function of the ratio of surrounding and object luminances.

Figure 21:
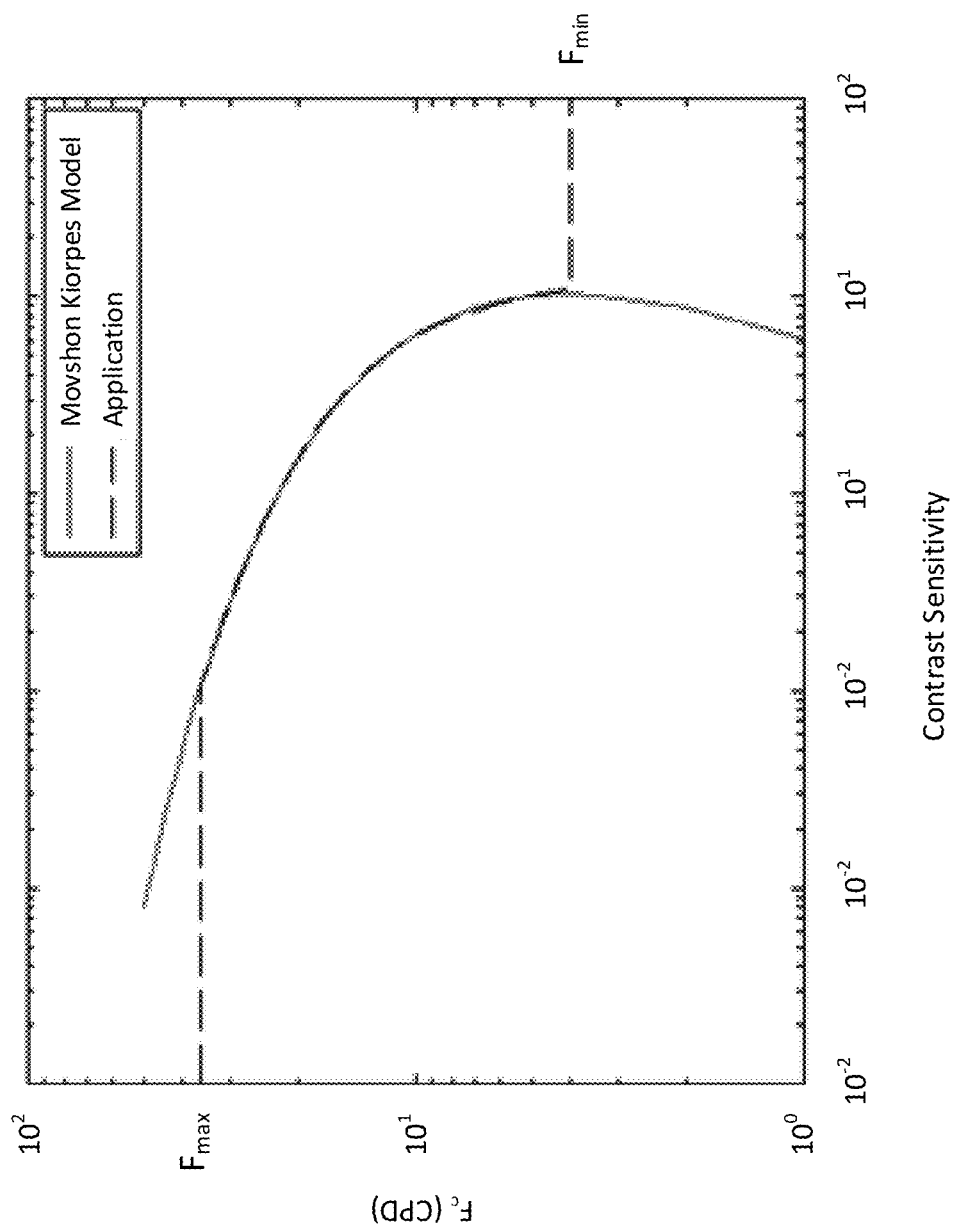
FIG. 21 depicts an example relationship that may be used in computing a cutoff frequency using contrast sensitivity.
Figure 22:
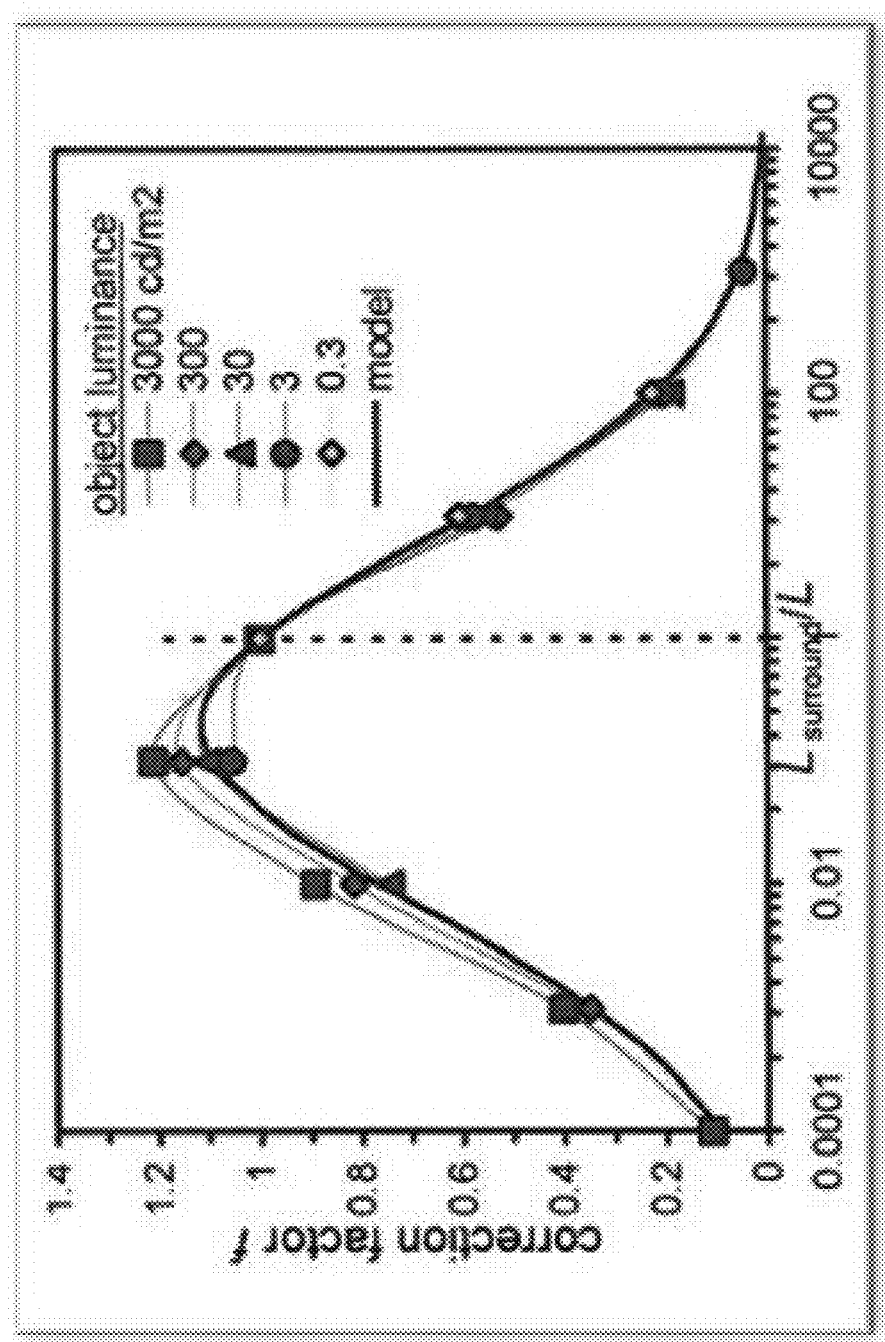
FIG. 22 illustrates an example scaling factor as a function of the ratio of surrounding and object luminances.
Figure 23:
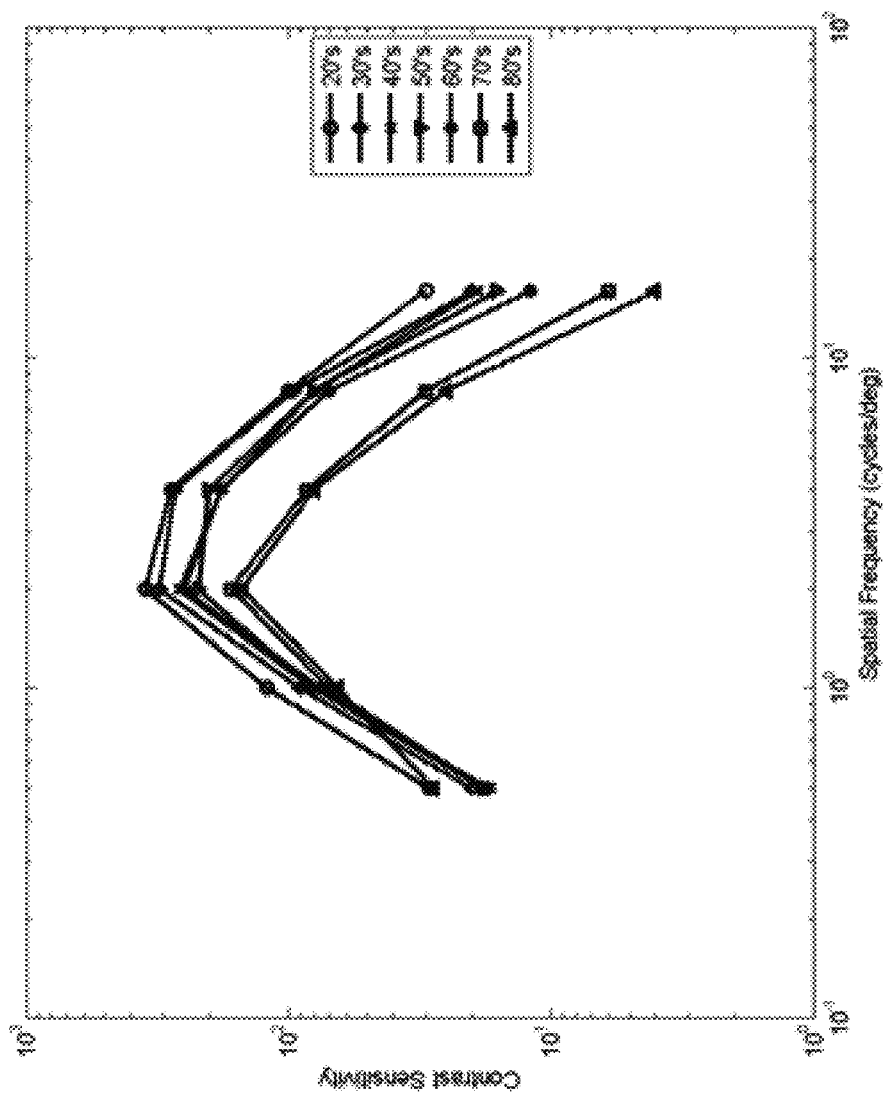
FIG. 23 is a graph illustrating an example of CSF variation with age.

CSF may be characterized by falloff with age. FIG. 21 illustrates an example of CSF variation with age. A scaling factor may be determined that may be applied to the CSF. A CSF corresponding to ages in the 20s may be used as a baseline. Scaling factors computed from the data shown in FIG. 23 are depicted in FIG. 22, along with a linear model that may approximate the envelope of scaling with age.

A model may be derived that may compute an age-dependent scaling factor. The age-dependent scaling factor may be applied to the constant A of the Barten model disclosed in equation (5) herein and/or to the Movshon and Kiorpes CSF model. The scaling factor may be expressed as $$\text{Scale(age)} = \begin{cases} 1.000, a < 20 \\ 1 - 0.00735(a-20), 20 \leq a \leq 80 \\ 0.5590, a > 80 \end{cases} \quad \text{(eq 35)}$$

A surround effect may be used. To make use of the surround effect, a scaling factor f may be determined for modifying the CSF appropriately. The model may use three constants, e.g., the luminance of the surround LS, the luminance of the object LO, and the size of the object XO.

The display size may be used for XO. The value of XO may be expressed in visual degrees. The viewing distance may be used to convert between visual angle and pixel dimensions.

The object luminance may be determined using the display peak luminance at a corresponding brightness setting, e.g., by using the display peak luminance directly for the object luminance. The average display luminance may be used to scale the peak luminance. The average display luminance may be smoothed over time for this calculation.

Object luminance may be estimated by computing the global DC across the image by computing the average of the DC image. The global DC may be temporally filtered, e.g., using a one-tap IIR filter defined as $$\overline{DC}_j = \gamma \overline{DC}_{j-1} + (1-\gamma)DC_j \quad (eq\ 36)$$

where $\overline{DC}_j$ may be the temporally filtered global DC and $DC_j$ may be the global DC of frame j. The filtered DC may be scaled by the peak luminance to yield the object luminance LO.

The surround luminance may be estimated by using an ambient light level A, e.g., in lux, similarly to the case of ambient contrast ratio. A uniform background reflectance value RS may be assumed. The surround luminance LS, e.g., in cd/m², may be calculated as $$LS = \frac{RS}{\pi}A \quad (eq\ 37)$$

The CSF scaling factor f may be computed from the parameters LS, LO, and XO, e.g., before using the CSF to determine the cutoff frequency. The CSF may be kept constant, and the sensitivity value may be scaled by the inverse of the scaling factor, e.g., before computing the cutoff frequency.

An age effect may be accounted for by a scaling factor, similarly to the surround effect. An example mathematical model converting age to a scaling factor is disclosed herein as relation (10). A user may supply an age value as part of a configuration, e.g., an initial configuration. As an alternative or in addition, demographics of the video content may be used to select an age value. For example, a higher age value may be assigned to a golf event as compared to a music video. A default age value, e.g., 20, may be used for the age parameter if no additional information is available.

In some embodiments, temporal stabilization may be used. Video may contain noise in flat static regions of a frame, which can manifest as temporal variation of pixel values. Although these pixel fluctuations may not be visible, they may cause temporal fluctuations in contrast and cutoff frequency maps that result in temporal variation of filtering strength across static regions of a video. This can mislead a video encoder used to compress a pre-filtered video to identify these static regions as regions containing motion, thereby resulting in either higher bitrates or lower PSNR.

In some embodiments temporal stabilization is applied to the black level adjusted luma image in order to mitigate the effect of noise on the cutoff frequency map generated at a later stage in the pre-filter. One such approach is illustrated in FIG. 2B.

In an embodiment, selecting the respective filter bandwidth $f^c_{x,y}$ at step 1106 involves obtaining a respective scaled contrast sensitivity $CS^s_{x,y}$ for respective pixel $P_{x,y}$ and selecting the respective filter bandwidth based at least in part on the respective scaled localized contrast sensitivity. In an embodiment, the scaled contrast sensitivity is obtained using a scaling factor $f^s$. For example, video filtering device 602 may select a value for a scaling factor $f^s$ and multiply the respective localized contrast sensitivity $CS^s_{x,y}$ by the selected scaling factor.

In an embodiment, the scaling factor $f^s$ is selected based on set of perception characteristics including an ambient illuminance at display 612, a peak luminance of the display, and a size of display 612. In another embodiment, the scaling factor $f^s$ is selected based on an age of a user of display 612. The filter bandwidth might be selected using $$f^s(age) = \begin{cases} 1.000, & age < 20 \\ 1 - 0.00735(age - 20), & 20 \le a \le 80 \\ 0.5590, & age > 80 \end{cases} \quad (eq\ 38)$$

where age is the age of the user. The scaling factor could be based on any combination of age, visual acuity, ambient illuminance, peak luminance, display size, or any other perception characteristic(s).

3.4. Filter Video Frame

At step 1108, video filtering device 604 generates a filtered video frame by filtering each pixel $P_{0,0}$ to $P_{M-1,N-1}$ according to the respective selected filter bandwidth $f^c_{x,y}$ of the pixel. Each filtered pixel may have a respective filtered value $\hat{P}_{x,y}$.

The adaptive low pass filter (e.g., perceptual filter) may be based on a Lanczos filter, for example. One or more input linear RGB pixels may be filtered using the Lanczos filter. The Lanczos filter at location (i,j) may be defined as follows $$h_{ij}[k] = \frac{\sin 2\pi f_c(i,j)k}{\pi k} \frac{\sin \pi k/n}{\pi k/n}, k = -n, \ldots, 0, \ldots, n \quad (eq\ 39)$$

where $f_c(i,j)$ may be the cutoff frequency at location (i,j) and n may be a filter order (e.g., n=4). Two separable Lanczos filters may be used. For example a first Lanczos filter may be used for filtering along one or more rows of pixels and a second Lanczos filter may be used for filtering along one or more columns of pixels. For one or more input pixels that are to be filtered by the Lanczos filter (e.g., each input pixel), respective cutoff frequencies may be used, for example respective cutoff frequencies $f_c$ computed as described herein. The Lanczos filter may adapt on a pixel-basis. The two separable Lanczos filters may have a cutoff frequency $f_c$ in one or both of the horizontal and vertical directions. This may result in a frequency characteristic, for example as depicted in FIG. 23. The cutoff frequency $f_c$ may adapt (e.g., may be adapted) to a local contrast ratio.

A bank of Lanczos filters corresponding to a set of $f_c$ values may be pre-computed. For example, a set of $f_c$ values may be $F = \{f_{c1}, f_{c2}, \ldots, f_{cM}\}$, where M may be a total number of filter banks. When a cutoff frequency $f_c(i,j)$ for a pixel is computed using equation (27), it may be approximated to a closest cutoff frequency in the set F, which may be used to choose a filter from the filter bank.

The decreased visibility of obliquely oriented patterns, for example as compared to horizontal and/or vertical patterns, may be referred to as the oblique effect. Physiological experiments have indicated that orientation of patterns may affect the contrast sensitivity of the human visual system. Oblique patterns may have poorer sensitivity compared to horizontal and/or vertical patterns. The Daly CSF model may account for the phenomena of oblique effect by considering input orientation.

Figure 24:
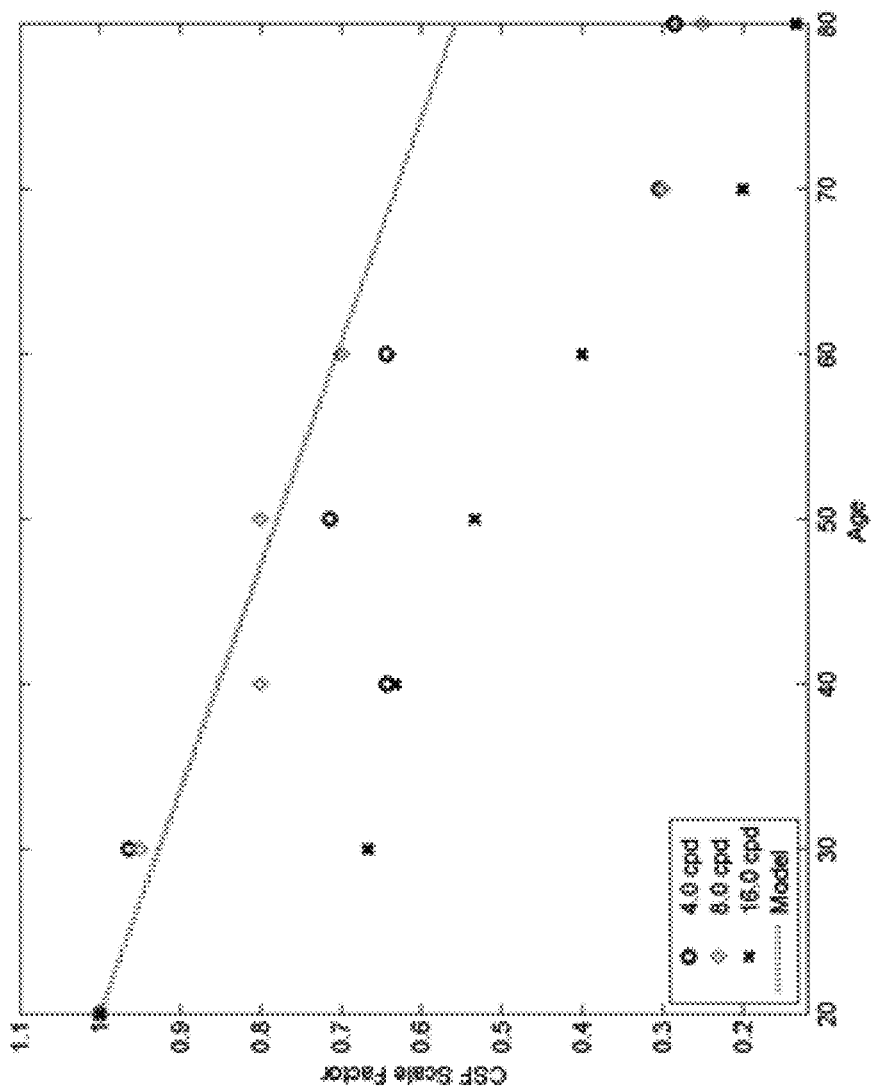
FIG. 24 is a graph illustrating an example of CSF scaling with age.
Figure 25:
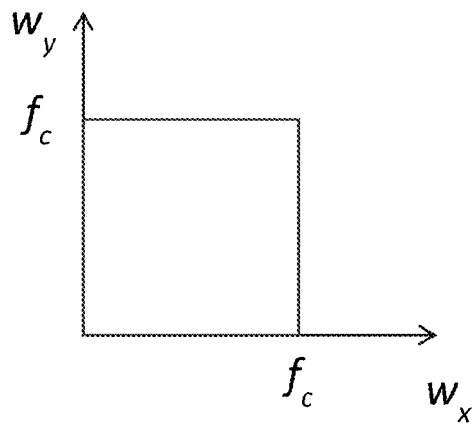
FIG. 25 depicts a frequency characteristic of an example perceptual filter.
Figure 26:
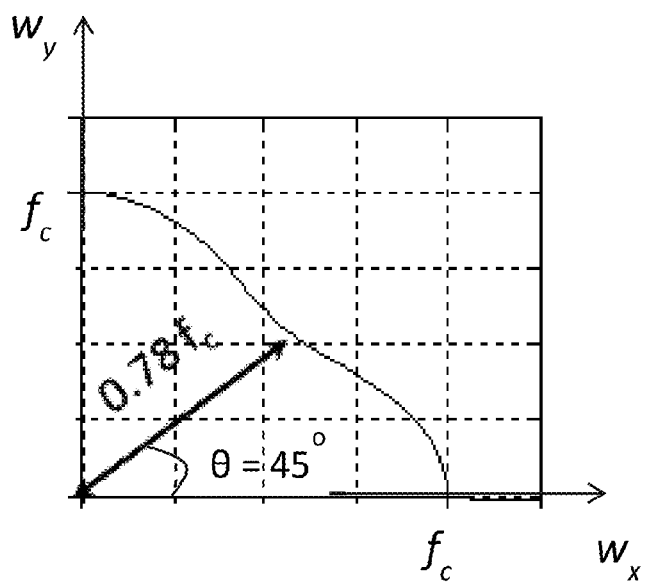
FIG. 26 is a graph depicting cutoff frequency as a function of an orientation angle.

The oblique effect may be incorporated into (e.g., accounted for within) an adaptive low pass filter (e.g., a perceptual filter), such that the adaptive low pass, or perceptual, filter may be referred to as a perceptual oblique filter. For example, this may be achieved by adapting the cutoff frequency to the orientation angle in frequency domain. To model the oblique effect phenomenon, the following relationship between cutoff frequency $f_c$ and frequency orientation angle $\theta$ may be used:

$$f_c(\theta) = f_c\left(\left(\frac{1-\mu}{2}\right)\cos 4\theta + \left(\frac{1+\mu}{2}\right)\right) \quad \text{(eq 40)}$$

where $f_c$ may be obtained using equation (26). An illustration of equation (28) is depicted in FIG. 24. As illustrated in FIG. 26, a cutoff frequency of $f_c$ may be used for both the horizontal and vertical directions, while a smaller cutoff frequency of 0.78 $f_c$ may be used for $\theta=45°$.

Figure 27:
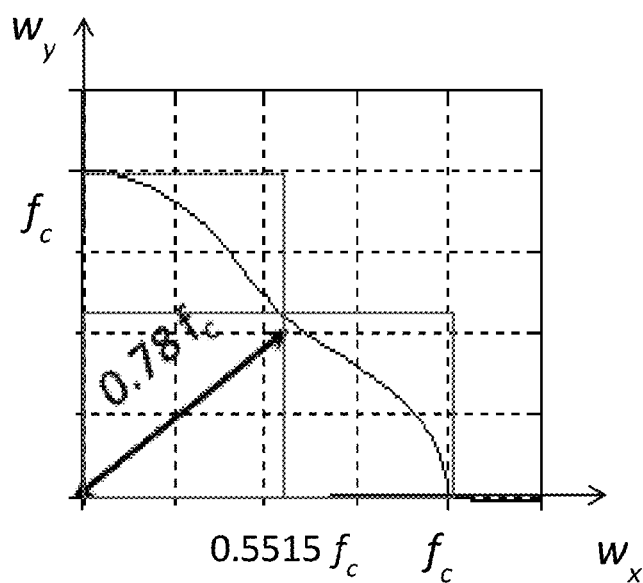
FIG. 27 depicts an example of approximating frequency characteristics to a frequency characteristic that may be realized by separable low pass filters.
Figure 28:
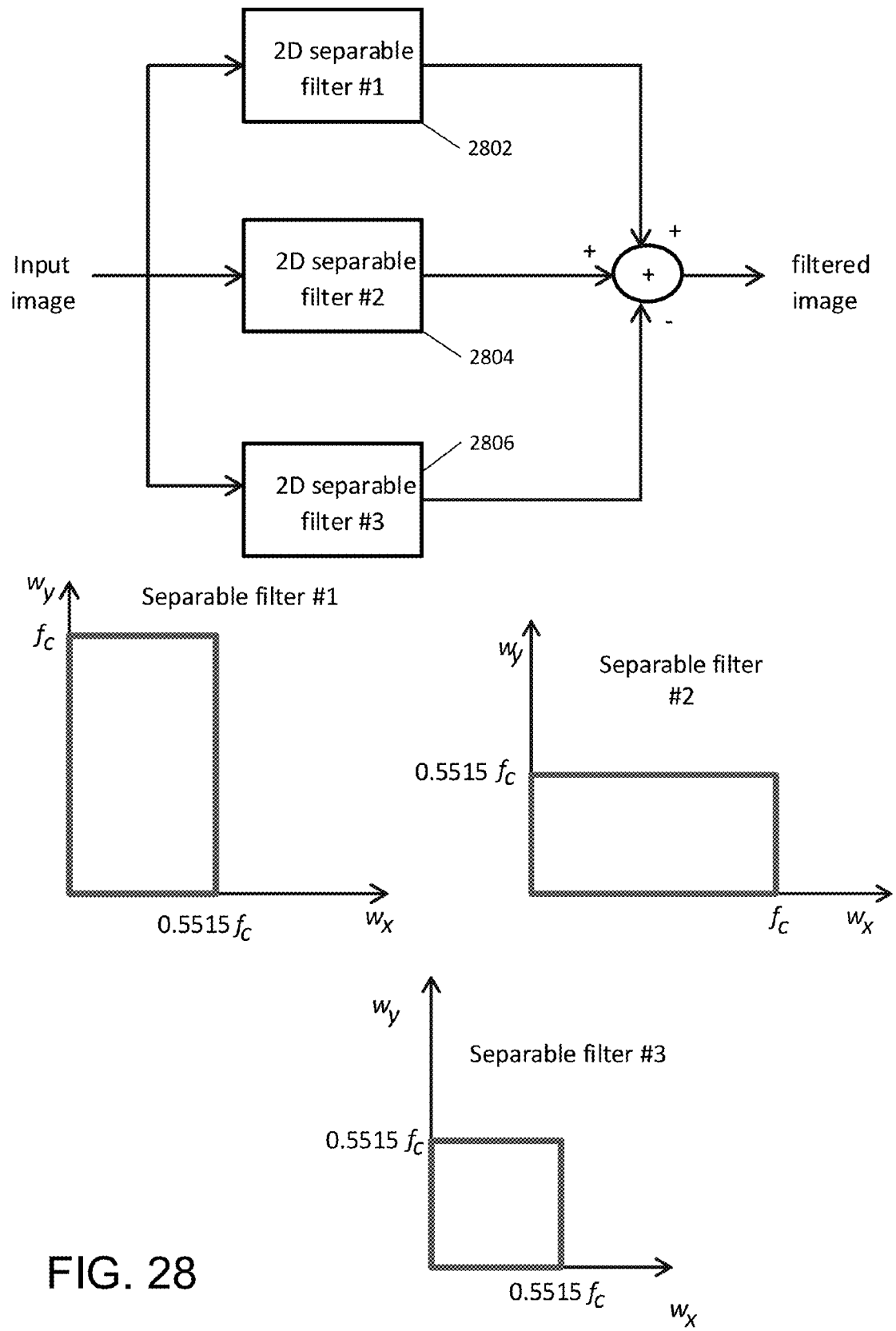
FIG. 28 depicts an example of using three pairs of separable filters for achieving a frequency characteristic.

An anisotropic two dimensional finite impulse response (FIR) filter may be implemented to yield a frequency characteristic, such as the frequency characteristic shown in FIG. 26. A number of separable filter pairs may be used to approximate the frequency characteristic, as depicted in FIG. 27. As shown in FIG. 27, three pairs of separable filters may be used to achieve the frequency characteristic. An example of using three pairs of separable filters 2102, 2104, 2106 to achieve the frequency characteristic is depicted in FIG. 28. One or more of the separable filter pairs 2102, 2104, 2106 (e.g., each separable filter pair) may have respective cutoff frequencies specified for the horizontal and/or vertical directions. As depicted in FIG. 28, the filtered output from separable filter pairs 2102 and 2104 may be added, and the output from filter pair 2106 may be subtracted, in order to obtain a filtered output that has a desired frequency characteristic.

In an embodiment, filter 710 is a non-separable filter in the form of three separable filters $F_1$, $F_2$, and $F_3$. The three filters may have respective horizontal cutoff frequencies $f_1^H$, $f_2^H$, and $f_3^H$ and respective vertical cutoff frequencies $f_1^V$, $f_2^V$, and $f_3^V$.

The values of the horizontal and vertical cutoff frequencies of $F_1$, $F_2$, and $F_3$ may be selected such that:

$$f_1^H = f_2^V = f_3^V$$

$$f_1^V = f_2^H = f_3^H$$

The cutoff frequencies could be selected such that $f_1^H \neq f_1^V$ or that $f_1^H = f_1^V$.

Further, the values of the cutoff frequencies may be selected such that:

$$f_1^H = s_1 \times f_2^H = s_1 \times f_3^H$$

$$f_1^V = s_2 \times f_2^V = s_2 \times f_3^V$$

where $s_1$ and $s_2$ are scaling factors. Scaling factor $s_1$ could be the same as $s_2$ or could be different from $s_2$. In an embodiment, $s_1 = s_2 = 0.5515$. Other values of $s_1$ and $s_2$ may be used as well.

In an embodiment, filtering a respective pixel $P_{x,y}$ with each of $F_1$, $F_2$, and $F_3$ gives three respective filtered values $\hat{P}^1_{x,y}$, $\hat{P}^2_{x,y}$, and $\hat{P}^3_{x,y}$. A respective composite filtered value $\hat{P}_{x,y}$ for respective pixel $\hat{P}_{x,y}$ may be determined as:

$$\hat{P}_{x,y} = \hat{P}^1_{x,y} + \hat{P}^2_{x,y} - \hat{P}^3_{x,y}$$

In an embodiment, at least one of separable filters $F_1$, $F_2$, and $F_3$ is a two-dimensional separable filter in the form of two one-dimensional separable filters: one horizontal filter and one vertical filter having respective cutoff frequencies.

3.5. Provide Video Frame

At step 1110, video filtering device 604 is providing the filtered video frame to video encoder 606. Prior to providing the frame to encoder 606, a gamma operation may be applied to the filtered linear RGB image to convert the filtered linear RGB image to an sRGB image. If the input were in YUV 4:2:0 format, sRGB may be converted back to YUV 4:2:0 color space. FIG. 12G depicts a filtered output image of the example input video and/or image as it might appear when rendered on a display of a mobile device (e.g., in full color).

4. Example System

An embodiment of the present disclosure takes the form of a video-filtering apparatus that includes a data storage, a receiver, a contrast-sensitivity determination module, a filter bandwidth selection module, and a video filter module.

In an embodiment, the data storage is configured to store one or more video frames, including received frames and filtered frames, as well as video frames in other intermediate states before, during or after the video-filtering process such as luma frames, color-space-converted frames, and black-level-adjusted frames, among other examples. A functional module of the video filtering apparatus might perform an operation on a video frame stored in the data storage and may store the result of that operation in the data storage for use by other functional modules. The data storage may take the form of data storage 704 described above, for example. In an embodiment, the video frames include a plurality of pixels having respective pixel values.

In an embodiment, the receiver is configured to receive at least one perception characteristic. The perception characteristic might be a viewing condition at a display, a display characteristic of the display, and/or and a user characteristic, as examples. The receiver may provide the obtained characteristic to one or more other modules such as a black-level adjustment module, the contrast-sensitivity determination module, and/or the filter selection module, among other possibilities.

In an embodiment, the video filtering apparatus includes a perception correlation module configured to receive perception information associated a viewing condition at a display, a display characteristic of the display, and/or and a user characteristic. The perception information could be a serial identifier of the display, a model identifier of the display, a geographic location of the display, a time of day at the display, and/or and a username of a user of the display, among other possibilities.

In an embodiment, the perception correlation module is configured to obtain a perception characteristic based at least in part on the perception information. For example, the perception correlation module includes a lookup table configured to store one or more model or serial numbers and one or more perception characteristics in association with each model or serial number. The perception correlation module may determine a model number based upon the serial number. The perception correlation module may obtain a perception characteristic stored in association with the model or serial number—a perception characteristic such as a pixel density, a height and width, and/or a reflectivity of a device associated with the given number. If the perception information includes a username, the perception correlation module might obtain an age of a user associated with the username. If the perception information includes a geographic location of the display and/or a time of day at the display, the perception correlation module may obtain an estimated ambient illuminance at the display. Other examples are possible as well.

In an embodiment, the video filtering apparatus includes a color-space conversion module configured to convert a color space of a video frame from a first color space to a second color space. For example, the video filtering apparatus may receive video frames that represent colors in a CMYK, HSV/HSL, YIQ, YUV, YPbPr, and/or xvYCC color space. The color-space conversion module could be employed in embodiments of the video filtering apparatus that generally operate within an apparatus-compatible color space such as sRGB (a linear color space that may allow form simplified frame-transformation functions). To allow for transformations of received video frames having color spaces other than the apparatus-compatible color space, the color-space conversion module may convert the color space of received video frames to the apparatus-compatible color space prior to performing one or more of the color-space-specific transformations. In an embodiment, the color-space conversion module transforms the color space of received video frames from an original color space to a linear RGB color space (such as sRGB or a gamma-corrected linear color space) and converts the color space of filtered video frames back to the original color space.

In an embodiment, the video filtering apparatus includes a black-level adjustment module configured to adjust a respective black level of each of the pixels based at least in part on an ambient contrast ratio at the display. The black-level adjustment module may be employed in embodiments of the video filtering apparatus that adjust the respective black levels prior to a contrast-sensitivity determination module determining the respective contrast sensitivities, as one possibility. The black-level adjustment module may adjust the respective pixel black levels of received video frames and/or of color-space-converted video frames, as examples. In an embodiment, the black-level adjustment module determines a respective adjusted value $P^A$ for each pixel value P using:

$$P^A = \frac{1}{C_1} + \left(1 - \frac{1}{C_1}\right)P \quad \text{(eq 41)}$$

where $C_1$ is the ambient contrast ratio.

In an embodiment, the black level adjustment module includes an ambient-contrast-ratio determination module configured to determine the ambient contrast ratio at the device. The ambient-contrast-ratio determination module may determine the ambient contrast ratio based at least in part on a set of perception characteristics that includes one or more of an ambient illuminance at the display, a maximum luminance of the display, a reflectivity of the display, and a native contrast ratio of the display. For example, an embodiment of the ambient-contrast-ratio determination module determines the ambient contrast ratio CR(a) as:

$$CR(a) = \frac{\text{luminance of white}}{\text{luminance of black}} = \frac{W + \frac{Rd}{\pi}I(a)}{\frac{1}{CR0}W + \frac{Rd}{\pi}I(a)} = \frac{1 + \frac{Rd}{\pi L}I(a)}{\frac{1}{CR0} + \frac{Rd}{\pi L}I(a)} \quad \text{(eq 42)}$$

where I(a) is the ambient illumination, Rd is the display reflectance, W is the luminance of display white in the absence of ambient light, and CR0 is the native contrast ratio. The black level adjustment module may adjust the black level of each of the pixels based on the ambient contrast ratio determined by the ambient-contrast-ratio determination module, among other possibilities.

In an embodiment, the contrast-sensitivity determination module is configured to determine a respective localized contrast sensitivity for each respective pixel of a video frame. The contrast sensitivity module may be configured to determine the respective contrast sensitivity based (at least in part) on the respective values of pixels within respective localized regions around a respective pixel and on at least one perception characteristic. Other configurations are possible as well.

In an embodiment, the contrast sensitivity determination module includes a local-average estimation module, a local-maximum estimation module, and a contrast sensitivity ratio module. In an embodiment, the contrast sensitivity ratio module is configured to determine a respective ratio for each pixel, the respective ratio being a ratio of a respective local average to a respective local maximum. The contrast sensitivity determination module may be configured to select the determined respective ratio as the respective localized contrast sensitivity for the respective pixel.

The local-average estimation module may be configured to determine a respective local average based at least in part on the values of the pixels within the respective localized region. In an embodiment, the local-average estimation module is configured to determine the respective local average by obtaining a sum of the values of the pixels within the respective localized region and dividing the obtained sum by the number of pixels within the region. Other configurations may be possible as well.

In an embodiment, the respective localized regions around a respective pixel include both a respective local-average region and a respective local-maximum region, and the contrast sensitivity determination module includes a local-average region-selection module configured to select pixels for inclusion in the local-average region. The local-average region-selection module may select the pixels by selecting a localized cutoff frequency having a number of spatial oscillations per degree of a visual field and by converting that localized cutoff frequency to a number of pixels per degree of the visual field. The module may select pixels for inclusion in the respective local-average region based at least in part on the converted localized cutoff frequency. In an embodiment, the local-average region-selection module determines a standard deviation value of a Gaussian filter based (at least in part) on the converted localized cutoff frequency and then selects pixels within a given number of standard deviations from the respective pixel. For example, in an embodiment, the local-average region-selection module selects pixels within [3σ+0.5] pixels from the respective pixel. The local-average estimation module may be configured to determine the respective local average of pixels selected by the local-average region-selection module. Other configurations are possible as well.

In an embodiment, the contrast sensitivity determination module includes a difference module configured to determine the respective absolute-difference values. To determine the respective absolute-difference value for a respective pixel, the difference module may determine the absolute value of the difference between the respective value and the respective local average of the respective pixel. The respective pixel value could be an original pixel value, a respective color-space-converted value, or a black-level-adjusted value, among other possibilities.

In an embodiment, the local maximum estimation module is configured determine a respective local maximum of the respective absolute-difference values of pixels within the respective local-maximum region. In an embodiment, a local-maximum region-selection module selects for inclusion in the respective local-maximum region those pixels within a predetermined number of pixels from the respective pixel. For example, in an embodiment, the local-maximum region-selection module selects pixels within 5 pixels from the respective pixel, resulting in an 11 pixel×11 pixel local-maximum region. In an embodiment, the local-maximum region-selection module selects pixels in a manner similar to that described for the local-average region-selection module. Other configuration may be possible as well.

In an embodiment, the local-maximum estimation module is further configured to apply a Gaussian filter to the respective absolute-difference values of each of the pixels before determining the respective local maximum. For example, in an embodiment, the local-maximum estimation module applies a Gaussian filter given by:

$$\sigma = 0.1325 \times 2 \times (2.5 N_2 + 1) \quad \text{(eq 43)}$$

where $N=[3\sigma+0.5]$ and where $N_2=4$. Other values for $\sigma$, $N$, and $N_2$ may be used.

In an embodiment, the contrast sensitivity determination module includes a contrast-sensitivity scaling module configured to adjust the respective localized contrast sensitivity of a pixel based (at least in part) on a scaling factor. The scaling factor may be determined based (at least in part) on at least one perception characteristic. For example, in an embodiment, the contrast sensitivity module includes a surround-luminance scaling-factor module configured to determine the scaling factor based (at least in part) on a set of perception characteristics that includes an ambient illuminance at the display, a maximum luminance of the display, a reflectivity of the display, and a native contrast ratio of the display. Similarly, in an embodiment, the contrast sensitivity module includes an age scaling-factor module configured to determine the scaling factor based (at least in part) on a display-user age of a user of the display. The surround-luminance scaling-factor module and the age scaling-factor module may determine the respective scaling factors using the respective perception characteristics as described above with reference to method step 1006.

In an embodiment, the filter bandwidth selection module is configured determine a respective filter bandwidth $f_c$ for each pixel based at least in part on the respective localized contrast sensitivity of the pixel. For example, the filter bandwidth selection module may be configured to provide the respective localized contrast sensitivity to an inverse contrast sensitivity function to obtain a cutoff frequency, as described above with reference to method step 1106.

In an embodiment, the filter bandwidth selection module is configured to select a corresponding filter for each pixel based at least in part on the respective filter bandwidth. For example, in an embodiment, the filter bandwidth selection module includes a lookup table of filters that correspond to a given filter bandwidth; the module selects from the lookup table a filter corresponding to the determined respective filter bandwidth.

In an embodiment, the corresponding filter is represented as a set of filter coefficients. For example, the filter for filter bandwidth $f^1$ might be represented as a set of filter coefficients $\{f_0^1, f_1^1, f_2^1, f_3^1, \text{ and } f_4^1\}$ and for filter bandwidth $f^2$ a set of coefficients $\{f_0^2, f_1^2, f_2^2, f_3^2, \text{ and } f_4^2\}$ In an embodiment, the coefficients for a given filter bandwidth are derived from the Lanczos filter described above with reference to step 1108.

In an embodiment, the filter bandwidth selection module is configured to select both a respective horizontal bandwidth and a respective vertical bandwidth for each pixel. Either (or both) of the horizontal and vertical bandwidths could be a cutoff frequency provided by an inverse contrast sensitivity function that is then multiplied by a scalar s. In an embodiment, $s=0.5515$. In an embodiment, the filter bandwidth selection module is configured to select three pairs of horizontal and vertical bandwidths for each pixel: $F_1=\{s \times f_c, f_c\}$, $F_2=\{f_c, s \times f_c\}$, and $F_3=\{s \times f_c, s \times f_c\}$, where the first bandwidth in each pair is the horizontal bandwidth and the second is the vertical bandwidth.

In an embodiment, the video filter module is configured to generate a filtered video frame by filtering each pixel according to the respective selected filter for each pixel. For example, the video filter module may be configured to generate the filtered video frame using a respective set of filter coefficients corresponding to the selected filter for the respective pixel. In an embodiment, the video filter module is configured to filter each pixel according to the respective horizontal and vertical filters selected for each pixel. For example, in an embodiment, the video filter module generates the filtered video frame by filtering each pixel according to filter pair $F_1$, $F_2$, and $F_3$ to obtain respective filter results $R_1$, $R_2$, and $R_3$. A filter summation module of the video-filtering apparatus is configured to determine an aggregate filter result $R_1+R_2-R_3$ as a respective filtered value for each pixel in the generated filtered video frame.

5. Conclusion

The respective performance of a perceptual filter and of a perceptual oblique filter may be illustrated by filtering a test image with both filters. For example, both a perceptual filter and a perceptual oblique filter, as described herein, were used to filter the "Star" test image depicted in FIG. 29A. FIG. 29B depicts an example output image produced by filtering the test image of FIG. 29A with a perceptual filter. FIG. 29C depicts an example output image produced by filtering the test image of FIG. 29A with a perceptual oblique filter. The images depicted in FIGS. 22B and 22C were obtained using the same (e.g., substantially the same) viewing conditions. A difference image was obtained, as depicted in FIG. 29D. As illustrated in FIG. 29D, the perceptual oblique filter may perform effectively identically to the perceptual filter along the vertical and horizontal directions, but may perform additional filtering along one or more oblique directions.

A perceptual oblique filter may be used as a preprocessing step to a video encoder. Benefits may be realized by employing a perceptual oblique filter rather than, for example, a uniform pre-filter and/or a no-filtering scheme. A uniform pre-filter may use a spatial cutoff frequency based on viewing conditions, which may correspond to the visual acuity limit. In contrast, a perceptual oblique filter may adapts its cutoff frequency on a pixel-basis, for example based one or both of a local contrast sensitivity and an orientation of one or more spatial oscillations.

Results of employing a perceptual oblique filter may be presented in terms of an angular characteristic, for example, a user's observation angle that may capture the width of the display the user is viewing. This may be referred to as viewing angle γ. Viewing angle γ may be connected to display width w and viewing distance d, for example, as follows:

$$\tan\left(\frac{\gamma}{2}\right) = \frac{w}{2d} = \frac{\text{width[pixels]}}{2\rho d} \quad \text{(eq 44)}$$

This metric may be convenient, for example, as results become applicable to different screen densities and/or sizes. Using this definition, twelve example operating points were selected to describe user positions covering a range of observation angles from 6° to 45°. The following example test points for effective contrast ratios of the screen were selected: $CR \in \{2:1, 3:1, 5:1, 10:1, 100:1, \text{and } 100000:1\}$. The first example contrast ratio may correspond to situations when a display is under sunlight, while the last example contrast ratio may correspond to the equivalent of a studio monitor in a dark room. Results of employing a perceptual oblique filter may be presented in other suitable terms, for example, in terms of different viewing distances, or the like.

Figure 30:
FIG. 30 depicts an example preprocessing filter setup.

The perceptual oblique filter was tested using an "IntoTree" 1080p video test sequence. An x264 high profile video encoder with constant quantization parameter (QP) rate control was used in the test. The experimental test setup used for both the perceptual oblique filter and the uniform pre-filter is depicted in FIG. 30.

Figure 31:
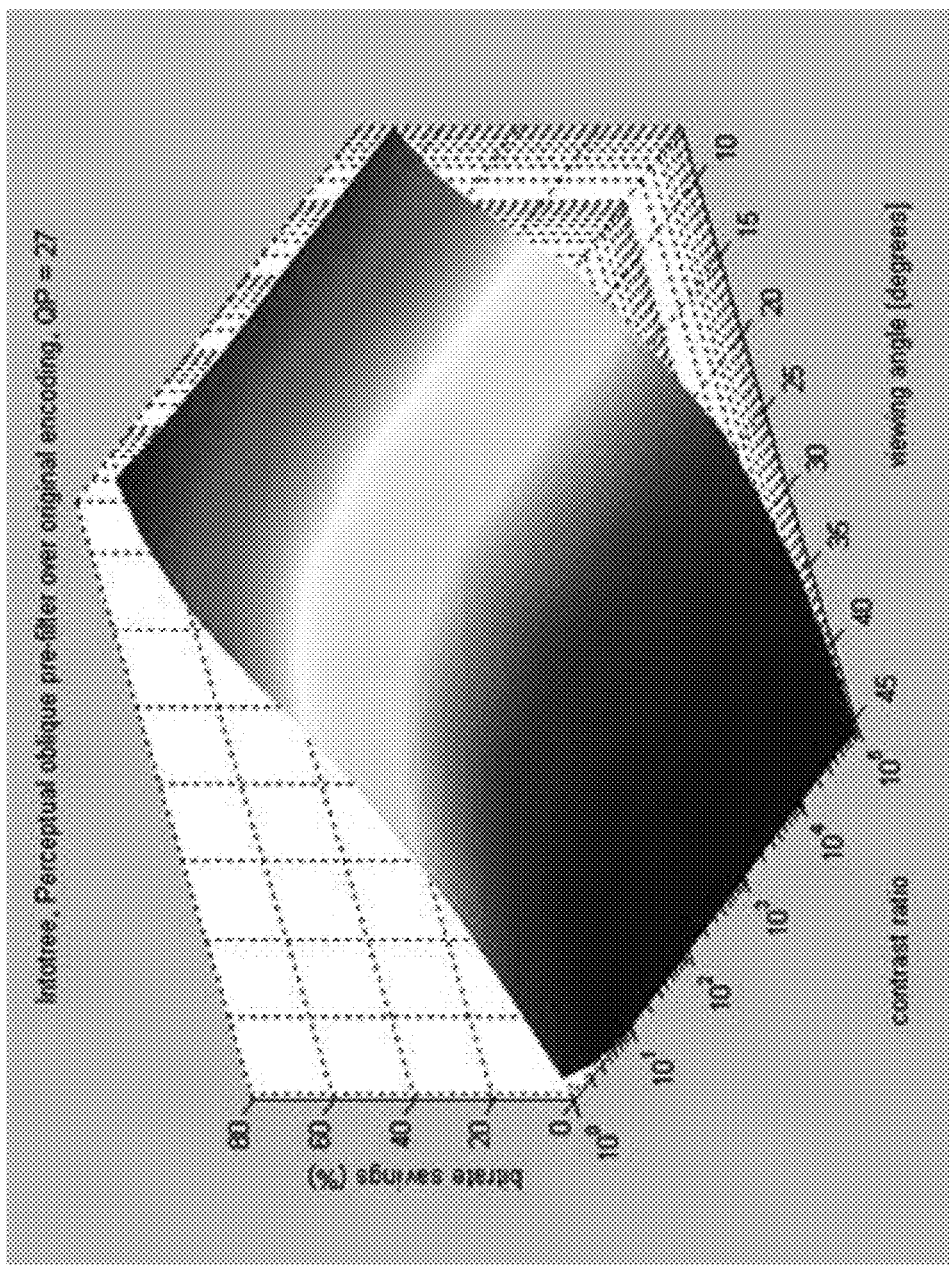
FIG. 31 depicts example bitrate savings of employing an example perceptual oblique filter over no-filtering (original encoding) for an example video.

Example bit savings that may be achieved by using a perceptual pre-filter (e.g., a perceptual oblique filter) over no filtering (e.g., original encoding) are illustrated in FIG. 31. As shown, the perceptual oblique filter may achieve significant bit savings at narrower viewing angles and/or at smaller contrast ratios, and may yield a maximum bit savings of, for example, 75% over a no-filtering scheme.

Figure 32:
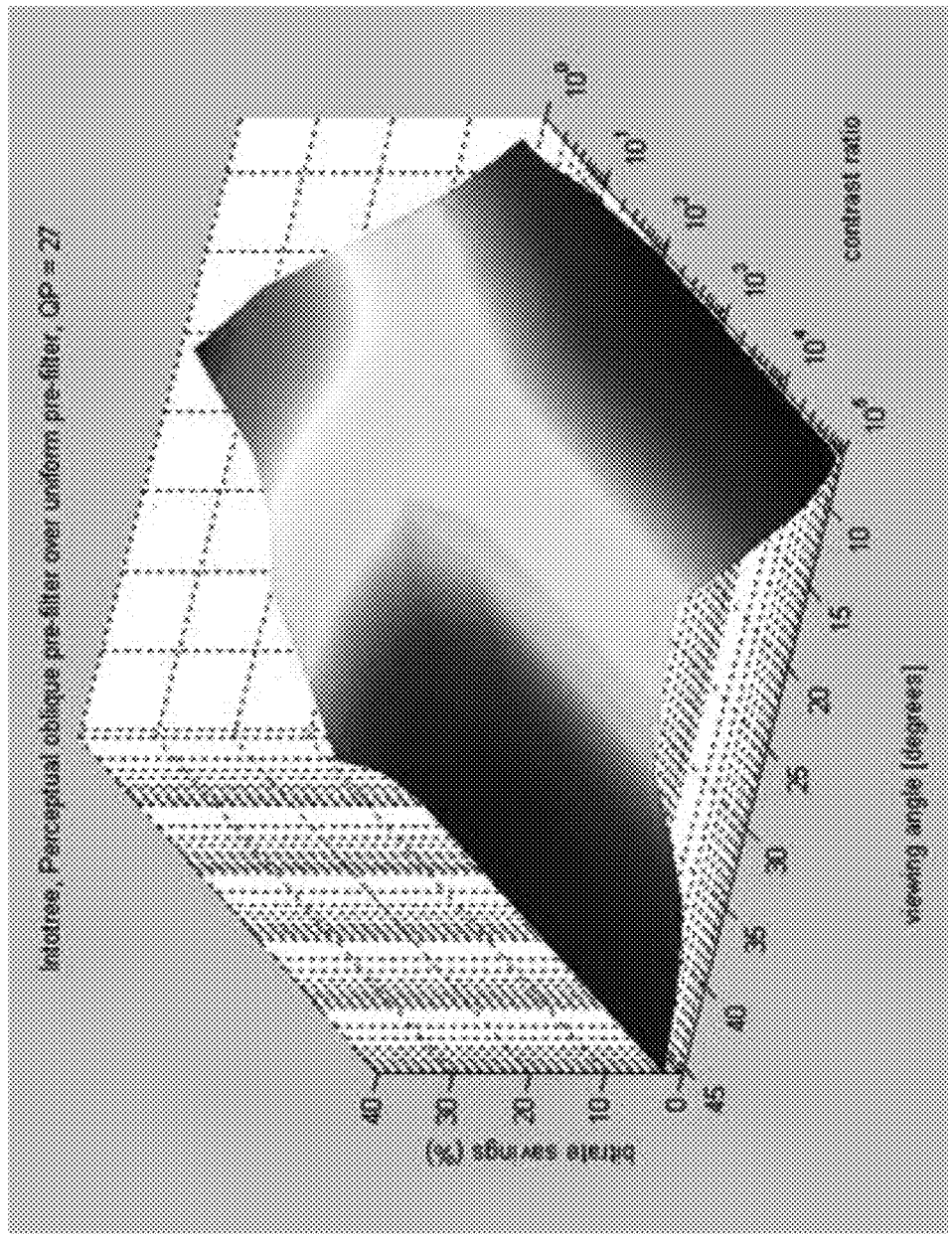
FIG. 32 depicts example bitrate savings of employing an example perceptual oblique filter over a uniform pre-filter for an example video.

An example of performance that may be achieved by employing a perceptual oblique filter over a uniform pre-filter, under the same viewing conditions (e.g., substantially the same viewing conditions), is illustrated in FIG. 32. As shown, considerable bitrate savings may be achieved, for example, greater than 10% for viewing angles between 15° and 35°, and of 40% at approximately a 20° viewing angle. A perceptual oblique filter may yield higher bit savings over a uniform pre-filter, for example at lower contrast ratios.

Figure 33:
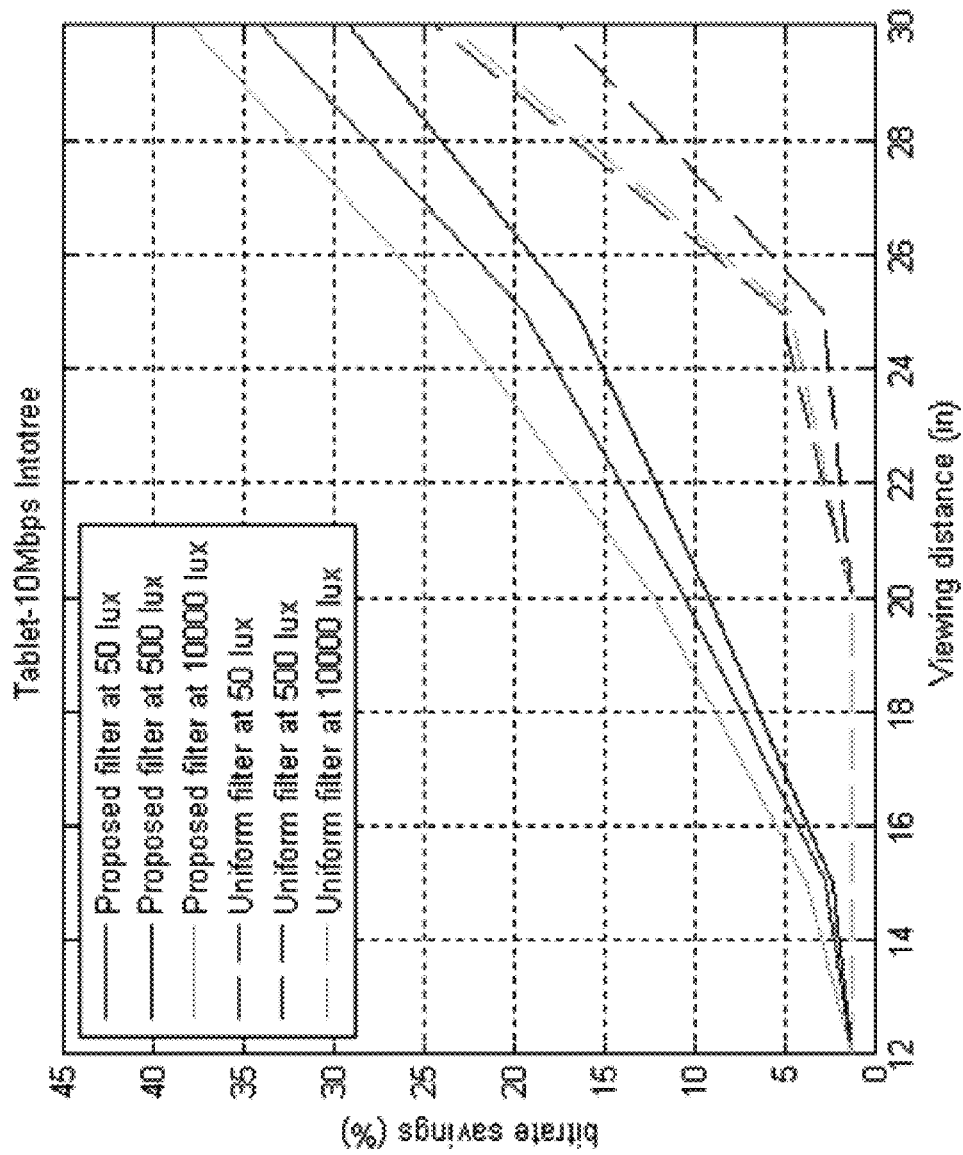
FIG. 33 depicts example results of ambient adaptive filtering.

A benefit of ambient adaptive filtering may be seen by comparing example results as shown in FIG. 33. The results shown in FIG. 33 correspond to three example ambient levels of 50 lux, 500 lux, and 10000 lux. The display brightness may be such that the relative luminance ratio may be at a maximum at the middle ambient level of 500 lux. The bit rate savings may increase when the ambient lux is significantly lower or higher than the corresponding display brightness of the display. This may correspond to moving away the relative surround-to-object luminance ratio away from one either lower for 50 lux or higher for 10000 lux. In either case, the scaling factor may cause reduced and may cause increased bit rate savings. This effect can be seen with an adaptive filter, which may adapt to picture contents, as well as a non-adaptive filter, where the cut-off frequency selection is not adapted to picture content.

One or both of the perceptual filter and perceptual oblique filter disclosed herein, and corresponding techniques associated therewith, may be implemented in accordance with transporting video (e.g., video streaming) in a wireless communication system, such as the example wireless communication system 2700 and/or components thereof illustrated in FIGS. 27A-27E.

Figure 34A:
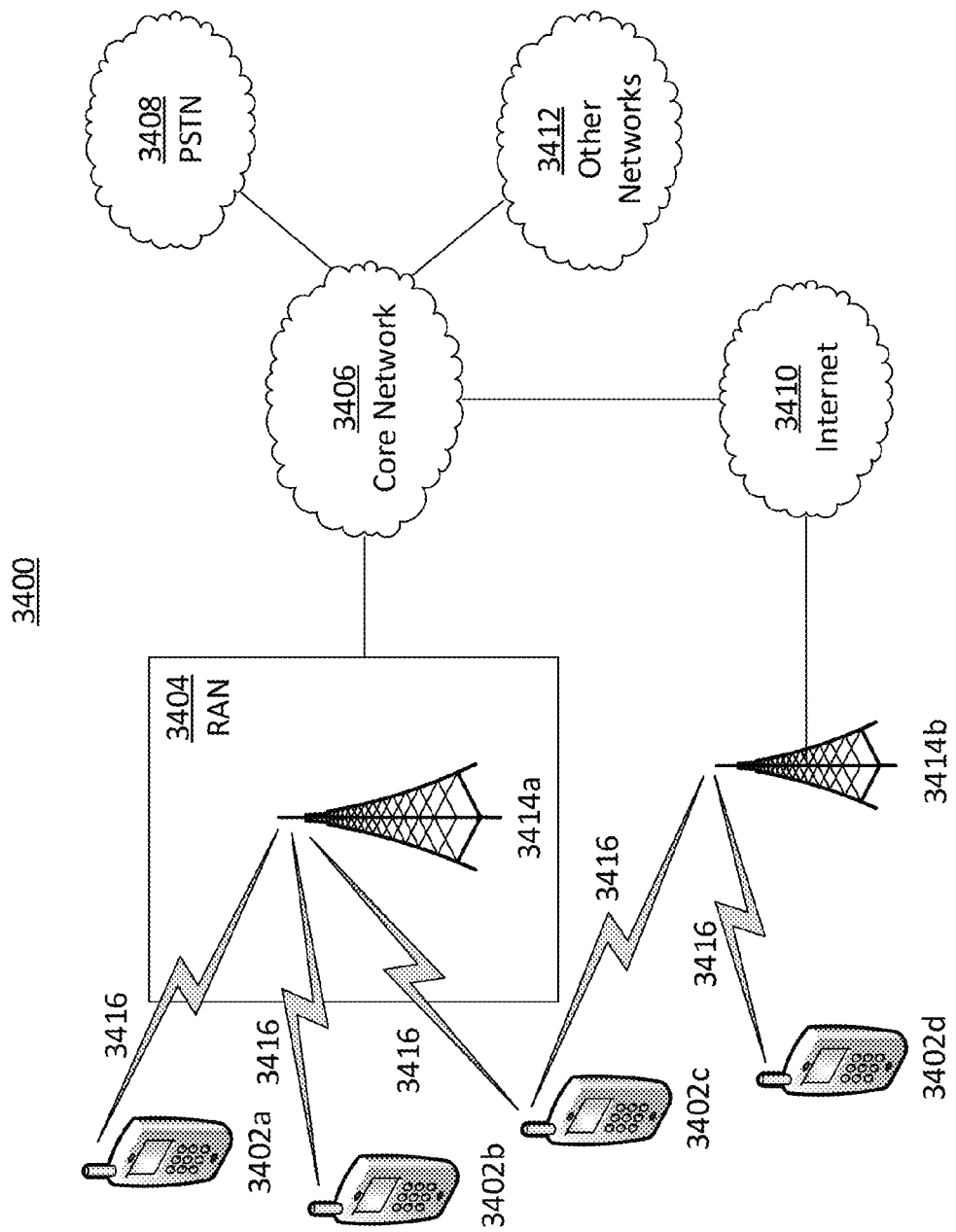
FIG. 34A depicts a system diagram of an example communications system in which one or more disclosed embodiments may be implemented.

FIG. 34A is a diagram of an example communications system 3400 in which one or more disclosed embodiments may be implemented. The communications system 3400 may be a multiple access system that provides content, such as voice, data, video, messaging, broadcast, etc., to multiple wireless users. The communications system 3400 may enable multiple wireless users to access such content through the sharing of system resources, including wireless bandwidth. For example, the communications systems 3400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 34A, the communications system 3400 may include at least one wireless transmit/receive unit (WTRU), such as a plurality of WTRUs, for instance WTRUs 3402a, 3402b, 3402c, and 3402d, a radio access network (RAN) 3404, a core network 3406, a public switched telephone network (PSTN) 3408, the Internet 3410, and other networks 3412, though it should be appreciated that the disclosed embodiments contemplate any number of WTRUs, base stations, networks, and/or network elements. Each of the WTRUs 3402a, 3402b, 3402c, 3402d may be any type of device configured to operate and/or communicate in a wireless environment. By way of example, the WTRUs 3402a, 3402b, 3402c, 3402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 3400 may also include a base station 3414a and a base station 3414b. Each of the base stations 3414a, 3414b may be any type of device configured to wirelessly interface with at least one of the WTRUs 3402a, 3402b, 3402c, 3402d to facilitate access to one or more communication networks, such as the core network 3406, the Internet 3410, and/or the networks 3412. By way of example, the base stations 3414a, 3414b may be a base transceiver station (BTS), a Node-B, an eNode B, a Home Node B, a Home eNode B, a site controller, an access point (AP), a wireless router, and the like. While the base stations 3414a, 3414b are each depicted as a single element, it should be appreciated that the base stations 3414a, 3414b may include any number of interconnected base stations and/or network elements.

The base station 3414a may be part of the RAN 3404, which may also include other base stations and/or network elements (not shown), such as a base station controller (BSC), a radio network controller (RNC), relay nodes, etc. The base station 3414a and/or the base station 3414b may be configured to transmit and/or receive wireless signals within a particular geographic region, which may be referred to as a cell (not shown). The cell may further be divided into cell sectors. For example, the cell associated with the base station 3414a may be divided into three sectors. Thus, in one embodiment, the base station 3414a may include three transceivers, e.g., one for each sector of the cell. In another embodiment, the base station 3414*a* may employ multiple-input multiple output (MIMO) technology and, therefore, may utilize multiple transceivers for each sector of the cell.

The base stations 3414*a*, 3414*b* may communicate with one or more of the WTRUs 3402*a*, 3402*b*, 3402*c*, 3402*d* over an air interface 3416, which may be any suitable wireless communication link (e.g., radio frequency (RF), microwave, infrared (IR), ultraviolet (UV), visible light, etc.). The air interface 3416 may be established using any suitable radio access technology (RAT).

More specifically, as noted above, the communications system 3400 may be a multiple access system and may employ one or more channel access schemes, such as CDMA, TDMA, FDMA, OFDMA, SC-FDMA, and the like. For example, the base station 3414*a* in the RAN 3404 and the WTRUs 3402*a*, 3402*b*, 3402*c* may implement a radio technology such as Universal Mobile Telecommunications System (UMTS) Terrestrial Radio Access (UTRA), which may establish the air interface 3416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 3414*a* and the WTRUs 3402*a*, 3402*b*, 3402*c* may implement a radio technology such as Evolved UMTS Terrestrial Radio Access (E-UTRA), which may establish the air interface 3416 using Long Term Evolution (LTE) and/or LTE-Advanced (LTE-A).

In other embodiments, the base station 3414*a* and the WTRUs 3402*a*, 3402*b*, 3402*c* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1314*b* in FIG. 34A may comprise a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 3414*b* and the WTRUs 3402*c*, 3402*d* may implement a radio technology such as IEEE 802.11 to establish a wireless local area network (WLAN). In another embodiment, the base station 3414*b* and the WTRUs 3402*c*, 3402*d* may implement a radio technology such as IEEE 802.15 to establish a wireless personal area network (WPAN). In yet another embodiment, the base station 3414*b* and the WTRUs 3402*c*, 3402*d* may utilize a cellular-based RAT (e.g., WCDMA, CDMA2000, GSM, LTE, LTE-A, etc.) to establish a picocell or femtocell. As shown in FIG. 34A, the base station 3414*b* may have a direct connection to the Internet 3410. Thus, the base station 3414*b* may not be required to access the Internet 3410 via the core network 3406.

The RAN 3404 may be in communication with the core network 3406, which may be any type of network configured to provide voice, data, applications, and/or voice over internet protocol (VoIP) services to one or more of the WTRUs 3402*a*, 3402*b*, 3402*c*, 3402*d*. For example, the core network 3406 may provide call control, billing services, mobile location-based services, pre-paid calling, Internet connectivity, video distribution, etc., and/or perform high-level security functions, such as user authentication. Although not shown in FIG. 34A, it should be appreciated that the RAN 3404 and/or the core network 3406 may be in direct or indirect communication with other RANs that employ the same RAT as the RAN 3404 or a different RAT. For example, in addition to being connected to the RAN 3404, which may be utilizing an E-UTRA radio technology, the core network 3406 may also be in communication with another RAN (not shown) employing a GSM radio technology.

The core network 3406 may also serve as a gateway for the WTRUs 3402*a*, 3402*b*, 3402*c*, 3402*d* to access the PSTN 3408, the Internet 3410, and/or other networks 3412. The PSTN 3408 may include circuit-switched telephone networks that provide plain old telephone service (POTS). The Internet 3410 may include a global system of interconnected computer networks and devices that use common communication protocols, such as the transmission control protocol (TCP), user datagram protocol (UDP) and the internet protocol (IP) in the TCP/IP internet protocol suite. The networks 3412 may include wired or wireless communications networks owned and/or operated by other service providers. For example, the networks 3412 may include another core network connected to one or more RANs, which may employ the same RAT as the RAN 3404 or a different RAT.

Some or all of the WTRUs 3402*a*, 3402*b*, 3402*c*, 3402*d* in the communications system 3400 may include multi-mode capabilities, e.g., the WTRUs 3402*a*, 3402*b*, 3402*c*, 3402*d* may include multiple transceivers for communicating with different wireless networks over different wireless links. For example, the WTRU 3402*c* shown in FIG. 34A may be configured to communicate with the base station 3414*a*, which may employ a cellular-based radio technology, and with the base station 3414*b*, which may employ an IEEE 802 radio technology.

Figure 34B:
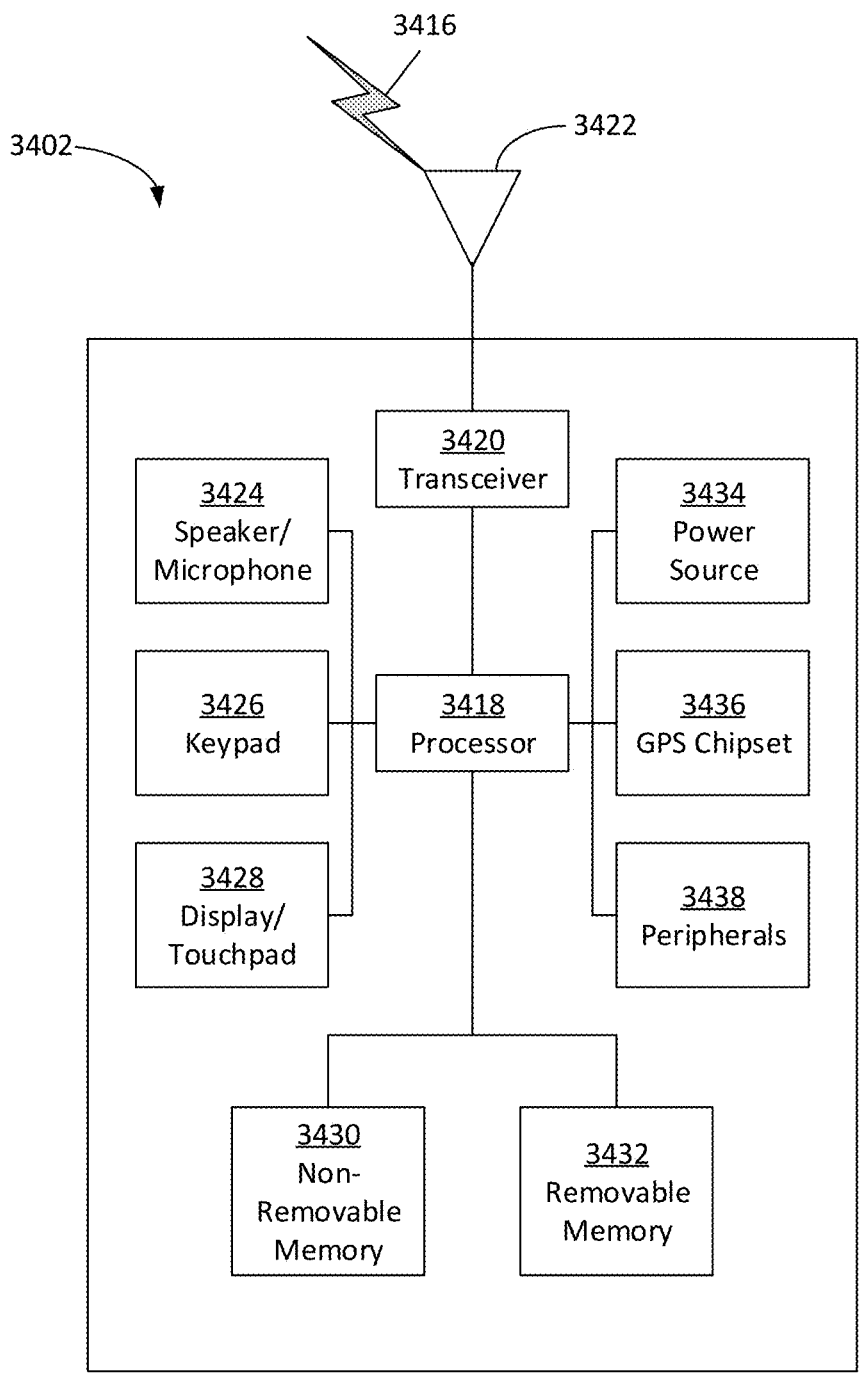
FIG. 34B depicts a system diagram of an example wireless transmit/receive unit (WTRU) that may be used within the communications system illustrated in FIG. 34A.

FIG. 34B is a system diagram of an example WTRU 3402. As shown in FIG. 34B, the WTRU 3402 may include a processor 3418, a transceiver 3420, a transmit/receive element 3422, a speaker/microphone 3424, a keypad 3426, a display/touchpad 3428, non-removable memory 3430, removable memory 3432, a power source 3434, a global positioning system (GPS) chipset 3436, and other peripherals 3438. It should be appreciated that the WTRU 3402 may include any sub-combination of the foregoing elements while remaining consistent with an embodiment.

The processor 3418 may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 3418 may perform signal coding, data processing, power control, input/output processing, and/or any other functionality that enables the WTRU 3402 to operate in a wireless environment. The processor 3418 may be coupled to the transceiver 3420, which may be coupled to the transmit/receive element 3422. While FIG. 34B depicts the processor 3418 and the transceiver 3420 as separate components, it should be appreciated that the processor 3418 and the transceiver 3420 may be integrated together in an electronic package or chip.

The transmit/receive element 3422 may be configured to transmit signals to, or receive signals from, a base station (e.g., the base station 3414*a*) over the air interface 3416. For example, in one embodiment, the transmit/receive element 3422 may be an antenna configured to transmit and/or receive RF signals. In another embodiment, the transmit/receive element 3422 may be an emitter/detector configured to transmit and/or receive IR, UV, or visible light signals, for example. In yet another embodiment, the transmit/receive element 3422 may be configured to transmit and receive both RF and light signals. It should be appreciated that the transmit/receive element 3422 may be configured to transmit and/or receive any combination of wireless signals.

In addition, although the transmit/receive element 3422 is depicted in FIG. 34B as a single element, the WTRU 3402 may include any number of transmit/receive elements 3422. More specifically, the WTRU 3402 may employ MIMO technology. Thus, in one embodiment, the WTRU 3402 may include two or more transmit/receive elements 3422 (e.g., multiple antennas) for transmitting and receiving wireless signals over the air interface 3416.

The transceiver 3420 may be configured to modulate the signals that are to be transmitted by the transmit/receive element 3422 and to demodulate the signals that are received by the transmit/receive element 3422. As noted above, the WTRU 3402 may have multi-mode capabilities. Thus, the transceiver 3420 may include multiple transceivers for enabling the WTRU 3402 to communicate via multiple RATs, such as UTRA and IEEE 802.11, for example.

The processor 3418 of the WTRU 3402 may be coupled to, and may receive user input data from, the speaker/microphone 3424, the keypad 3426, and/or the display/touchpad 3428 (e.g., a liquid crystal display (LCD) display unit or organic light-emitting diode (OLED) display unit). The processor 3418 may also output user data to the speaker/microphone 3424, the keypad 3426, and/or the display/touchpad 3428. In addition, the processor 3418 may access information from, and store data in, any type of suitable memory, such as the non-removable memory 3430 and/or the removable memory 3432. The non-removable memory 3430 may include random-access memory (RAM), read-only memory (ROM), a hard disk, or any other type of memory storage device. The removable memory 3432 may include a subscriber identity module (SIM) card, a memory stick, a secure digital (SD) memory card, and the like. In other embodiments, the processor 3418 may access information from, and store data in, memory that is not physically located on the WTRU 3402, such as on a server or a home computer (not shown).

The processor 3418 may receive power from the power source 3434, and may be configured to distribute and/or control the power to the other components in the WTRU 3402. The power source 3434 may be any suitable device for powering the WTRU 3402. For example, the power source 3434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 3418 may also be coupled to the GPS chipset 3436, which may be configured to provide location information (e.g., longitude and latitude) regarding the current location of the WTRU 3402. In addition to, or in lieu of, the information from the GPS chipset 3436, the WTRU 3402 may receive location information over the air interface 3416 from a base station (e.g., base stations 3414a, 3414b) and/or determine its location based on the timing of the signals being received from two or more nearby base stations. It should be appreciated that the WTRU 3402 may acquire location information by way of any suitable location-determination method while remaining consistent with an embodiment.

The processor 3418 may further be coupled to other peripherals 3438, which may include one or more software and/or hardware modules that provide additional features, functionality and/or wired or wireless connectivity. For example, the peripherals 3438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 34C:
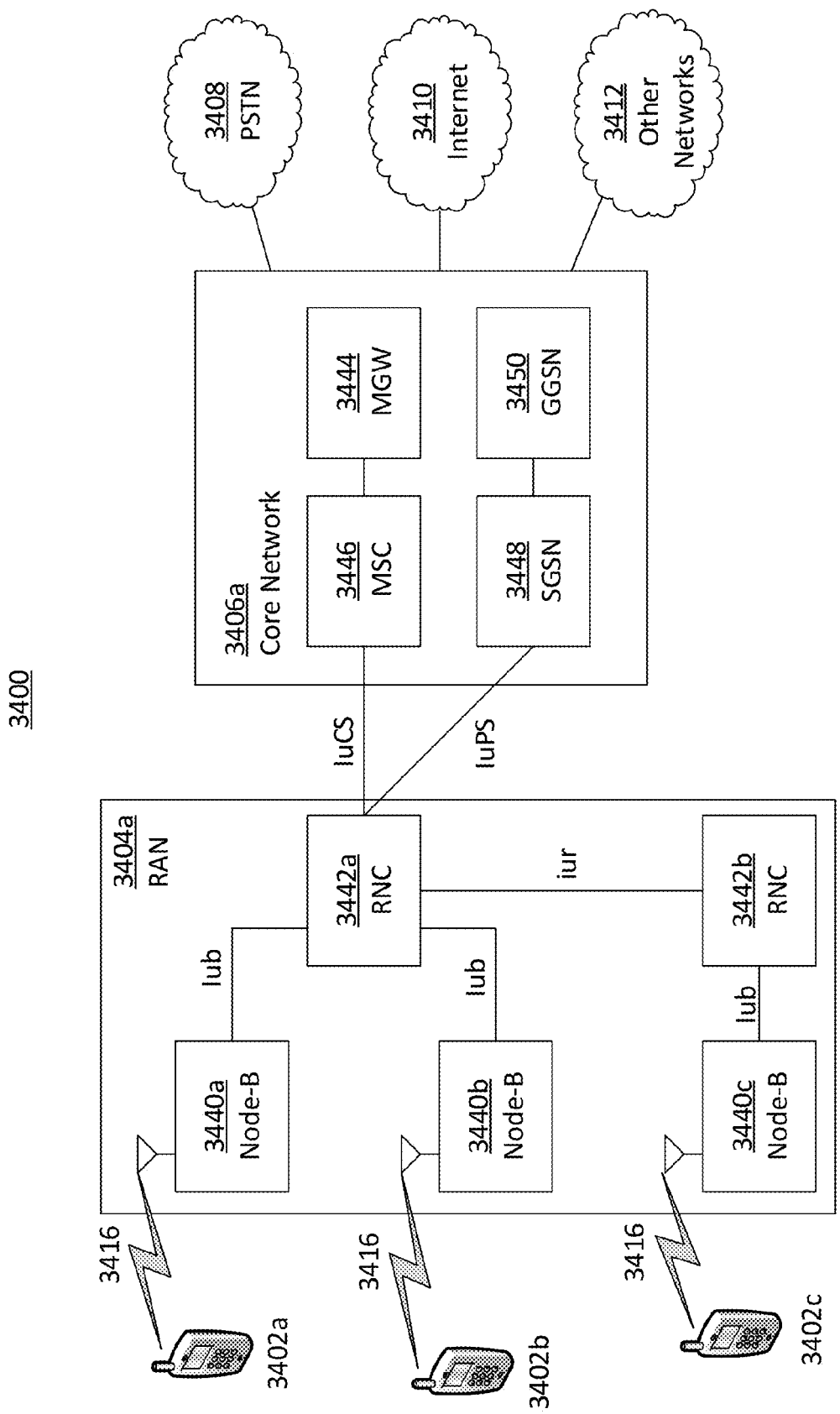
FIG. 34C depicts a system diagram of an example radio access network and an example core network that may be used within the communications system illustrated in FIG. 34A.

FIG. 34C is a system diagram of an embodiment of the communications system 3400 that includes a RAN 3404a and a core network 3406a that comprise example implementations of the RAN 3404 and the core network 3406, respectively. As noted above, the RAN 3404, for instance the RAN 3404a, may employ a UTRA radio technology to communicate with the WTRUs 3402a, 3402b, and 3402c over the air interface 3416. The RAN 3404a may also be in communication with the core network 3406a. As shown in FIG. 34C, the RAN 3404a may include Node-Bs 3440a, 3440b, 3440c, which may each include one or more transceivers for communicating with the WTRUs 3402a, 3402b, 3402c over the air interface 3416. The Node-Bs 3440a, 3440b, 3440c may each be associated with a particular cell (not shown) within the RAN 3404a. The RAN 3404a may also include RNCs 3442a, 3442b. It should be appreciated that the RAN 3404a may include any number of Node-Bs and RNCs while remaining consistent with an embodiment.

As shown in FIG. 34C, the Node-Bs 3440a, 3440b may be in communication with the RNC 3442a. Additionally, the Node-B 3440c may be in communication with the RNC 3442b. The Node-Bs 3440a, 3440b, 3440c may communicate with the respective RNCs 3442a, 3442b via an Iub interface. The RNCs 3442a, 3442b may be in communication with one another via an Iur interface. Each of the RNCs 3442a, 3442b may be configured to control the respective Node-Bs 3440a, 3440b, 3440c to which it is connected. In addition, each of the RNCs 3442a, 3442b may be configured to carry out or support other functionality, such as outer loop power control, load control, admission control, packet scheduling, handover control, macrodiversity, security functions, data encryption, and the like.

The core network 3406a shown in FIG. 34C may include a media gateway (MGW) 3444, a mobile switching center (MSC) 3446, a serving GPRS support node (SGSN) 3448, and/or a gateway GPRS support node (GGSN) 3450. While each of the foregoing elements is depicted as part of the core network 3406a, it should be appreciated that any one of these elements may be owned and/or operated by an entity other than the core network operator.

The RNC 3442a in the RAN 3404a may be connected to the MSC 3446 in the core network 3406a via an IuCS interface. The MSC 3446 may be connected to the MGW 3444. The MSC 3446 and the MGW 3444 may provide the WTRUs 3402a, 3402b, 3402c with access to circuit-switched networks, such as the PSTN 3408, to facilitate communications between the WTRUs 3402a, 3402b, 3402c and traditional land-line communications devices.

The RNC 3442a in the RAN 3404a may also be connected to the SGSN 3448 in the core network 3406a via an IuPS interface. The SGSN 3448 may be connected to the GGSN 3450. The SGSN 3448 and the GGSN 3450 may provide the WTRUs 3402a, 3402b, 3402c with access to packet-switched networks, such as the Internet 3410, to facilitate communications between and the WTRUs 3402a, 3402b, 3402c and IP-enabled devices.

As noted above, the core network 3406a may also be connected to the networks 3412, which may include other wired or wireless networks that are owned and/or operated by other service providers.

Figure 34D:
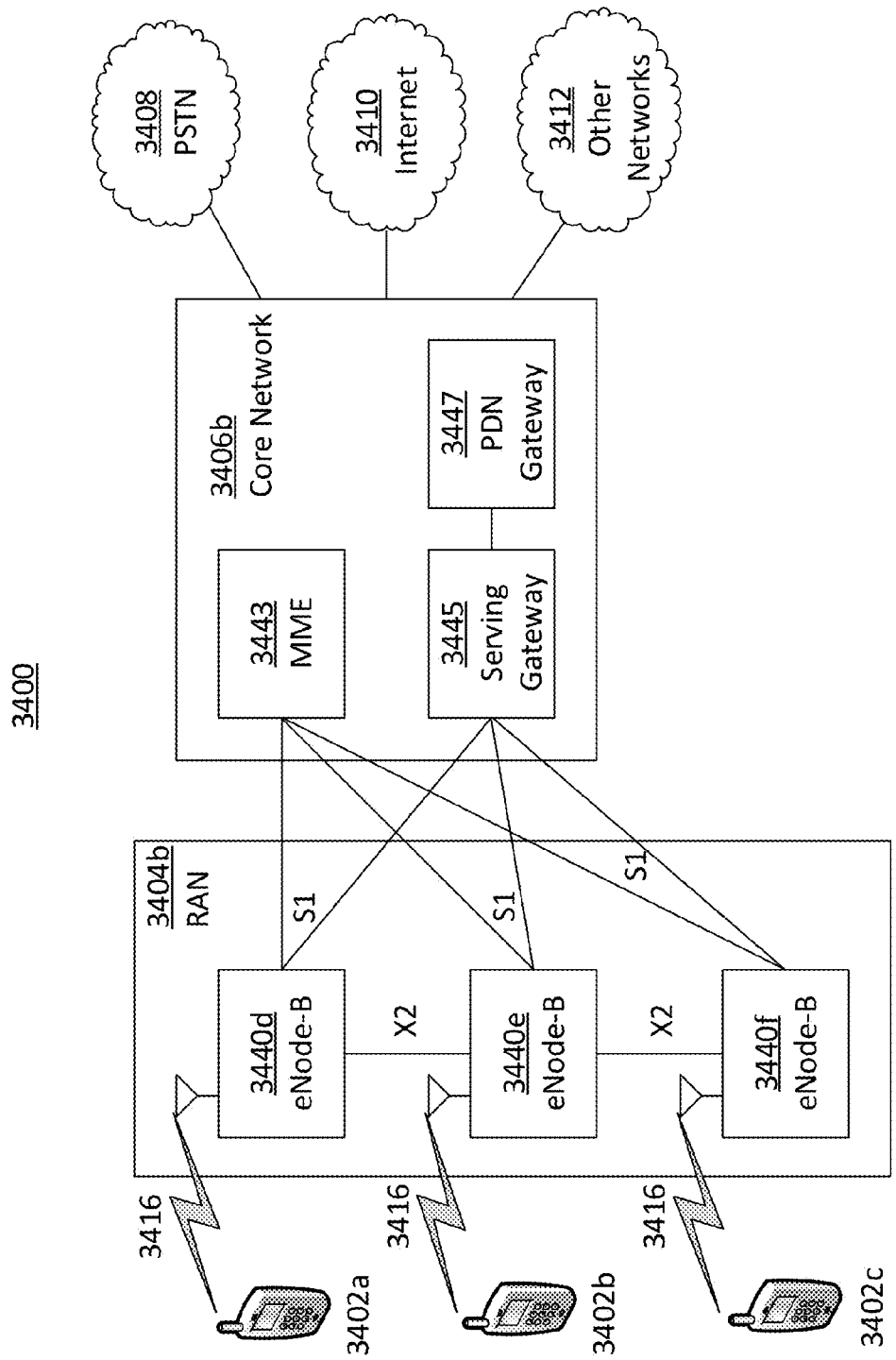
FIG. 34D depicts a system diagram of an example radio access network and an example core network that may be used within the communications system illustrated in FIG. 34A.

FIG. 34D is a system diagram of an embodiment of the communications system 3400 that includes a RAN 3404b and a core network 3406b that comprise example implementations of the RAN 3404 and the core network 3406, respectively. As noted above, the RAN 3404, for instance the RAN 3404b, may employ an E-UTRA radio technology to communicate with the WTRUs 3402a, 3402b, and 3402c over the air interface 3416. The RAN 3404b may also be in communication with the core network 3406b.

The RAN 3404b may include eNode-Bs 3440d, 3440e, 3440f, though it should be appreciated that the RAN 3404b may include any number of eNode-Bs while remaining consistent with an embodiment. The eNode-Bs 3440d, 3440e, 3440f may each include one or more transceivers for communicating with the WTRUs 3402a, 3402b, 3402c over the air interface 3416. In one embodiment, the eNode-Bs 3440d, 3440e, 3440f may implement MIMO technology. Thus, the eNode-B 3440d, for example, may use multiple antennas to transmit wireless signals to, and receive wireless signals from, the WTRU 3402a.

Each of the eNode-Bs 3440d, 3440e, and 3440f may be associated with a particular cell (not shown) and may be configured to handle radio resource management decisions, handover decisions, scheduling of users in the uplink and/or downlink, and the like. As shown in FIG. 34D, the eNode-Bs 3440d, 3440e, 3440f may communicate with one another over an X2 interface.

The core network 3406b shown in FIG. 34D may include a mobility management gateway (MME) 3443, a serving gateway 3445, and a packet data network (PDN) gateway 3447. While each of the foregoing elements is depicted as part of the core network 3406b, it should be appreciated that any one of these elements may be owned and/or operated by an entity other than the core network operator.

The MME 3443 may be connected to each of the eNode-Bs 3440d, 3440e, and 3440f in the RAN 3404b via an S1 interface and may serve as a control node. For example, the MME 3443 may be responsible for authenticating users of the WTRUs 3402a, 3402b, 3402c, bearer activation/deactivation, selecting a particular serving gateway during an initial attach of the WTRUs 3402a, 3402b, 3402c, and the like. The MME 3443 may also provide a control plane function for switching between the RAN 3404b and other RANs (not shown) that employ other radio technologies, such as GSM or WCDMA.

The serving gateway 3445 may be connected to each of the eNode Bs 3440d, 3440e, 3440f in the RAN 3404b via the S1 interface. The serving gateway 3445 may generally route and forward user data packets to/from the WTRUs 3402a, 3402b, 3402c. The serving gateway 3445 may also perform other functions, such as anchoring user planes during inter-eNode B handovers, triggering paging when downlink data is available for the WTRUs 3402a, 3402b, 3402c, managing and storing contexts of the WTRUs 3402a, 3402b, 3402c, and the like.

The serving gateway 3445 may also be connected to the PDN gateway 3447, which may provide the WTRUs 3402a, 3402b, 3402c with access to packet-switched networks, such as the Internet 3410, to facilitate communications between the WTRUs 3402a, 3402b, 3402c and IP-enabled devices.

The core network 3406b may facilitate communications with other networks. For example, the core network 3406b may provide the WTRUs 3402a, 3402b, 3402c with access to circuit-switched networks, such as the PSTN 3408, to facilitate communications between the WTRUs 3402a, 3402b, 3402c and traditional land-line communications devices. For example, the core network 3406b may include, or may communicate with, an IP gateway (e.g., an IP multimedia subsystem (IMS) server) that serves as an interface between the core network 3406b and the PSTN 3408. In addition, the core network 3406b may provide the WTRUs 3402a, 3402b, 3402c with access to the networks 3412, which may include other wired or wireless networks that are owned and/or operated by other service providers.

Figure 34E:
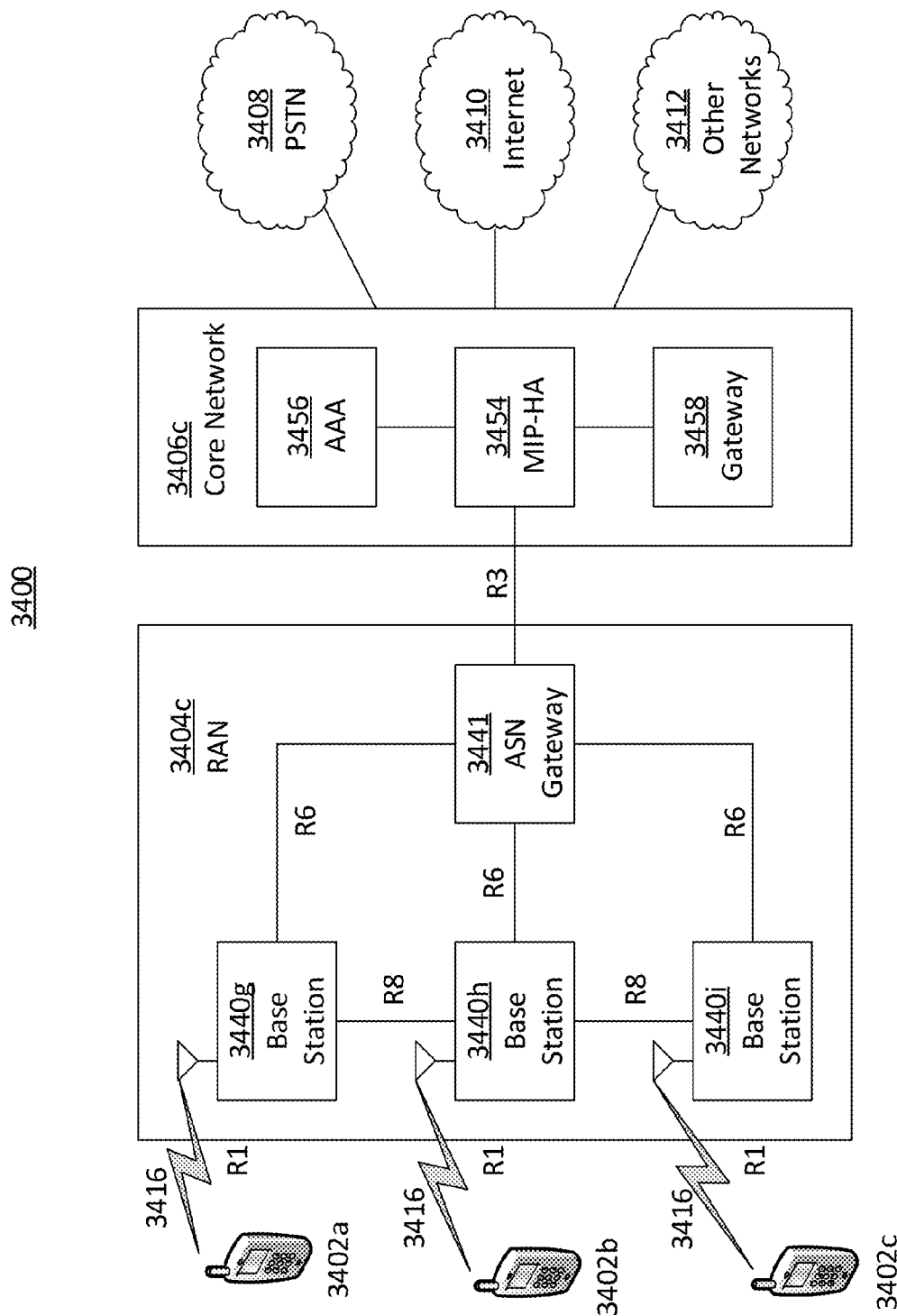
FIG. 34E depicts a system diagram of an example radio access network and an example core network that may be used within the communications system illustrated in FIG. 34A.

FIG. 34E is a system diagram of an embodiment of the communications system 3400 that includes a RAN 3404c and a core network 3406c that comprise example implementations of the RAN 3404 and the core network 3406, respectively. The RAN 3404, for instance the RAN 3404c, may be an access service network (ASN) that employs IEEE 802.16 radio technology to communicate with the WTRUs 3402a, 3402b, and 3402c over the air interface 3416. As described herein, the communication links between the different functional entities of the WTRUs 3402a, 3402b, 3402c, the RAN 3404c, and the core network 3406c may be defined as reference points.

As shown in FIG. 34E, the RAN 3404c may include base stations 3402a, 3402b, 3402c, and an ASN gateway 3441, though it should be appreciated that the RAN 3404c may include any number of base stations and ASN gateways while remaining consistent with an embodiment. The base stations 3402a, 3402b, 3402c may each be associated with a particular cell (not shown) in the RAN 3404c and may each include one or more transceivers for communicating with the WTRUs 3402a, 3402b, 3402c over the air interface 3416. In one embodiment, the base stations 3440g, 3440h, 3440i may implement MIMO technology. Thus, the base station 3440g, for example, may use multiple antennas to transmit wireless signals to, and receive wireless signals from, the WTRU 3402a. The base stations 3440g, 3440h, 3440i may also provide mobility management functions, such as handoff triggering, tunnel establishment, radio resource management, traffic classification, quality of service (QoS) policy enforcement, and the like. The ASN Gateway 3441 may serve as a traffic aggregation point and may be responsible for paging, caching of subscriber profiles, routing to the core network 3406c, and the like.

The air interface 3416 between the WTRUs 3402a, 3402b, 3402c and the RAN 3404c may be defined as an R1 reference point that implements the IEEE 802.16 specification. In addition, each of the WTRUs 3402a, 3402b, and 3402c may establish a logical interface (not shown) with the core network 3406c. The logical interface between the WTRUs 3402a, 3402b, 3402c and the core network 3406c may be defined as an R2 reference point, which may be used for authentication, authorization, IP host configuration management, and/or mobility management.

The communication link between each of the base stations 3440g, 3440h, 3440i may be defined as an R8 reference point that includes protocols for facilitating WTRU handovers and the transfer of data between base stations. The communication link between the base stations 3440g, 3440h, 3440i and the ASN gateway 3441 may be defined as an R6 reference point. The R6 reference point may include protocols for facilitating mobility management based on mobility events associated with each of the WTRUs 3402a, 3402b, 3402c.

As shown in FIG. 34E, the RAN 3404c may be connected to the core network 3406c. The communication link between the RAN 3404c and the core network 3406c may defined as an R3 reference point that includes protocols for facilitating data transfer and mobility management capabilities, for example. The core network 3406c may include a mobile IP home agent (MIP-HA) 3444, an authentication, authorization, accounting (AAA) server 3456, and a gateway 3458. While each of the foregoing elements is depicted as part of the core network 3406c, it should be appreciated that any one of these elements may be owned and/or operated by an entity other than the core network operator.

The MIP-HA may be responsible for IP address management, and may enable the WTRUs 3402a, 3402b, and 3402c to roam between different ASNs and/or different core networks. The MIP-HA 1354 may provide the WTRUs 3402a, 3402b, 3402c with access to packet-switched networks, such as the Internet 3410, to facilitate communications between the WTRUs 3402a, 3402b, 3402c and IP-enabled devices. The AAA server 3456 may be responsible for user authentication and for supporting user services. The gateway 3458 may facilitate interworking with other networks. For example, the gateway 3458 may provide the WTRUs 3402a, 3402b, 3402c with access to circuit-switched networks, such as the PSTN 3408, to facilitate communications between the WTRUs 3402a, 3402b, 3402c and traditional landline communications devices. In addition, the gateway 3458 may provide the WTRUs 3402a, 3402b, 3402c with access to the networks 3412, which may include other wired or wireless networks that are owned and/or operated by other service providers.

Although not shown in FIG. 34E, it should be appreciated that the RAN 3404c may be connected to other ASNs and the core network 3406c may be connected to other core networks. The communication link between the RAN 3404c the other ASNs may be defined as an R4 reference point, which may include protocols for coordinating the mobility of the WTRUs 3402a, 3402b, 3402c between the RAN 3404c and the other ASNs. The communication link between the core network 3406c and the other core networks may be defined as an R5 reference point, which may include protocols for facilitating interworking between home core networks and visited core networks.

The processes and instrumentalities described herein may apply in any combination, may apply to other wireless technology, and for other services (e.g., not limited for proximity services).

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A method comprising:
    determining a frame of luminance data from an input image having a plurality of pixels, wherein the input image corresponds to a current video frame of a video stream;
    generating black-level adjusted luminance pixel data based on the luminance data and a contrast ratio;
    performing temporal stabilization of the black-level adjusted luminance pixel data, wherein performing the temporal stabilization comprises:
        performing spatial de-noising of the black-level adjusted luminance pixel data at least in part by applying a median filter to the black-level adjusted luminance pixel data;
        generating a difference image between the median-filtered current video frame and a past median-filtered video frame of the video stream; and
        applying a Gaussian filter to the difference image, wherein a length of the Gaussian filter is determined based on at least one of a viewing distance and a display pixel density;
    determining a respective localized contrast sensitivity for each pixel based on the corresponding temporally-stabilized black-level adjusted luminance pixel data;
    selecting a respective filter bandwidth for each pixel based at least in part on the respective localized contrast sensitivity of the pixel;
    generating a filtered video frame by filtering each pixel according to the respective selected filter bandwidth of the pixel; and
    providing the filtered video frame to a video encoder.

2. The method of claim 1, wherein the median filter has a size, in pixels×pixels, selected from the group consisting of 7×7, 5×5, and 3×3.

3. The method of claim 1, wherein generating the difference image comprises determining a difference square between respective pixel values of the current and past median-filtered video frames.

4. The method of claim 1, wherein generating the difference image comprises determining a difference between respective pixel values of the current and past median-filtered video frames.

5. The method of claim 1, wherein the past median-filtered video frame comprises a video frame immediately preceding the current video frame.

6. The method of claim 1, further comprising comparing the respective pixel values of the Gaussian-filtered difference image with a threshold value T.

7. The method of claim 6, wherein the threshold value $T=10^{-6}$.

8. The method of claim 6, wherein performing the temporal stabilization further comprises applying an IIR filter to pixels having respective pixel values that exceed the threshold value T.

9. The method of claim 1, wherein performing the temporal stabilization further comprises determining respective IIR-filtered values for pixels $P_{i,j}$ of a video frame of the video stream.

10. The method of claim 1, wherein performing the temporal stabilization further comprises: selecting a filter parameter based on a monotonically-decreasing function of Gaussian-filtered pixels; and applying a first-order IIR filter based on the selected filter parameter.

11. The method of claim 1, wherein performing temporal stabilization of a given pixel is conditioned on determining that the given pixel is associated with a static region of the input image.

12. The method of claim 11, wherein the static region of the input image is determined in part based on pixel differences between successive median-filtered image frames.

13. A video filtering device comprising:
- a communication interface;
- a processor; and
- data storage containing instructions executable by the processor for causing the video filtering device to carry out a set of functions, the set of functions comprising:
  - determining a frame of luminance data from an input image having a plurality of pixels, wherein the input image corresponds to a current video frame of a video stream;
  - generating black-level adjusted luminance pixel data based on the luminance data and a contrast ratio;
  - performing temporal stabilization of the black-level adjusted luminance pixel data, wherein performing the temporal stabilization comprises:
    - performing spatial de-noising of the black-level adjusted luminance pixel data, wherein performing the spatial de-noising comprises applying a median filter to the black-level adjusted luminance pixel data;
    - generating a difference image between the median-filtered current video frame and a past median-filtered video frame of the video stream; and
    - applying a Gaussian filter to the difference image, wherein a length of the Gaussian filter is determined based on at least one of a viewing distance and a display pixel density;
  - determining a respective localized contrast sensitivity for each pixel based on the corresponding temporally-stabilized black-level adjusted luminance pixel data;
  - selecting a respective filter bandwidth for each pixel based at least in part on the respective localized contrast sensitivity of the pixel;
  - generating a filtered video frame by filtering each pixel according to the respective selected filter bandwidth of the pixel; and
  - providing the filtered video frame to a video encoder.

14. A method comprising:
- determining a frame of luminance data from an input image having a plurality of pixels, wherein the input image corresponds to a current video frame of a video stream;
- generating black-level adjusted luminance pixel data based on the luminance data and a contrast ratio;
- performing temporal stabilization of the black-level adjusted luminance pixel data, wherein performing the temporal stabilization comprises:
  - performing spatial de-noising of the black-level adjusted luminance pixel data, wherein performing the spatial de-noising comprises applying a median filter to the black-level adjusted luminance pixel data;
  - generating a difference image between the median-filtered current video frame and a past median-filtered video frame of the video stream; and
  - applying a Gaussian filter to the difference image, wherein a length N of the Gaussian filter is determined based on a ratio of pixels to cycles according to:

$$N[\text{pixels/cycle}] = 2 \times d[\text{pixels}] \times \tan\left(\frac{1}{2CPD}\right)[/\text{cycles}],$$

wherein d is a viewing distance and CPD is a length of the Gaussian filter in cycles per degree;
- determining a respective localized contrast sensitivity for each pixel based on the corresponding temporally-stabilized black-level adjusted luminance pixel data;
- selecting a respective filter bandwidth for each pixel based at least in part on the respective localized contrast sensitivity of the pixel;
- generating a filtered video frame by filtering each pixel according to the respective selected filter bandwidth of the pixel; and
- providing the filtered video frame to a video encoder.

\* \* \* \* \*